US012315085B1

(12) United States Patent
Char et al.

(10) Patent No.: US 12,315,085 B1
(45) Date of Patent: May 27, 2025

(54) METHODS FOR PARTICIPATING IN AN ARTIFICIAL-REALITY APPLICATION THAT COORDINATES ARTIFICIAL-REALITY ACTIVITIES BETWEEN A USER AND AT LEAST ONE SUGGESTED USER

(71) Applicant: Meta Platforms Technologies, LLC, Menlo Park, CA (US)

(72) Inventors: Cody James Char, Seattle, WA (US); Holly Howson-Watt, Seattle, WA (US); Andrew James Forchione, Macedonia, OH (US); Radhika Bhargava, Brooklyn, NY (US); Stephen Marshall, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 75 days.

(21) Appl. No.: 18/190,880

(22) Filed: Mar. 27, 2023

Related U.S. Application Data

(60) Provisional application No. 63/358,502, filed on Jul. 5, 2022.

(51) Int. Cl.
  *G06T 19/00* (2011.01)
  *G06F 3/01* (2006.01)
  (Continued)

(52) U.S. Cl.
  CPC ............ *G06T 19/003* (2013.01); *G06F 21/32* (2013.01); *G06F 21/602* (2013.01); *G06F 3/011* (2013.01);
  (Continued)

(58) Field of Classification Search
  CPC ............... G06T 19/003; G06T 2200/24; G06T 2219/024; G06F 3/011; G06F 3/017
  See application file for complete search history.

(56) References Cited

U.S. PATENT DOCUMENTS

| 11,627,438 B1* | 4/2023 | Esposito ............ G06Q 10/1095 455/456.3 |
| 2014/0280532 A1* | 9/2014 | MacNiven .............. H04L 67/52 709/204 |

(Continued)

*Primary Examiner* — Doon Y Chow
*Assistant Examiner* — Dennis Chow
(74) *Attorney, Agent, or Firm* — Morgan, Lewis & Bockius LLP

(57) ABSTRACT

Systems and methods are provided for facilitating an interactive artificial-reality activity. A method includes, after a user of a head-wearable device has opted-in to using an artificial-reality application to facilitate connecting with other participating users, determining, based on user-specific suggestion criteria, that a suggested user is located in an approved common space with the user and has opted-in to use the artificial-reality application. The method includes causing the head-wearable device to present an user interface (UI) element for linking the suggested user and the user. Upon the user selecting the UI element for linking the suggested user with the user, the method includes automatically causing the head-wearable device to provide visual-guidance UI elements to navigate the user to an interactive-activity location where the user and the suggested user will perform an artificial-reality activity while also displaying information about the artificial-reality activity to be performed.

20 Claims, 28 Drawing Sheets

(51) Int. Cl.
*G06F 21/32* (2013.01)
*G06F 21/60* (2013.01)

(52) U.S. Cl.
CPC .......... *G06F 3/017* (2013.01); *G06T 2200/24* (2013.01); *G06T 2219/024* (2013.01)

(56) References Cited

U.S. PATENT DOCUMENTS

| | | | |
|---|---|---|---|
| 2018/0350144 A1* | 12/2018 | Rathod | G06Q 20/3224 |
| 2019/0182637 A1* | 6/2019 | France | H04W 4/06 |
| 2019/0320061 A1* | 10/2019 | Salandy-Defour | H04W 4/025 |
| 2020/0175768 A1* | 6/2020 | Lake | G06F 3/04815 |
| 2020/0374286 A1* | 11/2020 | Agarwal | G06V 40/20 |
| 2022/0051541 A1* | 2/2022 | Schwerdtfeger | G08B 21/22 |
| 2022/0156689 A1* | 5/2022 | Iwata | G06Q 30/0635 |
| 2023/0111327 A1* | 4/2023 | Ling | G08G 1/005 345/633 |
| 2023/0316594 A1* | 10/2023 | Lai | G06F 9/453 345/629 |

\* cited by examiner

600

602 After a user of head-wearable device has opted-in to using an artificial-reality application for connecting with other participating users, determine, based on one or more user-specific suggestion criteria for the user, that a suggested user (i) is located in a common space with the user, the common space approved for use in the artificial-reality application, and (ii) has opted-in to use the artificial-reality application.

604 Cause presentation, via the head-wearable device, of a respective user interface element for linking the user with the suggested user.

606 Indicate whether the suggested user has a verified account of a particular social-media application, and a shared interest of the user.

608 In response to receiving a selection of the user interface element for linking the user with the suggested user:

610 Automatically, without further instruction from the user, cause the head-wearable device to provide one or more visual-guidance user interface elements to navigate the user to an interactive-activity location at which an artificial-reality activity is to be performed by the user and the suggested user.

612 While providing one or more visual-guidance user interface elements, causing display of information, at the head-wearable device, about the artificial-reality activity to be performed by the user and the suggested user.

614 Present an indication of the suggested user's progress towards reaching the interactive-activity location.

616 Capture image data while the user navigates from a respective starting location to the interactive-activity location.

618 The interactive-activity location is determined based on image data received from another user participating in the artificial-reality activity.

620 Present an indication of the suggested user's progress towards reaching the interactive-activity location.

Figure 6

METHODS FOR PARTICIPATING IN AN ARTIFICIAL-REALITY APPLICATION THAT COORDINATES ARTIFICIAL-REALITY ACTIVITIES BETWEEN A USER AND AT LEAST ONE SUGGESTED USER

CROSS-REFERENCE TO RELATED APPLICATIONS

This application claims priority to U.S. Prov. App. No. 63/358,502, filed on Jul. 5, 2022, and entitled "Methods for Participating in an Artificial-Reality Application that Coordinates Artificial-Reality Activities between a User and at Least one Suggested User," which is hereby incorporated by reference in its entirety.

TECHNICAL FIELD

The present disclosure relates generally to wearable devices and methods for facilitating connections between users of wearable devices, and more particularly, to head-wearable devices configured to provide for interactive activities between multiple users in an artificial-reality environment (e.g., including displaying, at displays of head-wearable devices, user interface elements, including virtual objects) at or near determined interactive-activity locations while users participate in an interactive artificial-reality activity.

BACKGROUND

Networking has been made more difficult by the growing physical separation of people in an increasingly digital world. Certain technological solutions, such as social media applications, have allowed people to connect digitally, but fail to provide solutions for connecting people in the physical world. Further, social media applications are installed on mobile devices, such as smartphones, that require a user to constantly interact with the mobile device in forming connections. Some techniques and applications allow for digital and/or virtual-reality interactions between multiple users using head-wearable devices configured to display a virtual-reality environment. But such interactions are generally limited as the head-wearable devices need to be connected to computing devices (such as computers) with dedicated computing resources, which limit the users' ability to meet in the physical world during an interaction. Further, existing solutions fail to provide users with neutral, safe locations to meet and interact with one another.

As such, there is a need for addressing one or more of the drawbacks discussed above by developing wearable devices that enable efficient and effective methods to facilitate user interactions in the physical world based on shared interests of a user and at least one suggested user.

SUMMARY

Thus, the inventors of the embodiments described herein have developed a solution that allows users to safely interact with each other in an artificial-reality environment by allowing users to participate in an artificial-reality activity with one or more suggested users at interactive-activity locations. The suggested users and interactive-activity locations are determined based on the shared interests of the users and the one or more suggested users. By providing a safe and "neutral ground" in coordinating the users to meet at interactive-activity locations, the artificial-reality application facilitates artificial-reality activities between the users that allows them to connect safely and efficiently in the physical world. By allowing the users and the one or more suggested users to participate in such artificial-reality activities, the described methods and systems allow for a more efficient human-machine interface that allows for users to engage in more meaningful connections with other users that are more likely to result in productive networking. Further, the described methods and systems allow users to participate in the artificial-reality activity without requiring a user to constantly interact with handheld devices such as a mobile device.

The different methods disclosed herein can be performed using a head-wearable device, which is configured to present the artificial-reality environment (e.g., an augmented reality (AR) environment, a virtual reality (VR) environment, a mixed artificial-reality (MAR) environment, and the like) and/or perform one or more commands in an artificial-reality environment. In some embodiments, the head-wearable device can be an artificial-reality system including, but not limited to, non-immersive, semi-immersive, and fully-immersive VR systems; marker-based, marker-less, location-based, and projection-based augmented reality systems; hybrid reality systems; and other types of mixed reality systems.

As one example, a method of facilitating an artificial-reality activity between multiple users is performed at a computing system. The method includes, after a user of a head-wearable device has opted-in to using an artificial-reality application to facilitate connecting with other participating users, determining, based on one or more user-specific suggestion criteria for the user, that a suggested user (i) is located in a common space with the user, the common space approved for use in the artificial-reality application and (ii) has opted-in to use the artificial-reality application. The method further includes, causing presentation, via the head-wearable device, of a respective user interface element (UI) for linking the user with the suggested user. The method further includes, in response to receiving a selection of the respective UI element of the one or more UI elements for linking the suggested user with the user: (i) automatically, without further instructions from the user, causing the head-wearable device to provide one or more visual-guidance UI elements to navigate the user to an interactive-activity location at which an artificial-reality activity is to be performed by the user and the suggested user, and (ii) while providing the one or more visual-guidance UI elements, causing display of information, at the head-wearable device, about the artificial-reality activity to be performed by the user and the suggested user.

To help further the above goals, and as was briefly noted above, some embodiments described herein also make use of components of other wearable devices, such as wrist-wearable devices (e.g., smart watch or sensor-laden wristband), including speakers, microphones, and/or cameras of these other wearable devices to allow for seamlessly capturing and sharing data between the user and others. For instance, in some embodiments, a user can request, via the wrist-wearable device, to opt-in to an artificial-reality application, and the wrist-wearable device, responsive to the request, can cause an imaging device of a head-wearable device to activate and be used to interact with the artificial-reality application. Determinations can also be conducted as to whether an imaging device of the wrist-wearable device or the head-wearable device should be utilized (e.g., based on current power levels at each of the devices and/or based on available computing resources at each of the devices, and the like), and the appropriate imaging device can be activated based on those determinations, thereby furthering the benefits of making efficient use of limited power and computing resources at wearable devices. Additional examples are explained in further detail below.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in this art will appreciate upon reading this disclosure.

FIG. 6 illustrates a detailed flow diagram of a method for facilitating an interactive artificial-reality activity in an artificial-reality environment, according to some embodiments.

In accordance with common practice, like reference numerals may be used to denote like features throughout the specification and figures.

DETAILED DESCRIPTION

Figure 1A:
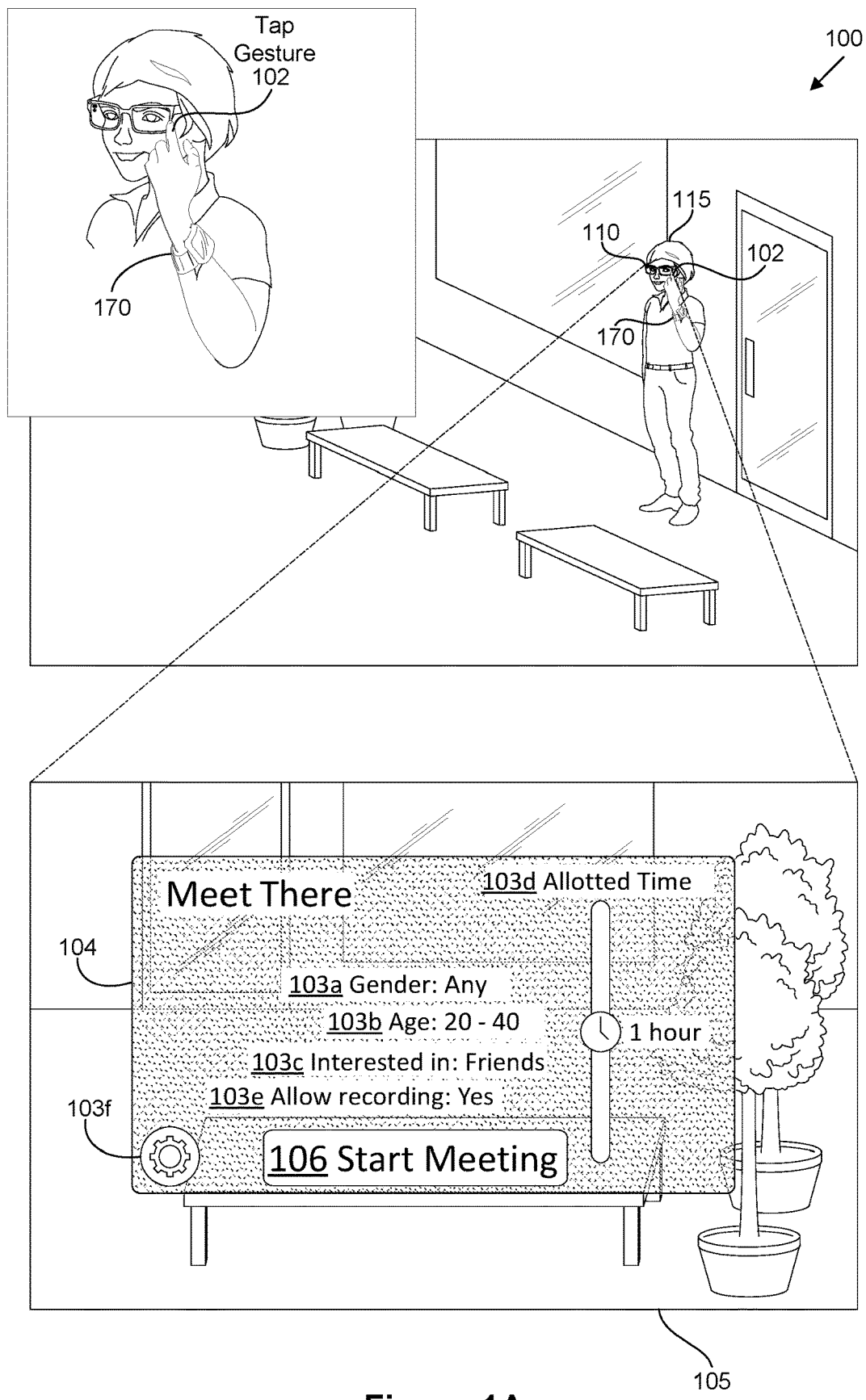
FIGS. 1A-1J illustrate wearable devices for facilitating an interactive artificial-reality activity in an artificial-reality environment, in accordance with some embodiments.

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

FIGS. 1A-1J illustrate wearable devices for facilitating an interactive artificial-reality activity in an artificial-reality environment, in accordance with some embodiments. The interactive artificial-reality activity can be facilitated by an artificial-reality application operated by the head-wearable device 110, an wrist-wearable device 170, a portable computing unit (e.g., a smartphone, a table, laptop, credit-card-sized computer, etc.), and/or another intermediary device. The head-wearable device 110 can be communicatively coupled with at least one wrist-wearable device 170, portable computing unit, and/or other intermediary device (e.g., via a Bluetooth connection between the two or more respective devices, and/or the two or more respective devices can also be connected to another intermediary device such as a smartphone that provides instructions and data to and between the two devices). In some embodiments, the artificial-reality activity occurs within an AR environment that includes some virtual objects and/or UI elements, displayed at the head-wearable device 110. In some embodiments, the UI elements presented to a user 115 are button-shaped icons displayed at the head-wearable device, that the user 115 can selects by (i) moving a focus selector over the respective UI element, and (ii) performing a second operation while the focus selector is over the respective UI element to select it (i.e., performing a button-press gesture). In some embodiments, the artificial-reality activity occurs in a VR environment that includes a virtual-reality scene that encompasses substantially all, or at least a significant portion of the field of view 105 of the user 115, displayed at the head-wearable device 110 and/or the head-wearable device 510 in FIG. 7.

In some embodiments, the head-wearable device 110 is a pair of smart glasses, augmented reality (AR) goggles (with or without a heads-up display), AR glasses (with or without a heads-up display), other head-mounted displays, etc. The head-wearable device 110 includes one or more communicatively-coupled components (e.g., imaging devices 111, displays 130, sensors 821, and/or components of the communication interface 815, including microphones, speakers, etc.). The one or more components of the head-wearable device 110 can be coupled with a housing and/or lenses of the head-wearable device 110, which can be removable from the head-wearable device 110 and/or interchangeable. For example, a display 130 can be coupled with one or more lenses of the head-wearable device 110. In some embodiments, the head-wearable device 110 is configured to capture imaging data (e.g., camera data) via an imaging device 111 (e.g., while the user 115 is navigating to the interactive-activity location as described below in reference to FIG. 1D), and/or present a representation of the captured imaging data via the display 130. In some embodiments, imaging data presented by the display 130 is presented in a field of view 105 of the user 115 (e.g., "passthrough" vision to provide the user with awareness of their surroundings while wearing the head-wearable device). In addition, in some embodiments, the head-wearable device 110 is configured to capture audio data via a microphone and/or present a representation of the captured audio data via speakers.

Turning to FIG. 1A, the interactive artificial-reality activity can be initiated upon receiving, via a user input, an opt-in instruction from the user 115 of the head-wearable device 110 to use the artificial-reality application to facilitate connecting the user 115 with other participating users. The user input can be provided by the user 115 via the performance of an action that can include one or more gestures, such as a touch command (e.g., at a frame of the head-wearable device 110 and/or via a communicatively coupled device, such as the wrist-wearable device 170), tracked movement of the user's eyes (e.g., adjusting a pupil position detected by the head-wearable device 110), hand gestures (e.g., in-air hand gestures, surface-contact gestures detected by the head-wearable device 110 and/or the wrist-wearable device 170), voice commands (e.g., verbal input received by a microphone of the head-wearable device 110 or other communicatively coupled device), etc. For example, as shown in FIG. 1A, the user 115 performs a tap gesture 102 directed to one or both frames of the head-wearable device 110. Therefore, one single user input (e.g., the tap gesture 102) can opt-in the user 115 to an artificial-reality application for facilitating an artificial-reality activity (e.g., an interaction that takes place at an interactive-activity location (e.g., a physical location within a predetermined distance (e.g., fifteen to five hundred meters) of the head-wearable device, or a virtual location within a virtual world as discussed below in reference to FIG. 2)) between the user 115 and one or more suggested users. The user input can be detected by the head-wearable device 110, the optional wrist-wearable device 170, portable computing unit, and/or another intermediary device. For example, a user input at the wrist-wearable device 170 for providing an opt-in instruction to use the artificial-reality application, can cause the wrist-wearable device 170 and/or the head-wearable device 110 to initiate the artificial-reality system 100. In some embodiments, the user 115 must be in a recognized common space (e.g., a mall, an amusement park, etc.) approved for use by the artificial-reality application for the opt-in instruction to cause the wrist-wearable device 170 and/or the head-wearable device 110 to initiate the artificial-reality system 100.

The opt-in instruction, when provided via the user input, can cause the head-wearable device 110 to present, via its display 130, an opt-in UI 104 including one or more UI elements and/or virtual objects related to the artificial-reality application for facilitating the interactive artificial-reality activity in the artificial-reality environment initiated by the artificial-reality system 100. For example, as shown in FIG. 1A, the head-wearable device 110, responsive to the tap gesture 102 providing an opt-in instruction to use the artificial-reality application, presents the opt-in UI 104 (e.g., an application configuration display UI), which includes one or more application setting UI elements 103a-103f for allowing the user 115 to adjust one or more user-specific suggestion criteria (e.g., artificial-reality activity settings and/or preferred traits of suggested users) and/or safety criteria (e.g., locations to avoid, verification requirements for a suggested user, whether the user will allow recording of the interactive artificial-reality activity) and a confirmation UI element 106 (e.g., a "Start Meeting" button), which initiates facilitation of the artificial-reality activity by attempting to connect the user 115 with other participating users. For example, in some embodiments, before or after the user input by the user to initiate the artificial-reality interaction (e.g., tap gesture 102), the user 115 can set a timer based on how long they plan to participate in the artificial-reality interaction (e.g., via an allotted time UI element 103d, which allows the user to set an allotted interaction time).

Non-limiting examples of the application setting UI elements that can be shown to the user 115's include: a preferred-gender UI element 103a that allows the user to specify the gender of other participants the user would like to connect with; an age range UI element 103b that allows a user to specify the age or age range of other participants the user would like to connect with; an "interested in" UI element 103c that allows a user to specify the type of contact they would like to connect with (e.g., friend, study buddy, roommate, romantic interest, etc.); an allotted time UI element 103d (e.g., a time-indication slider UI element) that allows the user 115 to specify the amount of time that they have available for participating in the artificial-reality activity; and an "allow recording" UI element 103e that allows a user 115 to specify whether they will allow, desire, and/or require recording of the artificial-reality activity (e.g., via an imaging device 111 of the head-wearable device 110). In some embodiments, the opt-in UI 104 includes a general settings UI element 103f (an icon with a gear wheel) for allowing the user 115 to specify additional application settings, including user-specific suggestion criteria (e.g., hobbies, dislikes, pet peeves, fun facts, and/or interest they would like to have in common with the other participants), an interaction start time, and/or device settings for the head-wearable device 110 and/or another electronic device (e.g., display settings, audio settings, camera settings, location settings).

The application setting UI elements 103 allow the user 115 to provide criteria for determining one or more suggested users, as well as determining the type of artificial-reality interaction to coordinate between the user and one or more suggested users. For example, when the user 115 sets an allotted interaction time, the allotted interaction time is used as a criterion for determining the type of artificial-reality interaction to coordinate between the user and one or more suggested users. Additional detail on the user-specific suggestion criteria, the safety criteria, the determination of the one or more suggested users, and the determination of the type of artificial-reality interaction is provided below in reference to FIG. 1B.

In some embodiments, one or more visual UI elements of the artificial-reality system 100, including UI elements and/or virtual objects (e.g., the opt-in UI 104) are displayed semi-transparently such that the user 115 can see at least some aspects and/or unobstructed portions of their physical environment behind the respective UI elements and/or virtual objects. In some embodiments, one or more UI elements are displayed translucently, meaning that they have a glass-like passthrough effect that allows the user 115 to see and/or read images and/or text from the physical environment behind the respective UI elements and/or virtual objects. In some embodiments, one or more UI elements are overlaid onto physical objects in the physical environment visible within the user 115's field of view 105 presented via the display 130 of the head-wearable device 110 (e.g., a virtual object can appear to rest on a physical table in the user 115's physical environment). Such techniques can, for example, improve the user 115's levels of interaction and immersion in the artificial-reality application and during the performance of the interactive artificial-reality activity without restricting the user 115's view. In some embodiments, one or more UI elements and/or virtual objects can be made fully transparent based on user input (e.g., a subsequent tap gesture, a voice command). Alternatively, or additionally, in some embodiments, one or more UI elements can be located at positions of the display 130 of the head-wearable device 110 such that they are not obstructing the user 115's field of view 105 (e.g., on a corner of the display 130).

In some embodiments, the wrist-wearable device 170 shown in FIG. 1A is configured to receive, via a user input, an opt-in instruction from the user 115 of the head-wearable device 110 to use the artificial-reality application to facilitate connecting the user 115 with other participating users. The opt-in instruction detected at the wrist-wearable device 170 can cause the head-wearable device 110 to present, via its display 130, the opt-in UI 104 as described above. In other words, the user 115 can provide the opt-in instruction to use the artificial-reality application to facilitate connecting the user 115 with other participating users from any device communicatively coupled with the head-wearable device 110.

Figure 1B:
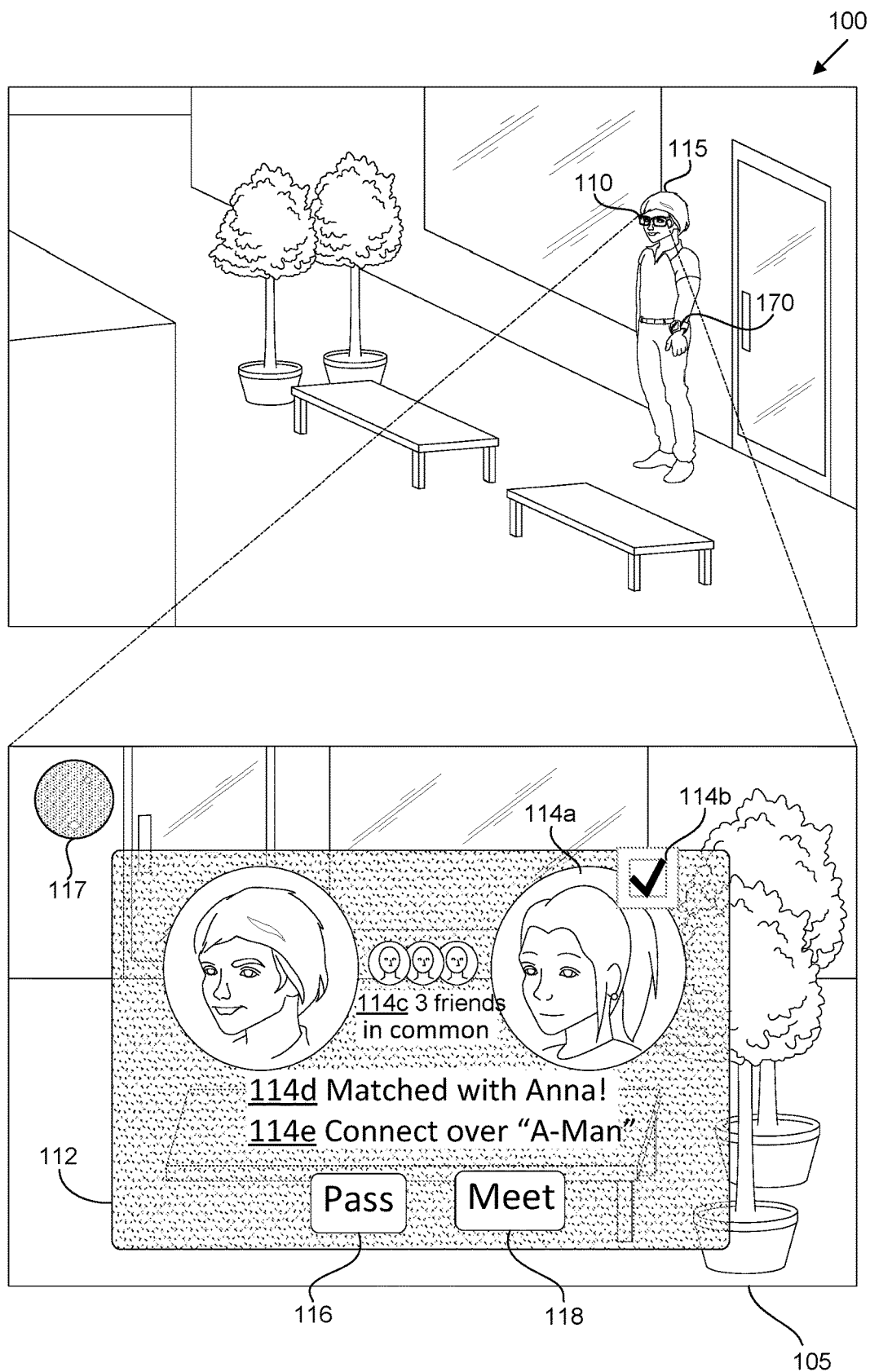

Turning now to FIG. 1B, a connection UI 112 is presented via the communicatively coupled display 130 of the head-wearable device 110. In some embodiments, the connection UI 112 is presented to the user 115 after the artificial-reality system 100 receives a (second) user input selecting the confirmation UI element 106 (e.g., a tap gesture directed to a simulated location of the confirmation UI element 106, detected in-air gesture selecting the confirmation UI element 106, or a voice command stating, "let the game begin!"). In this way, the user 115 is connected with other participating users that match the user 115's preferences (e.g., user-specific suggestion criteria and/or safety criteria). Alternatively, in some embodiments, the connection UI 112 is presented after receiving the initial user input (e.g., the tap gesture 102) to opt in to the artificial-reality activity, based on predefined user preferences or historical user preferences (e.g., preferences previously selected by the user 115).

The connection UI 112 includes one or more suggested users that satisfy user-specific suggestion criteria and that can be selected by the user 115 to meet (e.g., via a linking UI element 118; e.g., "meet"). The connection UI 112 includes one or more suggested user indication UI elements 114a-114e, which allow the user 115 to learn more about the suggested user that they can select to meet with. The connection UI 112 also includes UI elements for confirming to meet with the suggested user (e.g., the "meet" UI element 118) and for declining to meet with the suggested user (e.g., the "pass" UI element 113). As described above with respect to the opt-in UI 104, the connection UI 112 is presented to the user 115 via a display 130 communicatively coupled to the head-wearable device 110 without obstructing the user 115's field of view 105.

Non-limiting examples of the suggested user indication UI elements 114a-114e can include: a suggested user icon UI element 114a that corresponds to a matched suggested user (e.g., a profile image and/or username); a verification icon UI element 114b (e.g., appearing as a "check mark" above the suggested user icon UI element 114a) indicating that the suggested user has a verified account for the artificial-reality application to facilitate connecting the user with other participating users (or any other account associated with the artificial-reality application, such as a social media application, an e-mail address, a phone number etc.); a social connection UI element 114c indicating the shared connections between the user 115 and the suggested user (e.g., shared friends, shared colleagues, shared social-media contacts (e.g., in a social-media application, such as Facebook, Instagram, WhatsApp, etc.)); a similar or shared interest UI element 114e (e.g., appearing as "Connect Over A-MAN" text field); and a match indicator UI element 114d (e.g., a text field that states, "Matched with Anna!"). In some embodiments, the suggested user indication UI elements 114 can include additional information and/or one or more content items associated with a suggested user, including posts made by a suggested user, images shared by a suggested user, media consumed (e.g., movies, music, books, shows) and liked or disliked by a suggested user, and/or other data associated with at least one social media account of a suggested user. In some embodiments, to protect user information, information about the suggested user (e.g., images, posts, age, etc.) is redacted, such that the user and/or anyone using the artificial-reality application cannot use the data to determine an identity of the user 115 and/or any other user. In some embodiments, each user can specify the user privacy settings that allow the user to identify data that other users can see and/or grant permission to other users (e.g., friends, co-workers, and/or specifically identified users). While the user 115 can specify data that should be redacted or not viewed by others, some user data cannot be redacted for safety concerns of all users (e.g., a profile image, a username, a verification symbol).

In some embodiments, a suggested user is determined based on one or more user-specific suggestion criteria for the user 115 and a proximity (e.g., within a mile) of the suggested user in relation to the user 115. For example, a suggested user can be determined based on a participating user of the artificial-reality application satisfying a user-specific suggestion criterion for the user 115 (e.g., likes superheroes, shared hobby, etc.) and being within a predetermined radius of the user (e.g., within a 1-mile radius, 5-mile radius, etc.). In some embodiments, a suggested user is also determined based on a location of the user and participating user of the artificial-reality application, such as a (shared) common space with the user 115. In some embodiments, the common space is a region that has been approved for use in the artificial-reality application (e.g., a mall, a coffee shop, an amusement park, a stadium, etc.).

In some embodiments, the user-specific suggestion criteria include one or more of shared interests of the user 115 and one or more suggested user (e.g., hobbies, school, hometowns, movies, shows, friends, professions). In some embodiments, shared interests of the user 115 and the one or more suggested users are identified based on data from one or more social networks, applications, and/or user accounts linked or associated with the artificial-reality application (if user permission is granted). For example, the user-specific suggestion criteria can include one or more criterion based on both the user and the one or more suggested users having verified accounts on the same and/or similar social networks. In some embodiments, the user-specific suggestion criteria include a respective age threshold (e.g., the user 115 and a suggested user are within a predetermined age range (e.g., within 2 years, 5 years, 10 years)). In some embodiments, the user-specific suggestion criteria include more than one criterion type (e.g., a shared interest criterion type and a respective age criterion type, a food interest criterion type and an education criterion type, a profession criterion type and a background criterion type (e.g., home tome)). In some embodiments, the user-specific suggestion criteria include data about one criterion type from the user 115 and data about a different criterion type from the one or more suggested users (e.g., a profession for the user and an education for a suggested user, a hobby for the user and the suggested user's favorite food, etc.).

In some embodiments, the one or more user-specific suggestion criteria include an interaction or activity threshold distance (e.g., the artificial-reality activity is within fifteen to five hundred meters of the user 115). In some embodiments, the activity threshold distance is defined and/or configurable by the user 115 (e.g., via general settings UI element 103f in the opt-in UI 104). This can allow the user 115 specify how far they are willing to travel to meet with another participating user. Alternatively or additionally, in some embodiments, the activity threshold distance is predetermined, based, at least in part, on an allotted time that the user 115 wishes to engage in the artificial-reality activity (e.g., the time set at the allotted time UI element 103d). In some embodiments, the activity threshold distance is predetermined is based, at least in part, on physical characteristics of the user and/or one or more suggested users (e.g., average walking pace). In this way, users are not made uncomfortable by having to wait for one another or travel to locations that are too far or inaccessible to at least one user. In some embodiments, the user-specific suggestion criteria include a minimum shared interest threshold (e.g., a number of interests shared by the user 115 and a suggested user, such as at least one shared interest, three shared interests, or a user defined number of shared interest). In some embodiments, the user-specific suggestion criteria include a minimum shared-contacts threshold (e.g., a number of friends or contacts in common in associated social-media platforms, applications, stored contacts, and/or other user accounts (if user permission is granted and/or associated accounts are linked), such as at least one common contact, three common contacts, or a user defined number of shared contacts).

In some embodiments, a suggested user is determined based on one or more safety criteria (for the user 115). The safety criteria can include one or more of a minimum user rating for a suggested user (e.g., a suggested user is rated at least three out of five stars), and/or data about times the user 115 and/or one or more suggested users have previously been flagged or reported (e.g., as dangerous, annoying, offensive, and/or any other complaint) while participating in the artificial-reality activity (e.g., a suggested user has less than one complaint, a suggested user has no complaints for being violent, etc.). In some embodiments, satisfying the one or more safety criteria includes checking whether a name of the suggested user is associated with a blocked user account, determining whether an age of the suggested user is within an age threshold of the user, and verifying that the suggested user has authenticated account information. In some embodiments, the safety criteria include a number of participating users in proximity (e.g., within 15 meters) to the user 115 (e.g., at least two other participating users). In this way, the artificial-reality application presents suggested users that are in populated areas so that the user 115 can feel secure. In some embodiments, the safety criteria can also include location specific criteria, such as open business hours, minimum lighting conditions (e.g., business that are well lit and/or are not near dark alleys), public spaces (e.g., malls, coffee shops, libraries, etc.), a minimum amount of foot traffic (e.g., location frequented by at least one other user every hour, half hour, quarter hour), etc.

A suggested user can be determined based on at least one user-specific suggestion criterion and/or at least one safety criterion. Alternatively, in some embodiments, a suggested user is determined based on a plurality of user-specific suggestion criteria and/or a plurality of safety criteria. In some embodiments, a suggested user is determined based on a combination of the user-specific suggestion criteria and the safety criteria. As described above, the one or more user-specific suggestion criteria and/or the safety criteria can be defined by the user 115 via the opt-in UI 104 in FIG. 1A. The above examples of the user-specific suggestion criteria and safety criteria are non-exhaustive. Additional criteria can be defined by the user 115 and/or added over time.

A skilled artisan will appreciate that with respect to the methods described herein, not all the one or more suggested users are presented to the user 115 as suggested users for engaging in the artificial-reality activity. In some embodiments, as shown in the user 115's field of view 105, the artificial-reality application is configured to present a single suggested user at a time. In some embodiments the user 115 can provide a user input (e.g., a scroll gesture) to scroll between users that have been predetermined by the artificial-reality application to be suggested users. Alternatively, in some embodiments, as described below in reference to FIG. 4D, the artificial-reality application is configured to present a group activity including a plurality of suggested user at a time.

The artificial-reality system 100 also determines an artificial-reality activity that can be performed by the user 115 and a suggested user. In some embodiments, the artificial-reality activity is determined based on shared interests of the user 115 and one or more suggested users. For example, the artificial-reality activity can be identified based on games that both the user 115 and one or more suggested users have played recently. In some embodiments, the artificial-reality activity is determined based on the user-specific suggestion criteria. For example, the artificial-reality activity can be determined based on shared contacts between the user and one or more suggested users (e.g., a friendship quiz about mutual Facebook® friends). In some embodiments, the artificial-reality activity is determined based on the user 115 and the suggested user's age, medical conditions (e.g., allergies, disabilities, injuries, etc.), and/or other physical conditions (which are optionally provided by the respective user's) such that each user can participate in the artificial-reality activity (e.g., improving the accessibility for each user).

In some embodiments, the artificial-reality activity is determined based on a common locational relationship between the user and one or more suggested users. For example, the user and one or more suggested users may be within a geographic range associated with a particular professional sports team, and the artificial-reality activity may therefore be related to the professional sports team. In some embodiments, the artificial-reality activity is determined based on a location of significance, such as of an amusement park, a concert, a book signing, a sports stadium, and/or any other public events. For example, each of the user 115 and the suggested user can be located within a predetermined threshold distance of a location of significance and the artificial-reality activity (and the interactive-activity location) can be determined in part based on the location of significance. In some embodiments, contextual information about a location can be used to identify a location of significance. For example, contextual information such as one or more of scheduled events at a location, event descriptions, event publicity (e.g., reports or advertisements of an event), event exclusivity (e.g., private screening of a movie, outdoor screening of a movie, a public movie release), etc. can be used to identify a location of significance.

In some embodiments, any of the above factors may be considered in combination, and various weights may be placed on the any of the factors and/or on any combination of one or more factors. For example, in addition to being within a geographic range associated with a professional sports team, the user and one or more suggested users may have shared interests in the professional sports team based on social network data (e.g., Facebook®, Instagram®, etc.). In some embodiments, the user is presented with a selectable UI element providing an option for the user to select and/or suggest a different interactive-activity location (e.g., activity recommendation UI element 136; FIG. 1D). In some embodiments, the user 115 is presented with a selectable UI element providing an option for the user to reject the interactive-activity altogether (cancellation UI element 129; FIG. 1D).

In some embodiments, an artificial-reality activity can be updated as the user 115 and the suggested user travel to an interactive-activity location using captured or received image data. For example, as described below in reference to FIG. 1D, while the user 115 navigates toward the interactive-activity location, the head-wearable device 110 (and/or another communicatively coupled device with an imaging device 111, including the wrist-wearable device 170) can capture image data that is used to determine (or update) the artificial-reality activity (as well as the interactive-activity location). Alternatively, in some embodiments, the head-wearable device 110 (or the wrist-wearable device 170, or other intermediary device communicatively coupled to the head-wearable device 110) can receive image data from other users participating in the artificial-reality application and the receive image data is used to determine (or update) the artificial-reality activity (as well as the interactive-activity location). In some embodiments, the image data received from one or more other users is anonymized to prevent identification of the one or more other users. In some embodiments, additional image data collected outside of the application associated with the artificial-reality activity can be used to determine where interactive-activity locations should be assigned. For example, Instagram® data may indicate that a particular location near the user and one or more suggested users is ideal for photographs. The location can be selected as an interactive-activity location for the user and one or more suggested users in accordance with a determination that both the user and one or more suggested users are active on the same social-networking platform (e.g., Instagram®). In some embodiments, the artificial-reality application can prompt the user to take a photograph of one or more suggested users at the interactive-activity location as part of the artificial-reality activity.

In some embodiments, the interactive-activity location can be determined based on shared interests of the user and one or more suggested users. In some embodiments, the user-specific suggestion criteria include related interest data from at least one social graph associated with data of each of the user and one or more suggested users. In some embodiments, the related interest data from the at least one social graph is pseudonymized, such that the identities of the user and/or one or more suggested users remain anonymous. In some embodiments, data from at least one social graph is combined with data from other data sources, (e.g., point-of-sale data from a retail company and/or a quick-sale restaurant). In some embodiments, the user-specific suggestion criteria can be used to determine the interactive-activity location. For example, the user-specific suggestion criteria can include locational data that is used to determine that at least one artificial-reality activity location nearby corresponds to the related interest data.

In some embodiments, before an interactive-activity location is presented to the user 115 and/or suggested user, the artificial-reality system 100 can determine whether the interactive-activity location is a safe location, based on one or more safe-location criteria. The safe-location criteria can include an average number of people in proximity to the interactive-activity location during a predefined period of time, a lighting threshold for the interactive-activity location (e.g., are the streetlights on, does the location provide lighting, etc.), and previous activities that took place in proximity to the interactive-activity location. Proximity, in some embodiments, means within 3-5 meters of the artificial-reality activity. In some embodiments, additional security criteria can include one or more of previous reviews of a location (e.g., a restaurant, bookstore, arcade, stadium, etc.), reviews by friends who have visited a location, the number of images of the location (e.g., is it a popular destination that people capture moments at), etc.

In some embodiments, before presenting the connection UI 112 and before providing the "meet" UI element 118 for linking the user 115 and the suggested user, the opt-in instruction causes the head-wearable device 110 and/or another communicatively-coupled device (e.g., the wrist-wearable device 170) to determine that the suggested user satisfies the one or more safety criteria. Alternatively, in some embodiments, the head-wearable device 110 forgoes presenting the confirmation UI element 130 and/or disables selection of the confirmation UI element 130 until it is determined that the one or more safety criteria are satisfied.

In some embodiments, the head-wearable device 110 presents a mini-map UI element 117 in conjunction with the connection UI 112 and/or any of the other UIs described herein. The mini-map UI element 117 can include the user 115's current location with respect to an interactive-activity location at which an artificial-reality activity is to be performed by the user 115 and the suggested user. In some embodiments, if the user 115 and the suggested user agree to share their location information with one another, the mini-map UI element 117 can include the location of the user 115 and the suggested user within a common space where the artificial-reality activity is to be performed (e.g., a mall, or an amusement park). For example, the mini-map UI element 117 can indicate that the user 115 and the suggested user are both located within the mall, and/or within the same common space. In some embodiments, the user 115 and/or the suggested user's current location, if shared, are updated as the user 115 and/or the suggested user move. If either the user 115 and/or the suggested user refuse to share their location information, the mini-map UI element 117 will only include the particular user's location information with respect to an interactive-activity location at which an artificial-reality activity is to be performed. Alternatively, if either the user 115 and/or the suggested user refuse to share their location information, the mini-map UI element 117 will not be presented.

Figure 1C:
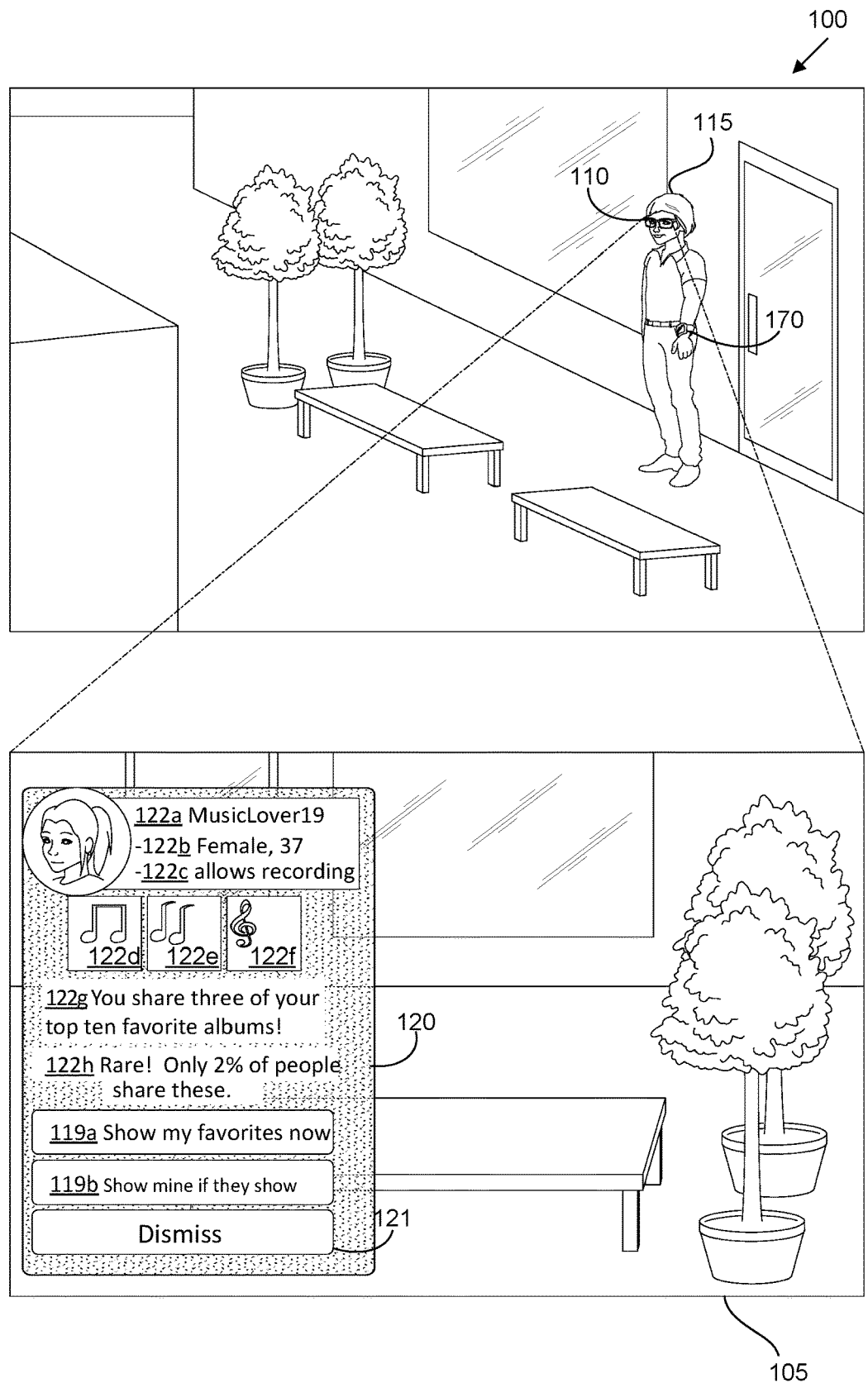
Figure 1D:
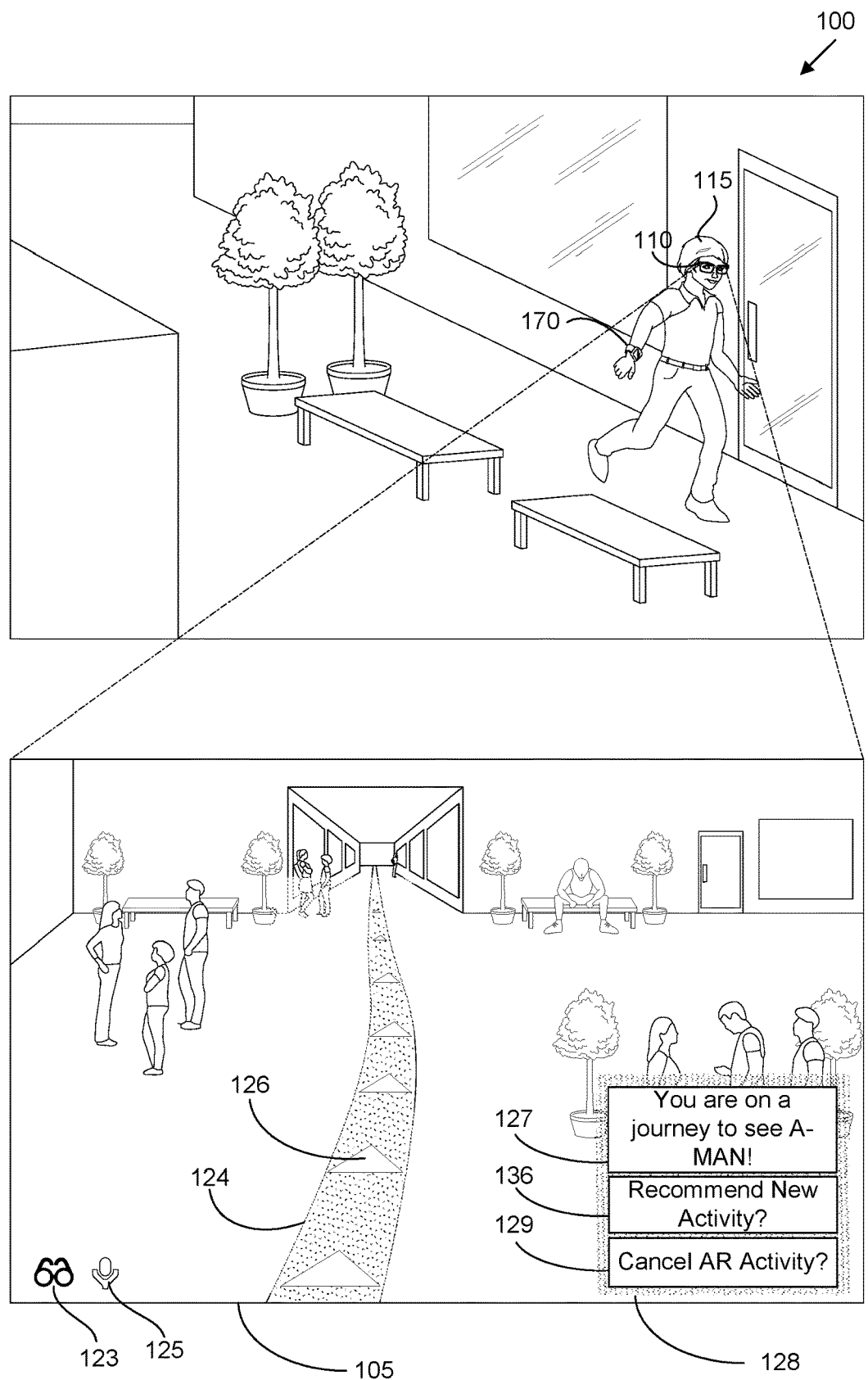

Turning now to FIG. 1C, a detailed profile UI 120 is presented via the communicatively coupled display 130 of the head-wearable device 110. In some embodiments, the detailed profile UI 120 is presented to the user 115 after the user 115 has selected the "meet" UI element 118 and has begun navigating to the interactive-activity location. Alternatively, in some embodiments, the detailed profile UI 120 is presented to the user 115 after the user 115 has selected the suggested user icon UI element 114*a* in FIG. 1B (and/or another UI element that allows the user 115 to request additional information on a suggested user). The detailed profile UI 120 includes detailed profile information UI elements 122*a*-122*h*, interest sharing UI elements 119*a* and 119*b*, a dismiss UI element 121. The detailed profile UI 120 can include additional UI elements that provide additional information about the suggested user that are not shown in FIG. 1C. For example, the detailed profile UI 120 can include UI elements providing additional information on the suggested user's education, hometown, career, hobbies, favorite games, and/or criteria for determining a suggested user described above in reference to FIG. 1B.

The detailed profile information UI elements 122*a*-122*h* provide additional information about the suggested user and/or the artificial-reality activity. The detailed profile information UI elements 122*a*-122*h* can optionally be selectable by the user 115 to display detailed information on content associated with the selected detailed profile information UI element for the suggested user. For example, selection of a shared rarity detailed profile information UI element 122*h* causes the head-wearable device 110 to present additional statistics on the commonality of the shared interest. The additional statistics can include one or more line graphs, plots, tables, pie charts, bar graphs, or other data graphs or tables.

Non-limiting examples of the detailed profile information UI elements 122 include: a profile name detailed profile information UI element 122*a* displaying a profile name of the suggested user (e.g., "MusicLover19"), one or more bio detailed profile information UI elements 122*b* for displaying biographical information about the suggested user (e.g., the gender and/or age of the suggested user); a recording verification detailed profile information UI element 122c specifying whether the suggested user has specified that they allow for recording during the interactive activity. The detailed profile UI 120 can also include one or more similar or shared interest detailed profile information UI elements 122d-122f specifying one or more favorite activities and/or shared interests of the user and the suggested user. The detailed profile information UI elements can include textual UI elements, such as the shared rarity detailed profile information UI element 122h and a shared interest detailed profile information UI element 122g. The textual UI elements (e.g., 122g-122h) display textual information about the suggested user's interests and/or information about shared interests of the user 115 and the suggested user.

The interest sharing UI elements 119a and 119b allow the user 115 to quickly share interest with the suggested user. For example, selection of the "Show my favorites now" interest sharing UI element 119a causes the user 115's favorites (e.g., movies, shows, games, music, etc.) to be shared with the suggested user, and selection of the "Show mine if they show" interest sharing UI element 119b causes the user 115's favorites to be shared with the suggested user after the suggested user has shared their favorites (e.g., a mutual-sharing option for either the user 115 or the suggested user to see the others' favorites and/or shared interests). In some embodiments, the user 115 can specify the information that they would like to share with the suggested user. For example, the user can specify a particular show, song, image, and/or other media content they would like to share with the suggested user.

The dismiss UI element 121 closes or otherwise minimizes the detailed profile UI 120 from the user's 115 field of view 105. In some embodiments, selection of the dismiss UI element 121 causes the head-wearable device 110 to display the connection UI 112 (FIG. 1B).

In FIG. 1D, the head-wearable device 110 presents visual-guidance UI elements (e.g., a visual path guidance UI element 124) while the user 115 navigates to the interactive-activity location. The one or more visual-guidance UI elements indicate a path for the user 115 to follow towards the interactive-activity location. For example, the user 115's field of view 105, as presented via the display 130 of the head-wearable device 110, displays the visual path guidance UI element 124 provided to guide the user 115 toward the interactive-activity location. In some embodiments, the one or more visual-guidance UI elements are provided to the user 115 in response to a detected selection of a UI element for linking the suggested user with the user 115 (e.g., selection of the linking UI element 118; FIG. 1B). In some embodiments, the head-wearable device 110 provides the one or more visual-guidance UI elements to navigate the user 115 automatically, without further instructions from the user 115.

In some embodiments, the visual path guidance UI element 124 additionally includes navigational arrow UI elements 126 (e.g., part of the visual path guidance UI element 124, or as an additional overlay). The navigational arrow UI elements 126 can specify a direction that the user 115 should travel to reach the interactive-activity location. In some embodiments, the navigational arrow UI elements 126 are displayed by the head-wearable device 110 so as to appear on the ground, floor, or a representative surface plane that the user 115 is standing on, and face in a direction that the user 115 can travel in to arrive at the interactive-activity location. In some embodiments, the visual path guidance UI element 124 and/or the navigational arrow UI elements 126 have display properties related to the type of artificial-reality activity to be performed at the interactive-activity location. For example, the artificial-reality activity can be related to the superhero, "A MAN," and either the visual-path guidance UI element 124 or the navigational arrow UI elements 126 can include display properties related to a superpower of "A MAN" (e.g., superpower colors, animations, effects). In some embodiments, the visual path guidance UI element 124 and/or one or more of the navigational arrow UI elements 126 are animated, for example, to further identify the suggested direction of travel for the user 115 to reach the interactive-activity location. In some embodiments, they are animated based on a theme of the artificial-reality activity which can be based on shared or similar interests of the user 115 and the suggested user. Additionally or alternatively, in some embodiments, the head-wearable device 110 (or other communicatively coupled device with a speaker) provides auditory guidance to the user 115 (e.g., turn by turn directions).

In some embodiments, while the user 115 is navigating toward the interactive-activity location, the head-wearable device 110 (and/or another communicatively coupled device with an imaging device 111, including the wrist-wearable device 170) can capture image data. Additionally or alternatively, in some embodiments, while the user 115 is navigating toward the interactive-activity location, the head-wearable device 110 (and/or another communicatively coupled device with a microphone, including the wrist-wearable device 170) can capture audio data. Imaging data and/or audio data can be captured if the user 115 and/or the suggested user allowed for recordings (e.g., via the opt-in UI 104; FIG. 1A). The head-wearable device 110 can present additional UI elements to notify the user 115 that image data and/or audio data is being captured. For example, as shown in FIG. 1D, the head-wearable device 110 presents (in the user 115's field of view 105) an active imaging device UI element 123 (e.g., a "glasses" icon, or a "camera recording" icon) and an active audio device UI element 125 (e.g., a microphone icon) indicating that peripheral devices at the head-wearable device 110, the wrist-wearable device 170, or another device that is communicatively coupled to the head-wearable device 110 are active or otherwise collecting imaging data and/or audio data as the user 115 navigates toward the interactive-activity location.

Figure 1E:
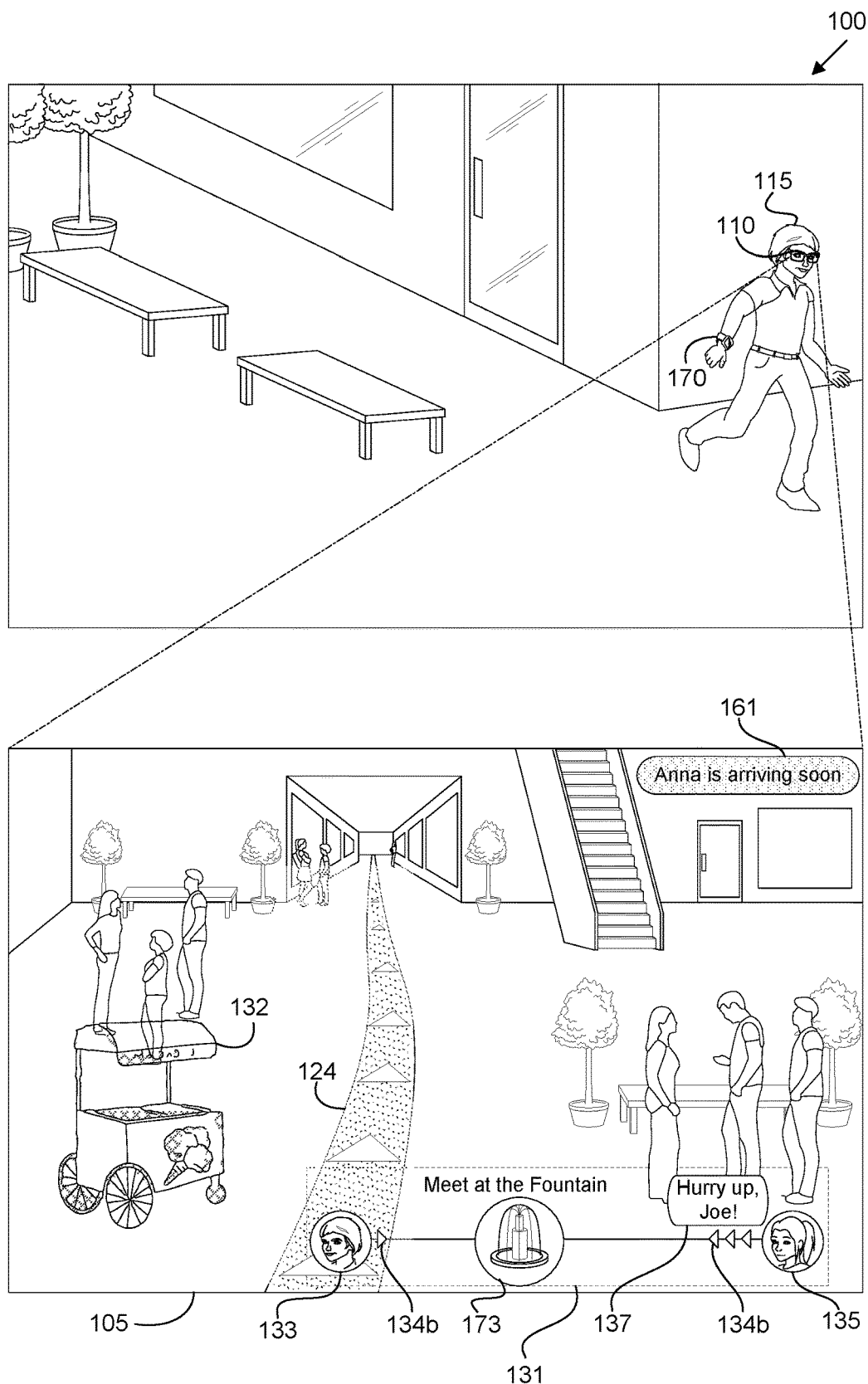

In some embodiments, the head-wearable device 110 or another connected device captures imaging data while the user 115 navigates from a respective starting location to the interactive-activity location. As described above in reference to FIG. 1B, the image data captured by the head-wearable device 110 can be provided to another device for use in suggesting another interactive-activity location to another user participating in the artificial-reality application. Similarly, image data received from other users participating in the artificial-reality application can be used to update an artificial-reality activity or provide an additional artificial-reality activity. The imaging data can be used to facilitate connections between users of different head-wearable devices as described above in reference to FIG. 1B. For example, when the user 115 navigates to the interactive-activity location (as shown in FIGS. 1D-1E), the imaging device 111 at the head-wearable device 110 can capture imaging data about an intermediate location along the path between a starting location of the user 115 and the interactive-activity location and can determine that a lighting value of the intermediate location, an average amount of other people in the intermediate location (e.g., foot traffic), and/or safety criteria, and/or other relevant criteria (e.g., user-specific suggesting criteria) tend to make the intermediate location a suitable interactive-activity location for other users. In some embodiments, a scoring system is used to rank potential interactive-activity locations to present to users (including such intermediate locations).

The head-wearable device 110 can, in addition to providing the visual path guidance UI element 124, presents information about the artificial-reality activity to be performed by the user 115 and the suggested user. For example, the user 115's field of view 105 displays an interactive-activity UI 128 including an interactive activity informational UI element 127 with descriptive text of the interactive activity (e.g., "You are on a journey to see A-MAN!"). For example, in FIG. 1D, A-MAN is a shared interest of the user 115 and the suggested user. Alternatively or additionally, in some embodiments, A-MAN is a similar interest (e.g., an interest that is liked by at least one user and tangentially related to an interest of the other user). The interactive-activity UI 128 can also include an activity recommendation UI element 136 and cancellation UI element 129. The activity recommendation UI element 136, when selected by the user 115, allows the user to propose a new interactive activity or receive additional interactive activity suggestions. User selection of the cancellation UI element 129 allows the user 115 to cancel the artificial-reality activity before reaching the interactive-activity location.

Turning now to FIG. 1E, the head-wearable device 110 can present a variety of UI elements, including virtual objects and UI elements while the user 115 and/or the suggested user are navigating toward the interactive-activity location. For example, the user 115's field of view 105 continues to display the visual path guidance UI element 124 discussed previously with respect to FIG. 1D, as well as a progress indicator UI element 131, which provides an indication of the user 115's and the suggested user's progress towards reaching the interactive-activity location (represented by the fountain UI element 173). Specifically, the field of view 105 shows the progress indicator UI element 131 that includes a user progress UI element 133, and a suggested user progress UI element 135, indicating each users' relative distances from the interactive-activity location, and/or speeds towards the interactive-activity location (e.g., respective progress arrow UI elements 134a and 134b indicating the relative speed at which the user 115 and the suggested user are approaching the interactive-activity location, respectively (e.g., a single arrow representing slower movement relative to three arrows, which represent faster movement)). In some embodiments, a notification can indicate to the user 115 that the suggested user has stopped moving toward the interactive-activity location or has quit participating in the artificial-reality activity (e.g., a progress arrow UI elements turning into a square (indicating stop) or a text UI element indicating that the suggested user quit).

In some embodiments, in addition to or alternatively to displaying the progress indicator UI element 131, the head-wearable device 110 can present a notification or other electronic message informing the user 115 that the suggested user is about to arrive at the interactive-activity location (e.g., notification UI element 161 including text message "Anna is arriving soon"). In some embodiments the user 115 and the suggested user can send electronic messages to each other while they are navigating to the interactive-activity location. The messages can be displayed in or near the progress indicator UI element 131 (e.g., a progress message 137 is displayed in the progress indicator UI element 131 that states "Hurry up, Joe!") and/or at any position in the user 115's field of view 105.

Figure 7:
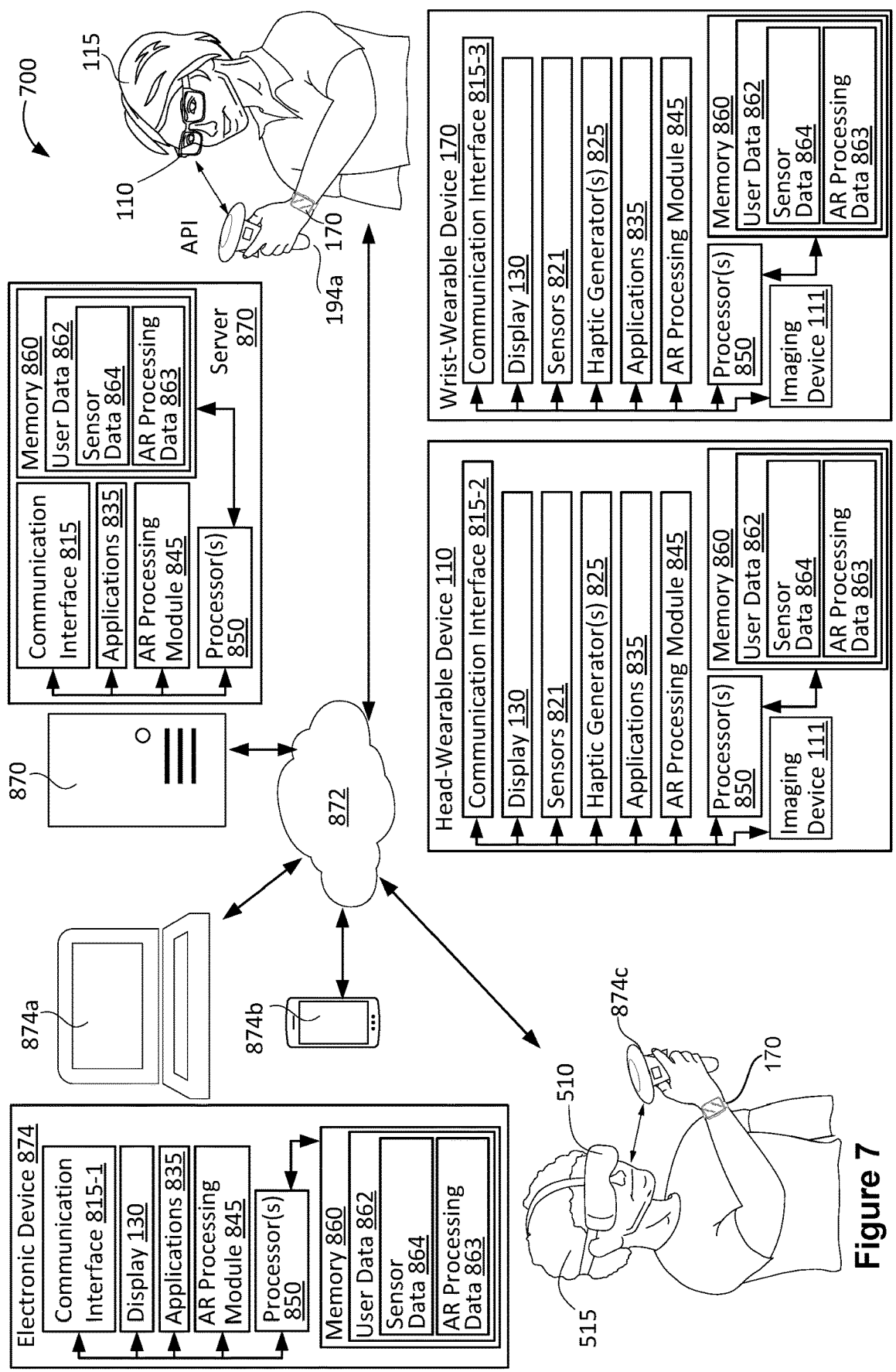
FIG. 7 illustrates a system of one or more devices for facilitating an interactive artificial-reality activity in an artificial-reality environment, in accordance with some embodiments.

In some embodiments, the head-wearable device 110 can also display virtual objects (e.g., a treat machine virtual object 132) near the visual path guidance UI element 124. In some embodiments, the user 115 can interact with the virtual object 132. For example, the user 115 can lift virtual handles attached to the treat machine virtual object 132 and simulate pushing the treat machine virtual object 132 across the physical environment while the wheels of the treat machine virtual object 132 simulate spinning of physical wheels. For example, the head-wearable device 110 can play different sounds (via communicatively coupled speakers) as user 115 pushes the treat machine virtual object 132, generate different haptic responses (via one or more communicatively haptic generators 825; FIG. 7) as user 115 pushes the treat machine virtual object 132 (e.g., different vibrations and/or senses that simulate the movement of a physical cart), and/or simulate the sensation of pushing a physical cart via one or more communicatively coupled devices (e.g., feelings of weight as the treat machine virtual object 132 is pushed up an incline, vibrations as the treat machine virtual object 132 is pushed up an escalator, etc.). Other users within physical proximity (e.g., five to fifteen meters) of the user 115 (and participating in the artificial-reality application that facilitates user connections), in some embodiments, can see the virtual objects presented to the user 115 via their respective head-wearable devices. For example, other users participating in the artificial-reality application can see the user 115 interacting with the treat machine virtual object 132.

In some embodiments, virtual objects of the artificial-reality environment implement aspects of the physical environment. For example, the treat machine virtual object 132 can be adjacent to or superimposed over a ticket vending machine that allows the user 115 to grab a treat ticket from the treat machine virtual object 132 location, which can be used as part of the interactive-activity location (e.g., if the user 115 brings the treat ticket to the interactive-activity location they can receive a discount or a free sample from nearby merchants). When the user 115 arrives at the interactive activity location, the user 115 can share the treat ticket with the suggested user (e.g., such that each user can redeem the treat ticket at the interactive-activity location (e.g., a coffee shop within a mall)). In some embodiments, the treat ticket can be a virtual ticket that is stored in a virtual wallet or other storage component of the head-wearable device 110 or other communicatively coupled device. In this way, the virtual objects presented to the user 115 via the head-wearable device 110 can be used to further improve or increase user interaction with their surrounding environment.

Figure 1F:
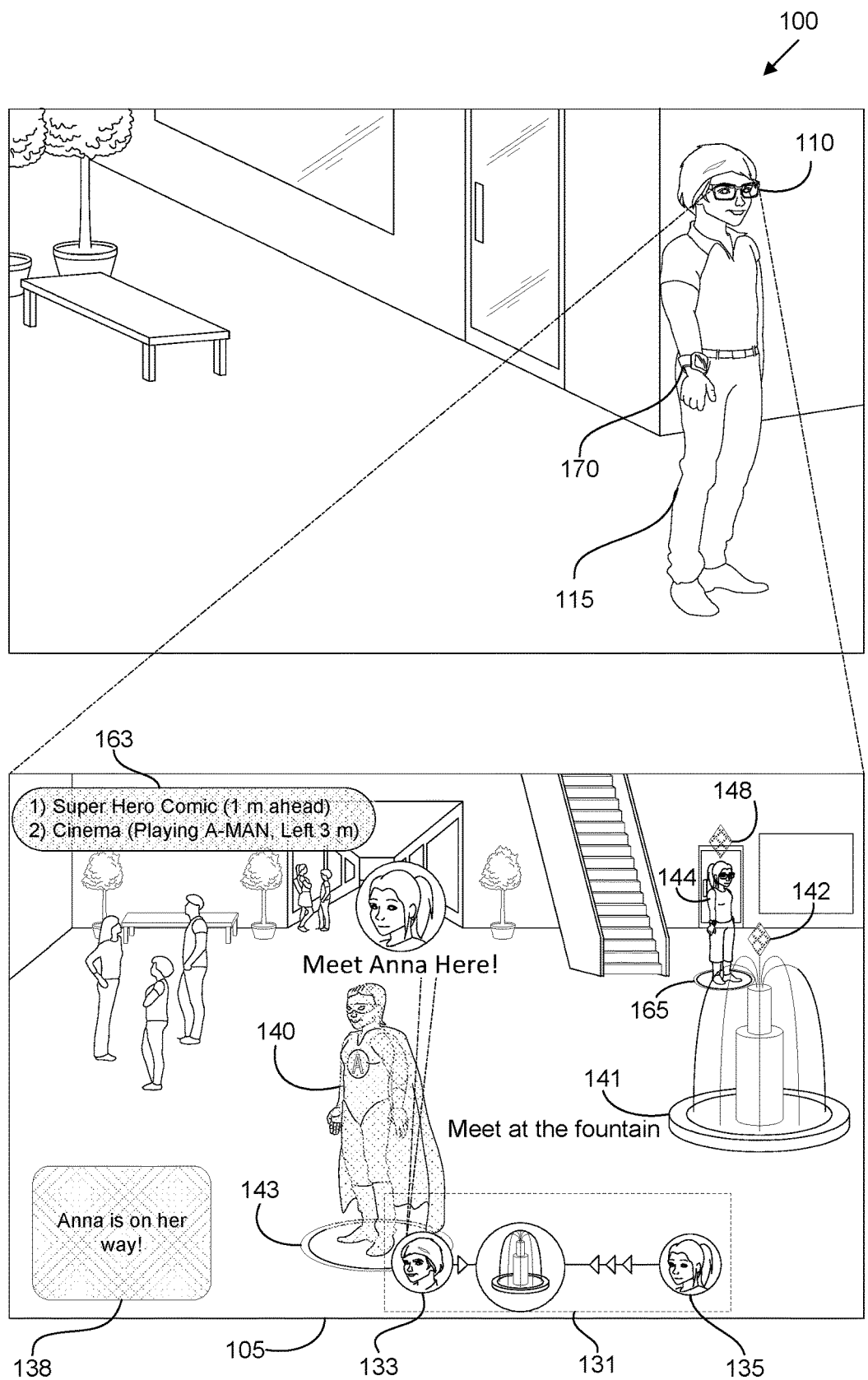

FIG. 1F shows additional UI elements presented by the head-wearable device 110, including virtual objects, as the user 115 approaches the interactive activity location. For example, the head-wearable device 110 can display a shared interest virtual object 140 (e.g., an A-MAN statue) related to a shared interest of the user 115 and the suggested user. In some embodiments, the shared interest virtual object 140 can include a circular indicator UI element 143 under the shared interest virtual object 140 (e.g., at a base of the shared interest virtual object 140 or on the ground at the shared interest virtual object 140) which allows the user 115 to locate and identify the interactive activity location and the artificial-reality activity. Similarly, in some embodiments, the head-wearable device 110 presents a circular indicator UI element 165 under the suggested user 144 (e.g., at the suggested user 144'2 feet) to allow the user 115 easily locate and identify the suggested user 144. Alternatively or in addition, in some embodiments, the head-wearable device 110 presents a diamond indicator UI element 142 over the shared interest virtual object 140 and/or a physical object corresponding to the interactive activity location (e.g., a fountain 141), as well as a respective diamond indicator UI element 148 above the suggested user 144. The diamond indicator UI elements 142 and 148 are just one example of an alternative UI element for indicating the interactive-activity location and the suggested user 144 to the user 115.

In some embodiments, the user 115 can select the shared interest virtual object 140 by performing a gesture that is detectable by one or more of the head-wearable device 110, the wrist-wearable device 170, and/or another connected device (e.g., a portable computing device). Based on the user 115 performing the detectable gesture directed to the shared interest virtual object 140, the head-wearable device 110 can be configured to display additional information related to the shared interest virtual object 140 or the related shared interest between the user 115 and the suggested user. For example, the head-wearable device 110 can display a UI (e.g., location of significance UI 163) that includes a list of nearby locations (e.g., in a common space associated with the interactive-activity location) where the user 115 can purchase items or otherwise have an experience related to the shared interest (e.g., the head-wearable device 110 can display an advertisement for a nearby store that sells "A-MAN" comic books or direct the user 115 to a movie theatre playing an A-MAN movie).

As indicated by FIGS. 1E-1F, the progress indicator UI element 131 can be adjusted to indicate new locations and speeds of the user 115 and the suggested user toward the interactive-activity location. In some embodiments, the user 115 is presented, via the head-wearable device 111, a suggested user progress alert UI element 138 indicating the suggested user's current progress towards the interactive-activity location. For example, as shown in FIG. 1F the suggested user progress alert UI element 138 (stating "Anna is on her way!"), is presented to the user 115, via the head-wearable device 110, while they wait for the suggested user to reach the interactive activity location. In some embodiments, if the artificial-reality application determines that the suggested user is not progressing towards the interactive-activity location, the artificial-reality system 100 can display a UI element allowing the user 115 to cancel the artificial-reality activity or request an update from the suggested user.

To further improve safety, the head-wearable device 110 (and/or other communicatively coupled device) can capture image data and/or audio data of a portion of the artificial-reality activity between the user and the suggested user, which is encrypted and temporarily stored. In some embodiments, the initial interaction (e.g., first one to five minutes) between the user 115 and the suggested user 144 is captured by the head-wearable device 110 (or communicatively coupled imaging device 111 and microphone) to respect the users privacy. This data is not accessible by either the user 115 and/or the suggested user and stored for a predetermined period of time (e.g., less than 24 hours). In some embodiments, the captured image data and/or audio data is sent to a remote server and can optionally be reviewed to determine whether a safety action needs to be performed with respect to the artificial-reality activity. In some embodiments, the captured image data and/or video data are deleted from the head-wearable device 110 (or other communicatively coupled device) after the captured image data and/or audio data are uploaded to a remote server. In some embodiments, the safety action to be performed includes flagging the interactive-activity location as an unsafe location or that one of the users is a dangerous user. In some embodiments, the one or more sensors of the head-wearable device are also caused to capture sensor data during the artificial-reality activity. In some embodiments, additional steps can be taken with respect to the recording to comply with relevant data privacy and/or laws, regulations, and best practices.

A skilled artisan will appreciate that in some embodiments, such additional steps can be jurisdictionally-dependent and can change from time to time in accordance with changes in laws and regulations (e.g., by way of software updates). As described above in reference to FIG. 1A, if the user 115 and the suggested user 144 allow for recording, the head-wearable device 110 (or communicatively coupled imaging device 111 and microphone) captures the entire interaction.

Figure 1G:
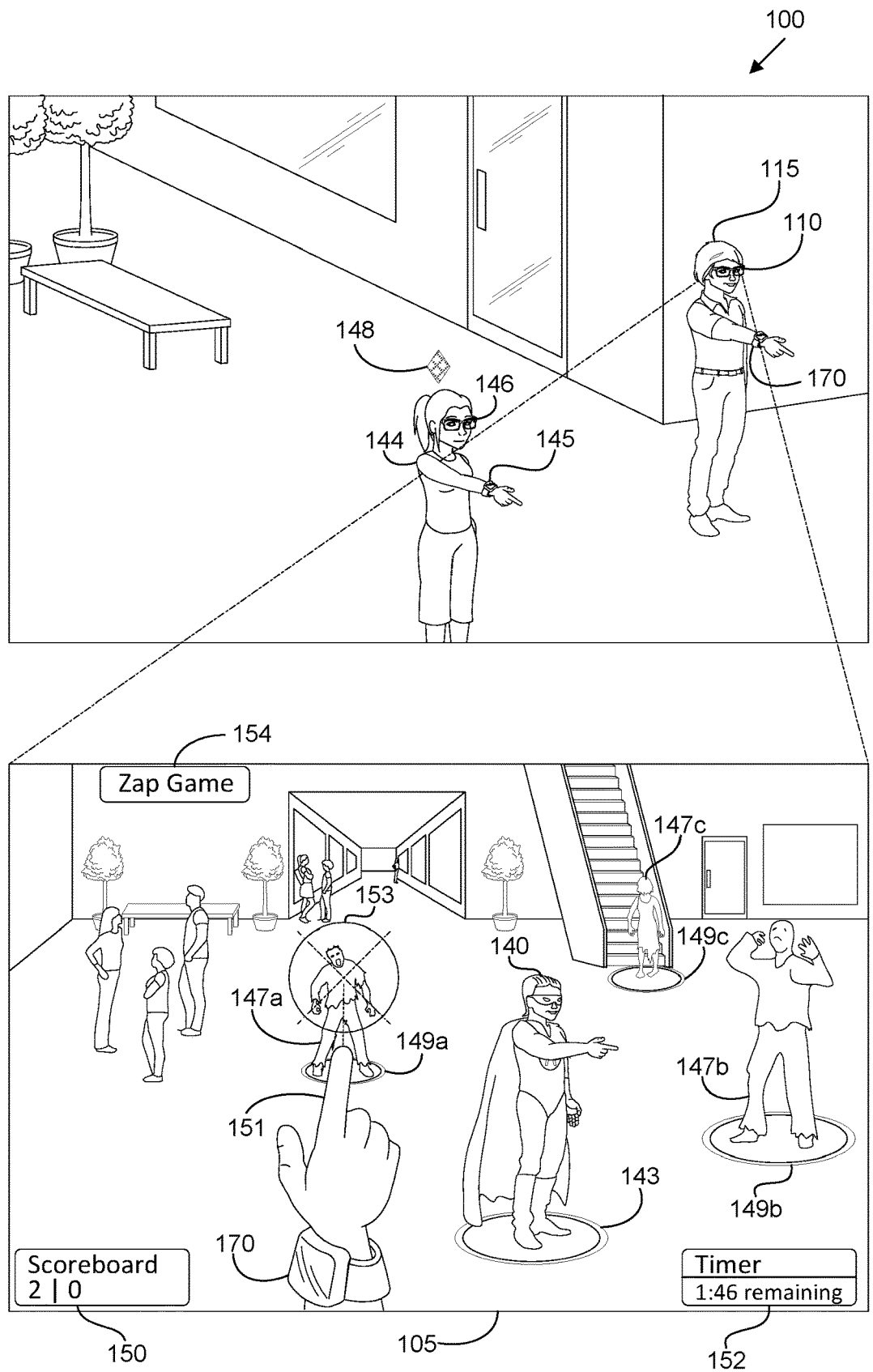

FIG. 1G, illustrates the user 115 and the suggested user 144 participating in the artificial-reality activity, in accordance with some embodiments. In particular, the user 115 and the suggested user 144 have both arrived at the interactive-activity location and initiated the artificial-reality activity. Alternatively, in some embodiments, the artificial-reality activity is automatically initiated when the user 115 and the suggested 144 are in proximity to one another (e.g., within five meters). The artificial-reality application is presented to each user via their respective head-wearable device 110 and synchronized such that each user is presented with the same information. For example, as shown in FIG. 1G, the user 115's head-wearable device 110 and the suggested user 144's head-wearable device 146 display the same virtual objects and virtual effects (e.g., zap game effects as described below in reference to FIGS. 1G and 1H), and/or similar UI elements shown in their respective expanded field of views 105. In some embodiments the user 115 and/or the suggested user 144 can adjust settings of the artificial-reality application to personalize the display of UI elements, including UI elements and virtual objects, displayed by their respective head-wearable devices. For example, the user 115 can reduce the effects of the suggested user 144's virtual effects to improve their own visibility (while the information presented to the suggested user is unchanged).

As shown in the user 115's field of view 105 in FIG. 1G, when the artificial-reality activity begins at the interactive-activity location, various UI elements, including UI elements and/or virtual objects, can be presented by the head-wearable device. For example, an informational title UI element 154 can be displayed to provide context as to what artificial-reality activity is being performed (e.g., "Zap Game," a type of minigame). In some embodiments, in conjunction with or before the head-wearable device 110 displays the informational title UI element 154, the head-wearable device 110 can display an animated countdown (e.g., 5 . . . 4 . . . 3 . . . 2 . . . 1 . . . ) to indicate to the user 115 and/or the suggested user 144 that the artificial-reality activity is about to begin. In some embodiments, the artificial-reality activity is configured to be active for a predetermined period of time (e.g., one minute, two minutes, five minutes, etc.).

Additionally, or alternatively, various game control information can be presented via the head-wearable device 110, such as the activity scoreboard UI element 150 and the activity time UI element 152. In some embodiments, the shared interest virtual object 140 (which can be continuously displayed during the artificial-reality activity) can also interact with the artificial-reality activity, by for example, saying a popular catch phrase that relates to the performance of the artificial-reality activity (e.g., "Let's go zap 'em, team!"). As part of the artificial-reality activity, various activity-related virtual objects can be displayed for the user 115 and the suggested user 144 to interact with through the performance of the artificial-reality activity. For example, as shown in FIG. 1G, various zombie virtual objects 147a-147c, which each have respective circular indicator UI elements 149a-149c, to indicate that they are part of the artificial-reality activity.

In some embodiments, sensors at the wrist-wearable device 170 and/or the head-wearable device 110 can detect a user gesture, for example, a point gesture 151 directed to one of the virtual zombie objects (e.g., the zombie virtual object 147a), and the user gesture, when detected, results in instructions being provided to the head-wearable device 110 that cause the head-wearable device 110 to update the display based on the user gesture 152 directed to the zombie virtual object 147a (e.g., moving a focus selector, UI element 176, in accordance with detecting the directed point gesture 151 from sensors of the wrist-wearable device 170 and/or the head-wearable device 110).

Figure 1H:
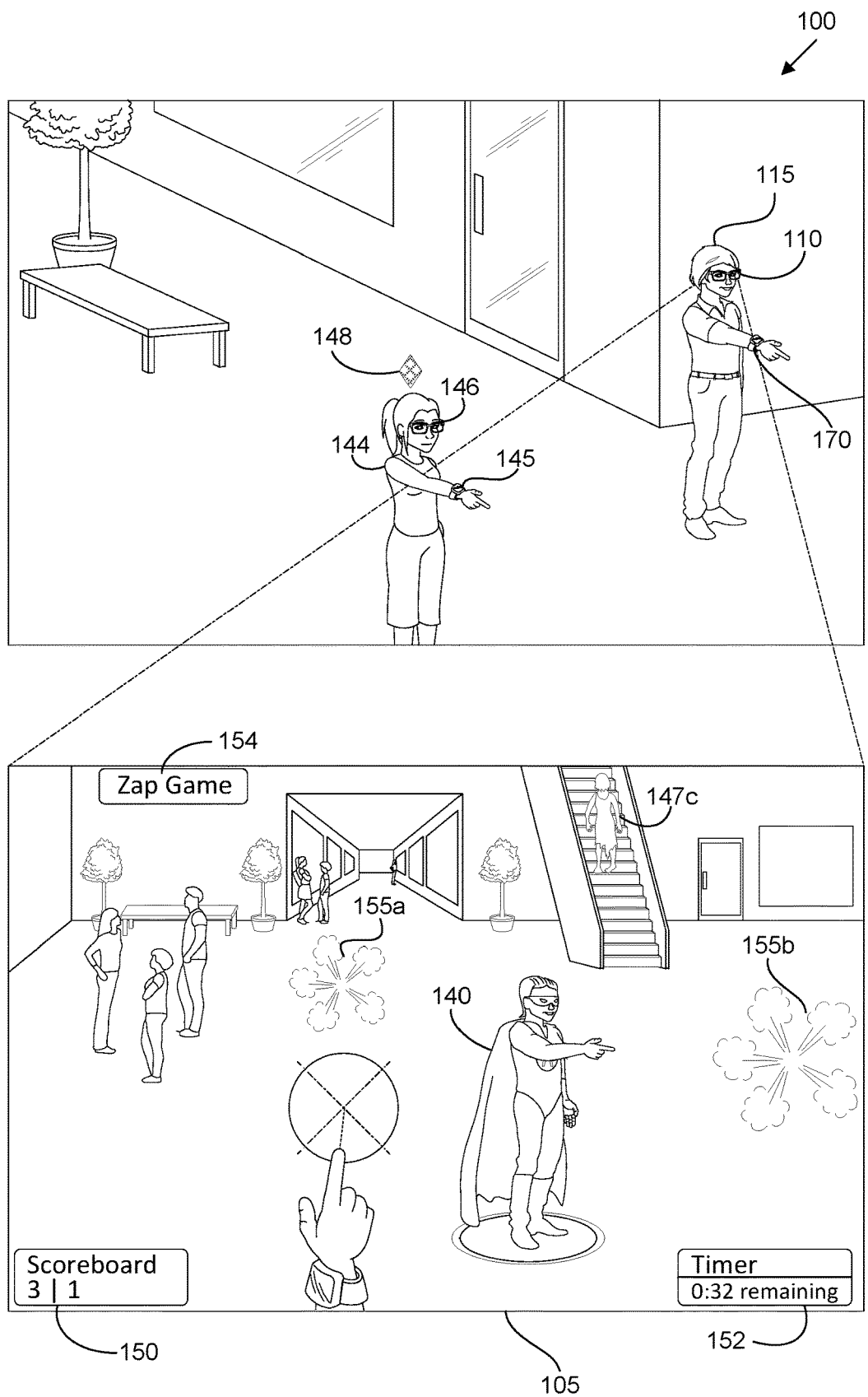

FIG. 1H illustrates the display at the head-wearable device 110 being updated as the user 115 and the suggested user 144 interact with the artificial-reality activity. In some embodiments, as shown in the expanded field of view 105, the display of virtual objects at the head-wearable device 110 and the suggested user 144's head-wearable device 146 can be adjusted in accordance with the user 115 and/or the suggested user 144 performing user gestures (e.g., the directed point gesture 151 in FIG. 1G) directed to the virtual objects. Specifically, in FIG. 1H, the zombie virtual objects 147a and 147b can be replaced by gust virtual objects 155a and 155b (e.g., zap game effects) after the user 115 and/or the suggested user 144 perform gestures directed to the zombie virtual objects 147a and 147b. Additionally, or alternatively, the virtual objects involved in the artificial-reality activity can change locations based on the performance of the artificial-reality activity and can also interact with physical features of the user 115's physical environment. For example, as shown in the user 115's field of view 105, the zombie virtual object 147c is moving up a physical escalator in the user 115's physical environment. In some embodiments the activity scoreboard UI element 150 showing the activity scores for the user 115 and the suggested user 144 for the artificial-reality activity is also updated in accordance with adjusting the display of the zombie virtual objects 147a and 147b.

Figure 1I:
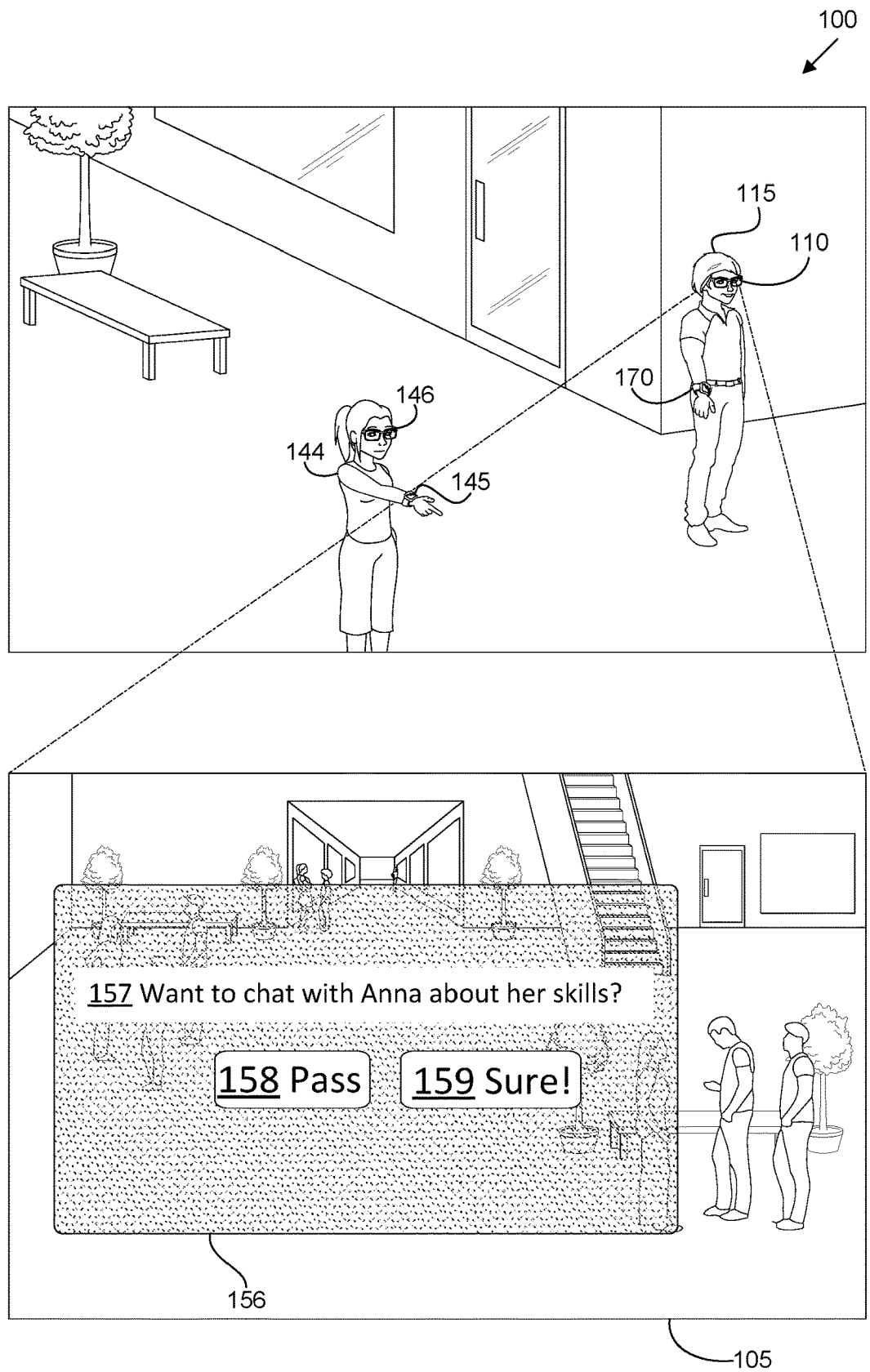

FIG. 1I illustrates a prompt presented by the head-wearable device 110 for initiating a message thread between the user 115 and the suggested user 144. The prompt can be presented to the user 115 after the user 115 participates in the artificial-reality activity (e.g., after the artificial-reality activity ends, which can be manually ended by the user 115 and/or the suggested user 144, or automatically ended by the user 115 and/or suggested user 144 walking away predetermined distance from one another (e.g., three to five meters), a predetermined time period (e.g., at least 10 minutes after initiation of the artificial-reality activity), or a decided outcome of the artificial-reality activity (e.g., a winner and loser are identified)). In some embodiments, as shown by the expanded field of view 105, after the user 115 and/or the suggested user 144 complete the artificial-reality activity at the interactive-activity location, the head-wearable device 110 displays a message prompt UI 156, prompting the user 115 to send an electronic message to the suggested user 144. In some embodiments, the option to generate the electronic message is presented upon initiation or completion of performance of the artificial-reality activity. The message prompt UI 156 can also include a confirmation UI element 158 for confirming that the user 115 would like to start a message thread with the suggested user 144. And the message prompt UI 156 can also include a decline UI element 159 for declining to start a message thread with the suggested user 144. The message prompt UI 156 can also include a message prompt UI element 157 with information about starting the message thread with the suggested user 144.

Figure 1J:
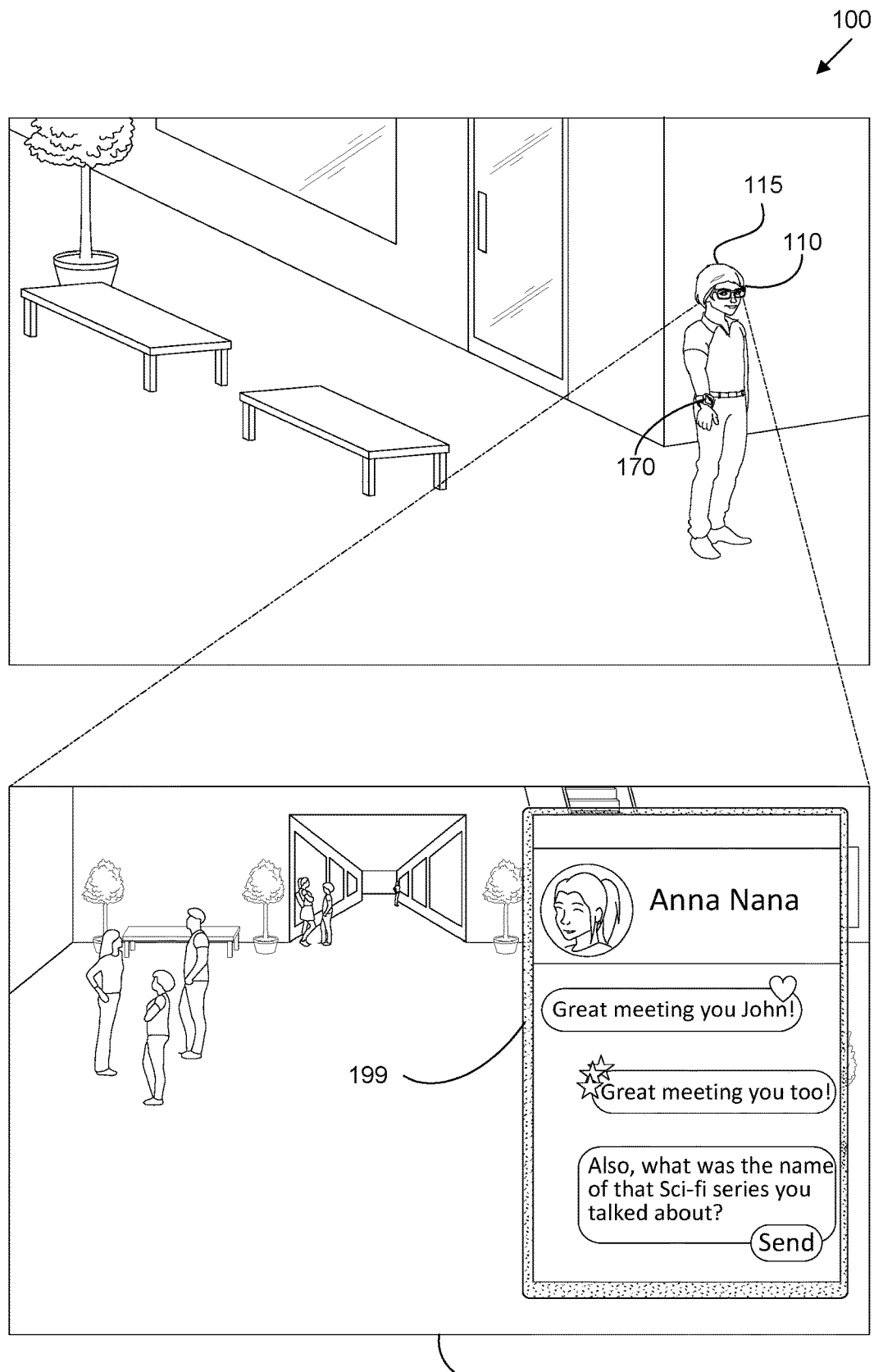

FIG. 1J illustrates the user 115 wearing the head-wearable device 110 interacting with a message-thread generated in FIG. 1I. For example, responsive to the user 115 confirming, via the message prompt UI 156, that they would like to send an electronic message to the suggested user 144, the head-wearable device 110 and/or another device communicatively coupled with the head-wearable device 110 (e.g., wrist-wearable device 170) initiate a message thread with the suggested user 144 (as shown by message-thread UI 199). As shown in the expanded field of view 105, the message-thread UI 199 can include a thread of messages (e.g. sent and received messages) between the user 115 and the suggested user 144. In some embodiments, the message-thread UI 199 is part of the artificial-reality application. Alternatively, in some embodiments, the message-thread UI 199 is part of another application stored in memory the head-wearable device 110 or other device communicatively coupled with the head-wearable device 110. In some embodiments, the electronic message is to be delivered in a message thread of a messaging application distinct from the artificial-reality application (e.g., Messenger, WhatsApp, etc.).

FIGS. 2A-2E illustrate an artificial-reality application facilitating an interactive artificial-reality activity in a virtual-reality environment, in accordance with some embodiments. In FIGS. 2A-2E, the user 115 is wearing a head-wearable device 510 configured to display a VR environment. The processes, devices, and sequences described with respect to FIGS. 2A-2E can include one or more of the processes, devices, and sequences described above with respect to FIGS. 1A-1J. A skilled artisan will appreciate that in some embodiments, the artificial-reality application can be used in a virtual-reality environment, rather than the augmented-reality environment described above with respect to FIGS. 1A-1J. In some embodiments, the interactive-activity location is a virtual location in a virtual-reality environment, and the artificial-reality activity is an interaction that takes place at the virtual location.

In some embodiments, the head-wearable device 510 is a VR headset configured to display a VR environment. The head-wearable device 510 is analogous to the head-wearable device 110 described with respect to FIGS. 1A-1J. The head-wearable device 510 is configured to perform one or more operations described above in reference to FIGS. 1A-1J using its one or more processors and memory. In some embodiments, the head-wearable device 510 is configured to be communicatively-coupled with another device (e.g., a smartphone, personal computer, wrist-wearable device 170, etc.), which allows for quick and efficient computation and or memory management via offloading of tasks and constraints from the head-wearable device 510 to the other device.

Figure 2A:
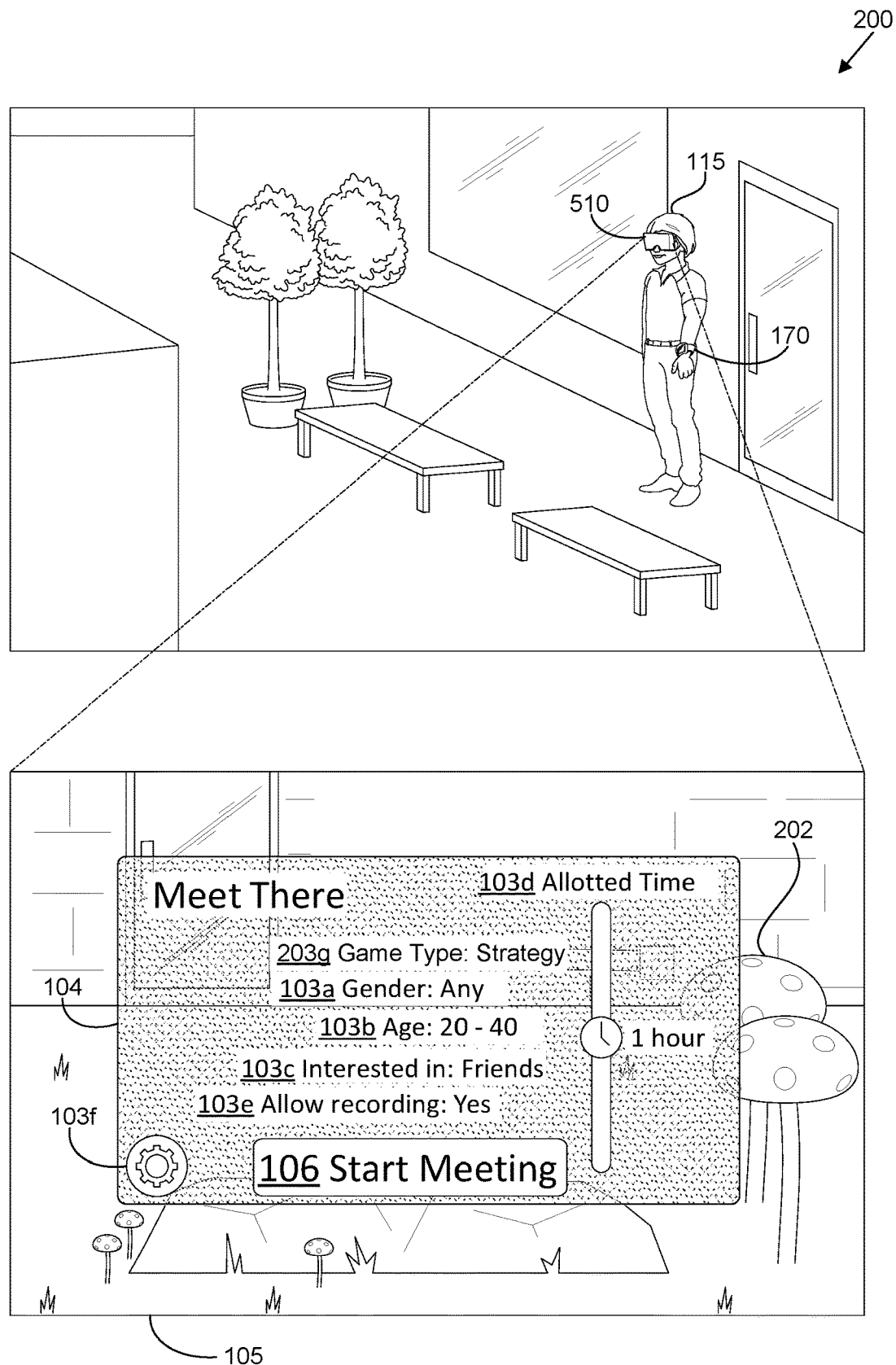
FIG. 2A-2E illustrate an artificial-reality application facilitating an interactive artificial-reality activity in a virtual-reality environment, in accordance with some embodiments.

FIG. 2A illustrates the user 115 wearing the head-wearable device 510 after the user 115 has provided an opt-in instruction to use the artificial-reality application in a VR system 200. Responsive to the opt-in instruction to use the artificial-reality application, the head-wearable device 510 is configured to display a virtual-reality environment. While the virtual-reality environment is displayed by the head-wearable device 510, a substantial portion of a field of view 105 of the user 115 can include virtual objects and/or other virtual-reality UI elements presented by the head-wearable device 510 (e.g., each object in the user 115's field of view includes an overlay to present the user the virtual-reality environment). In some embodiments, the user 115 can provide a user input to temporarily cause passthrough imaging to be provided by the head-wearable device 510 such that the head-wearable device 510 temporarily ceases to present the virtual-reality environment.

In some embodiments, upon the user 115 providing the opt-in instruction to participate in the artificial-reality application, the head-wearable device 510 displays the opt-in UI 104, with UI elements for adjusting settings for an artificial-reality activity to be performed as discussed with respect to FIG. 1B. In some embodiments, the head-wearable device 510 displays a virtual-reality scene behind the opt-in UI 104 (e.g., the mushroom virtual object 202), which can be related to a theme of the artificial-reality activity to be performed or the artificial-reality application (e.g., a game, social meeting application, etc.). The theme of the artificial-reality activity to be performed can be configurable by the user 115, from, for example, the opt-in UI 104, and or a general settings UI that can be enabled upon the user 115 selecting the general settings UI element 103f. As shown in the user 115's field of view 105 in FIG. 2A, the opt-in UI 104 can optionally have additional UI elements related to, for example, the type of artificial-reality activity to be performed. For example, the game type UI element 203g allows the user 115 to select the type of game to be used in determining the artificial-reality activity to be performed at the interactive-activity location.

Figure 2B:
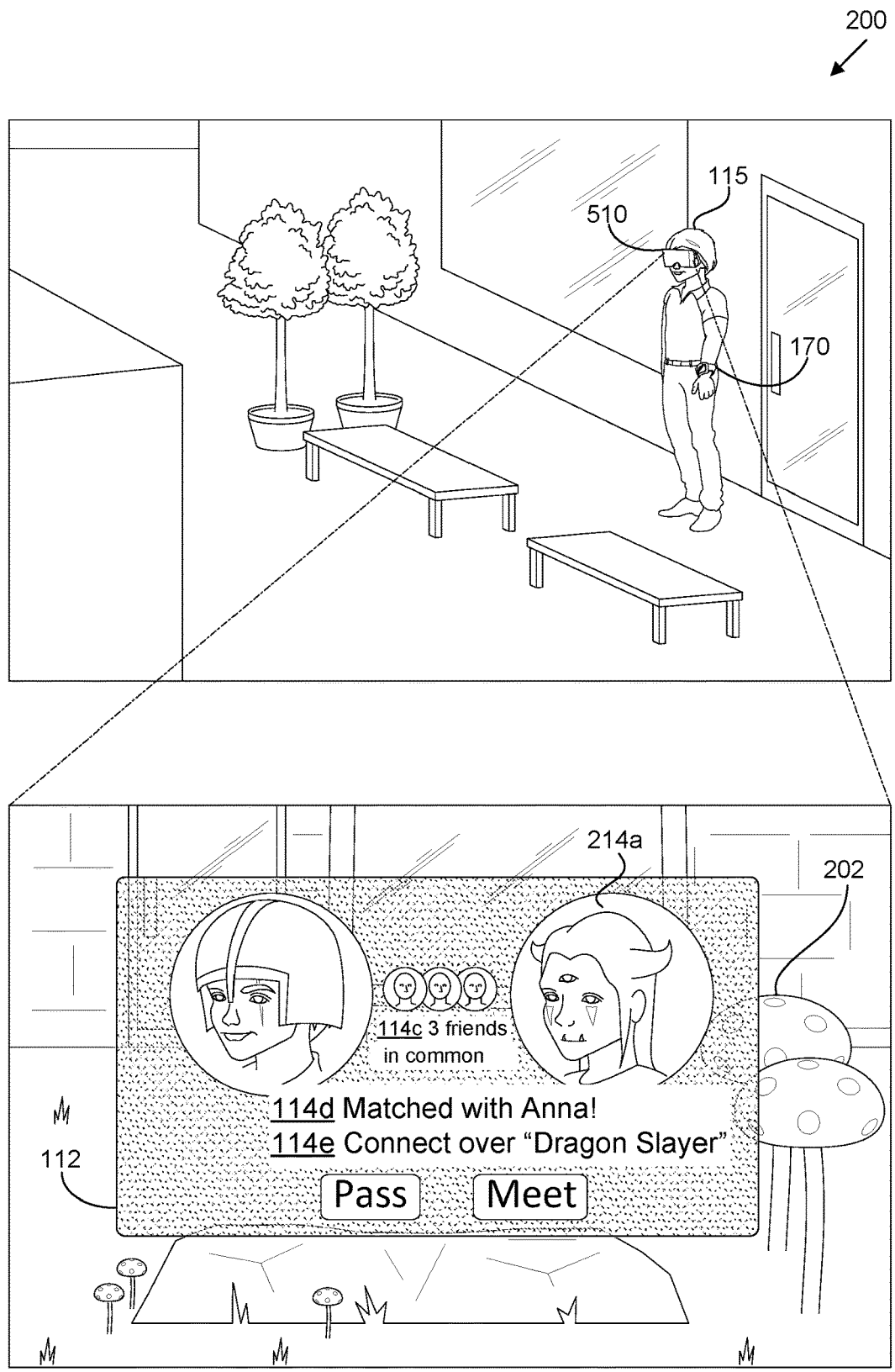

Turning now to FIG. 2B, the head-wearable device 510 is displaying the connection UI element 114 discussed with respect to FIG. 1B, in the VR system 200. The connection UI element 114 can include many of the same UI elements as discussed with respect to FIG. 1B. In some embodiments, the connection UI element 114 can also include different and/or additional UI elements for the VR system 200. For example, the suggested user avatar UI element 214a can include an avatar of an in-game character that the suggested user has created or uses, either in the artificial-reality application or in another application that the suggested user uses at their head-wearable device.

Figure 2C:
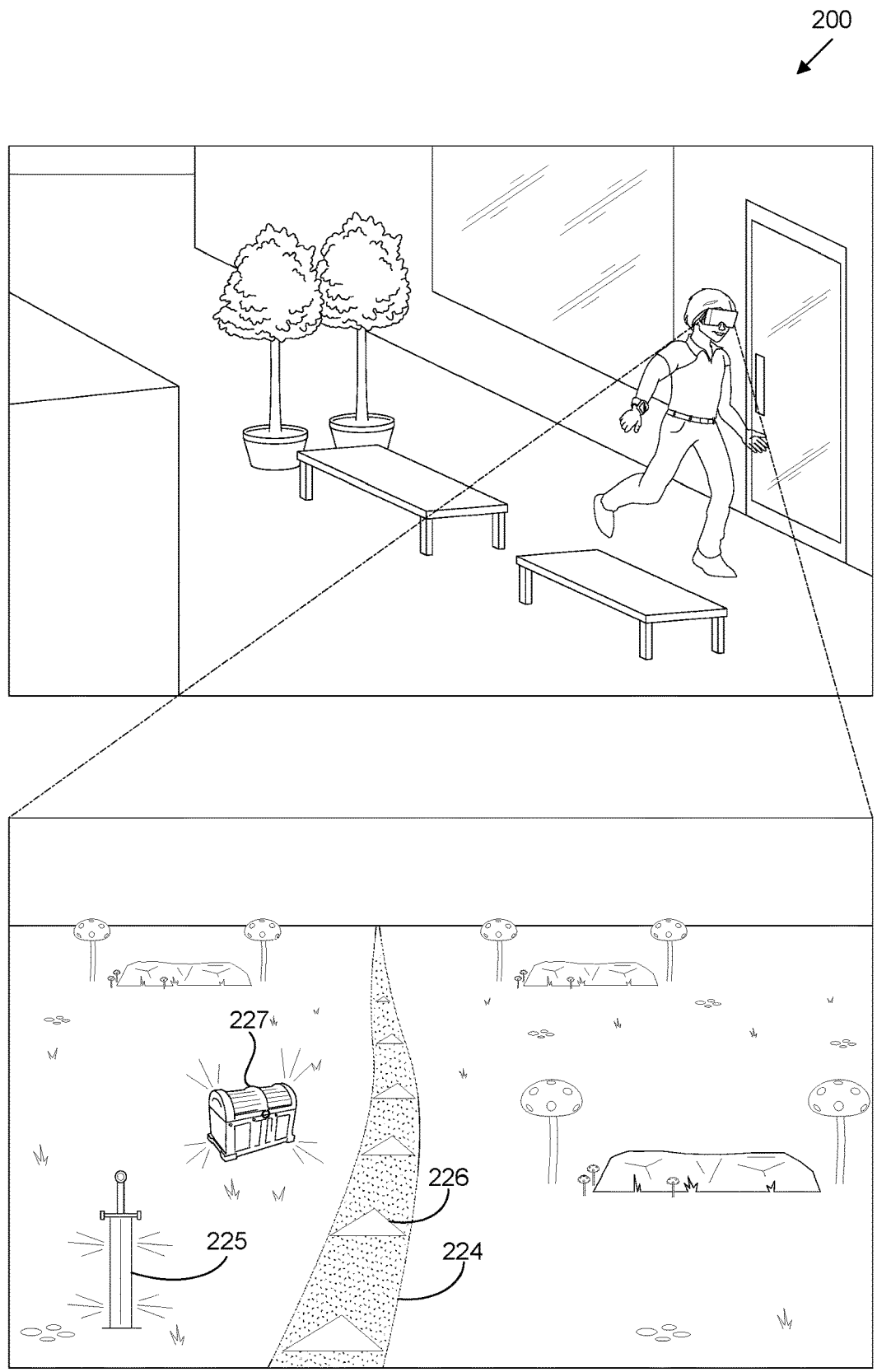

Turning now to FIG. 2C, the head-wearable device 510 presents a visual path guidance UI element 224 at the head-wearable device 510 for navigating the user 115 to the virtual interactive-activity location in the VR system 200. As discussed with respect to FIG. 1C, the visual path guidance UI element 224 can include navigational arrow UI elements 226 to provide additional guidance about how the user 115 needs to travel to reach the interactive-activity location. Since the user 115 is in the VR environment, and they are navigating to a virtual interactive-activity location, they can remain in substantially the same location in their physical environment (e.g., moving only two to four steps), according to some embodiments. In some embodiments, the user 115 uses one or more hand gestures and/or inputs at one or more controllers 874c (discussed below with respect to FIG. 7) to navigate to the interactive-activity location. In some embodiments, the visual path guidance UI element 224 can include paths not located on the ground in front of the user 115. For example, at least a portion of the navigation to the interactive-activity location can be performed in the air.

As shown in the user 115's field of view 105 in FIG. 2C, additional UI elements, including UI elements and/or virtual objects, can be displayed by the VR system 200, some of which can be interacted with by the user 115. For example, the user 115 can interact with virtual objects such as the sword virtual object 225 and/or the treasure chest virtual object 227 along the way to the interactive-activity location. In some embodiments, the virtual object can be used by one of the users to gain an advantage in the artificial-reality activity (e.g., a "perk"). In some embodiments, one or more of the virtual objects displayed in FIG. 2C can be interacted with by other users of the artificial-reality applications that can be navigating to different interactive-activity locations to participate in different artificial-reality activities. For example, the treasure chest virtual object 227 may appear open or may not be visible during the user 115's navigation to the interactive-activity location discussed with respect to FIGS. 2A-2E, because another user of participating the artificial-reality application has previously opened or stored the treasure chest virtual object 227 in that respective user's inventory. In some embodiments, virtual objects can be hidden along a respective path to an interactive-activity location. In some embodiments, the user 115 must select less than all the virtual objects that appear along the path to the interactive-activity location (e.g., strategic resource selection).

Figure 2D:
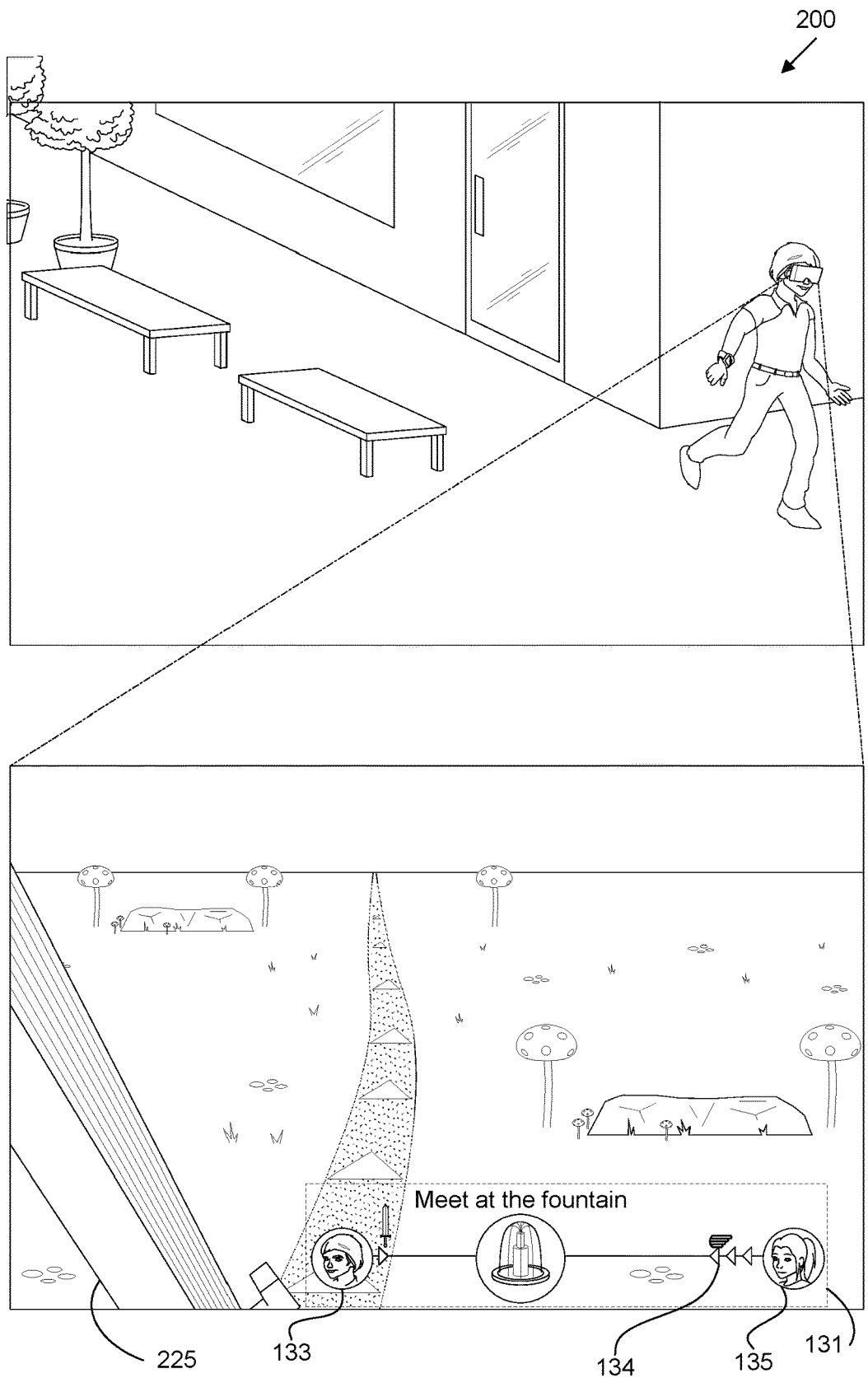

Turning now to FIG. 2D, the VR system 200 can cause the head-wearable device 510 to display the progress indicator UI element discussed with respect to FIGS. 1E and 1F, which can include a user progress UI element 133 and a suggested user progress UI element 135. In some embodiments, the respective progress arrow UI elements 134a and 134b associated with each of the users' respective progress toward the interactive-activity location can also include additional information about how the respective user is progressing towards the interactive-activity location. For example, a wing icon can be displayed along with the progress arrow UI elements 134b to indicate that the suggested user is currently flying through the air of the virtual environment on the way to the interactive-activity location. In some embodiments, the user 115 can "equip" virtual objects to their respective character in the VR system 200, and/or add virtual objects to their inventory, which they can equip later. For example, in FIG. 2D, the progress arrow UI elements 134a is shown with a sword icon to indicate that the user 115 is carrying the sword virtual object 225 (FIG. 2C). Alternatively or additionally, in some embodiments, the equipped objects are shown as held by the user 115 (e.g., the sword virtual object 225 is held and visible in the user 115's field of view 105).

Figure 2E:
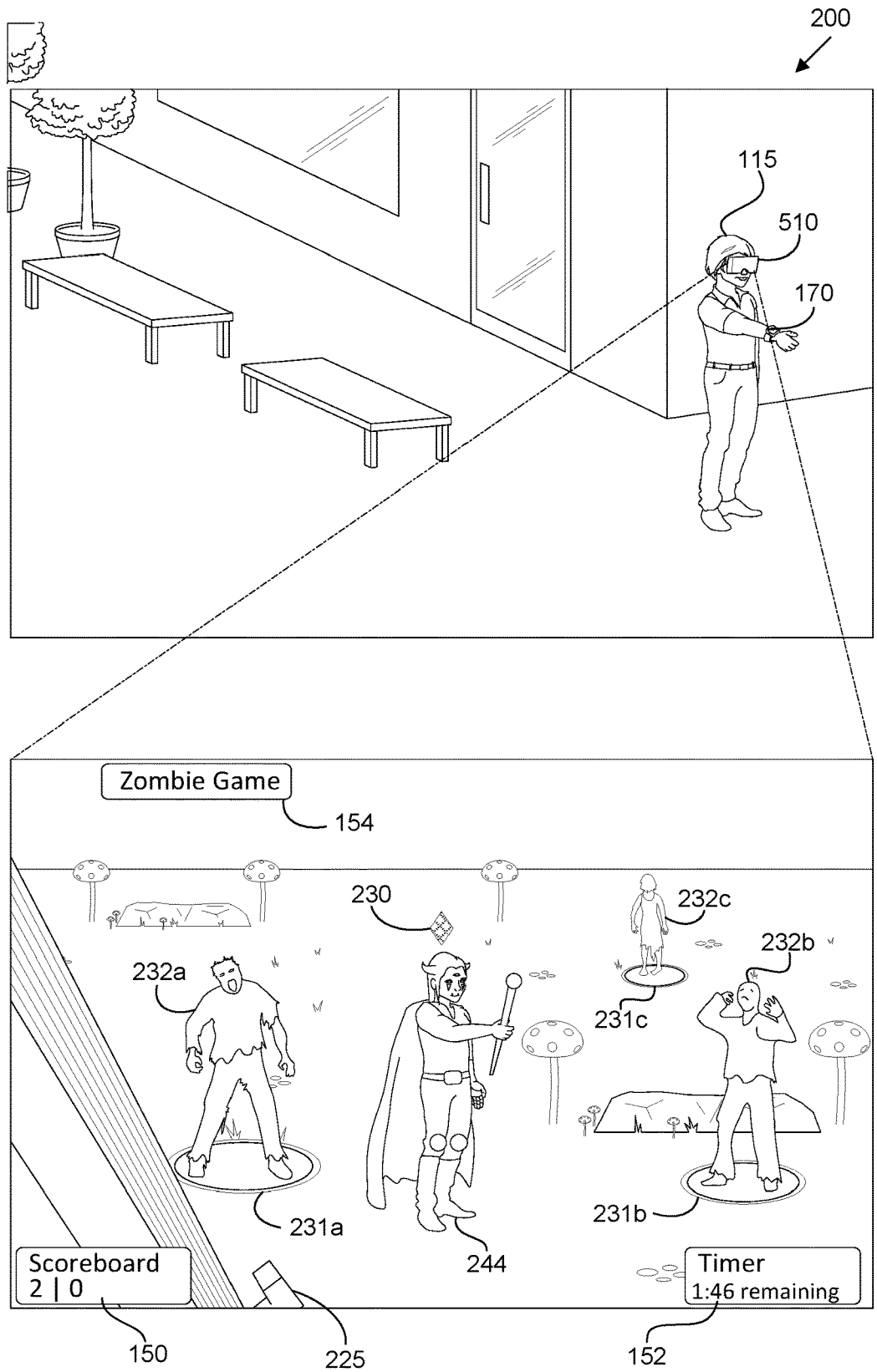

Turning now to FIG. 2E, the user 115 has arrived at the virtual interactive-activity location within the VR environment presented by the VR system 200. The head-wearable device 510 presents to the user 115 various UI elements and virtual objects. For example, the suggested user 244 is in the user 115's field of view 105, and they appear as a video game character from the artificial-reality application (e.g., their respective avatar). The head-wearable device 510 presents activity-related UI elements, as displayed in FIG. 1G-1H, which provide information about the artificial-reality activity to the user 115. The head-wearable device 510 can also display virtual objects related to artificial-reality activity. For example, the head-wearable device 510 can show zombie virtual objects 232a-232c, and the user 115 and the suggested user 244 can interact with the virtual zombie objects similarly to the interactions described in FIGS. 1G-1H. In some embodiments, the VR system 200 also allows the user 115 and/or the suggested user 244 to utilize aspects of the virtual-reality environment to interact with the virtual objects (e.g., the zombie virtual objects). For example, the user 115 can use the sword virtual object 225 to defeat zombies from the VR system 200 during the artificial-reality activity.

In some embodiments, the VR system 200 allows for additional interactions between the user 115 and the suggested user 244. For example, the user 115 and the suggested user 244 can request to duel in the VR system 200 as part of the artificial-reality activity. In some embodiments, the user 115 and the suggested user 244 are each using game characters from different applications, that are compatible with the artificial-reality application. In some embodiments, the user 115 and/or the suggested user 244 can stream the artificial-reality live to others or include people who are not using the artificial-reality application (e.g., allow for spectators (as long as the user 115 and the suggested user 244 grant permission)). In some embodiments, the user 115 and/or the suggested user 244 can earn achievements in respective applications that are compatible with the artificial-reality activity.

FIGS. 3A-3D illustrate user authentication at the head-wearable device, in accordance with some embodiments. In some embodiments, the user 115 provides authentication information via the head-wearable device 110 (or other communicatively coupled device) in order to use the head-wearable device 110. As discussed above, the head-wearable device 110 has various capabilities for presenting UI elements to a wearer (e.g., the user 115), and can be communicatively-coupled with one or more other electronic devices including the wrist-wearable device 170. In some embodiments, the artificial-reality application and/or additional applications of the head-wearable device, including background applications, can cause the head-wearable device 110 to determine whether a wearer of the head-wearable device 110 has access privileges (e.g., is authorized to use the head-wearable device 110). The processes, devices, and sequences described with respect to FIGS. 3A-3D can include one or more of the processes, devices, and sequences described above with respect to FIGS. 1A-1I and/or FIGS. 2A-2E.

Figure 3A:
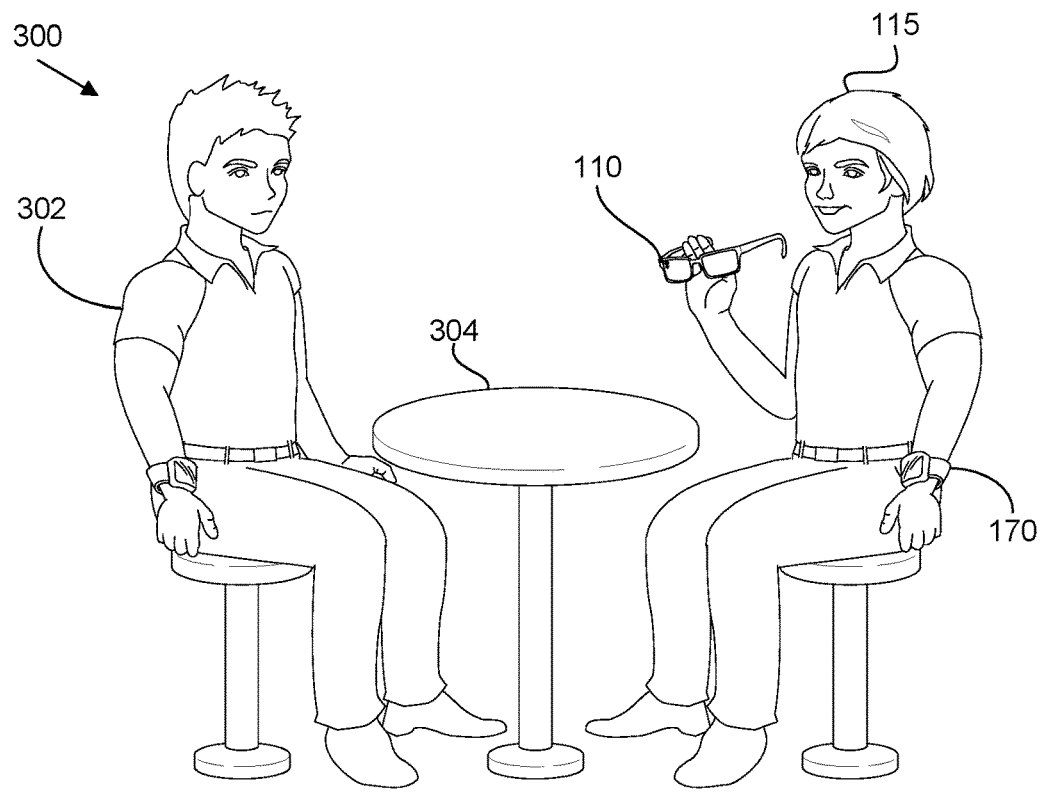
FIGS. 3A-3D illustrate user authentication at the head-wearable device, in accordance with some embodiments.
Figure 3B:
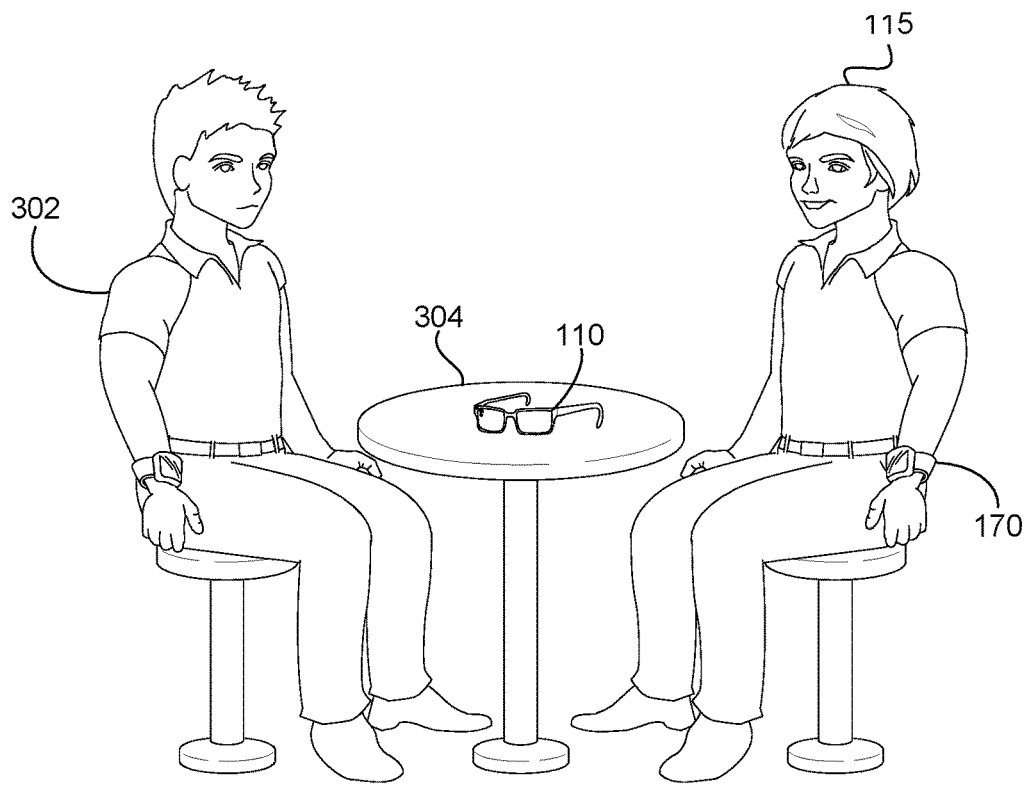
Figure 3C:
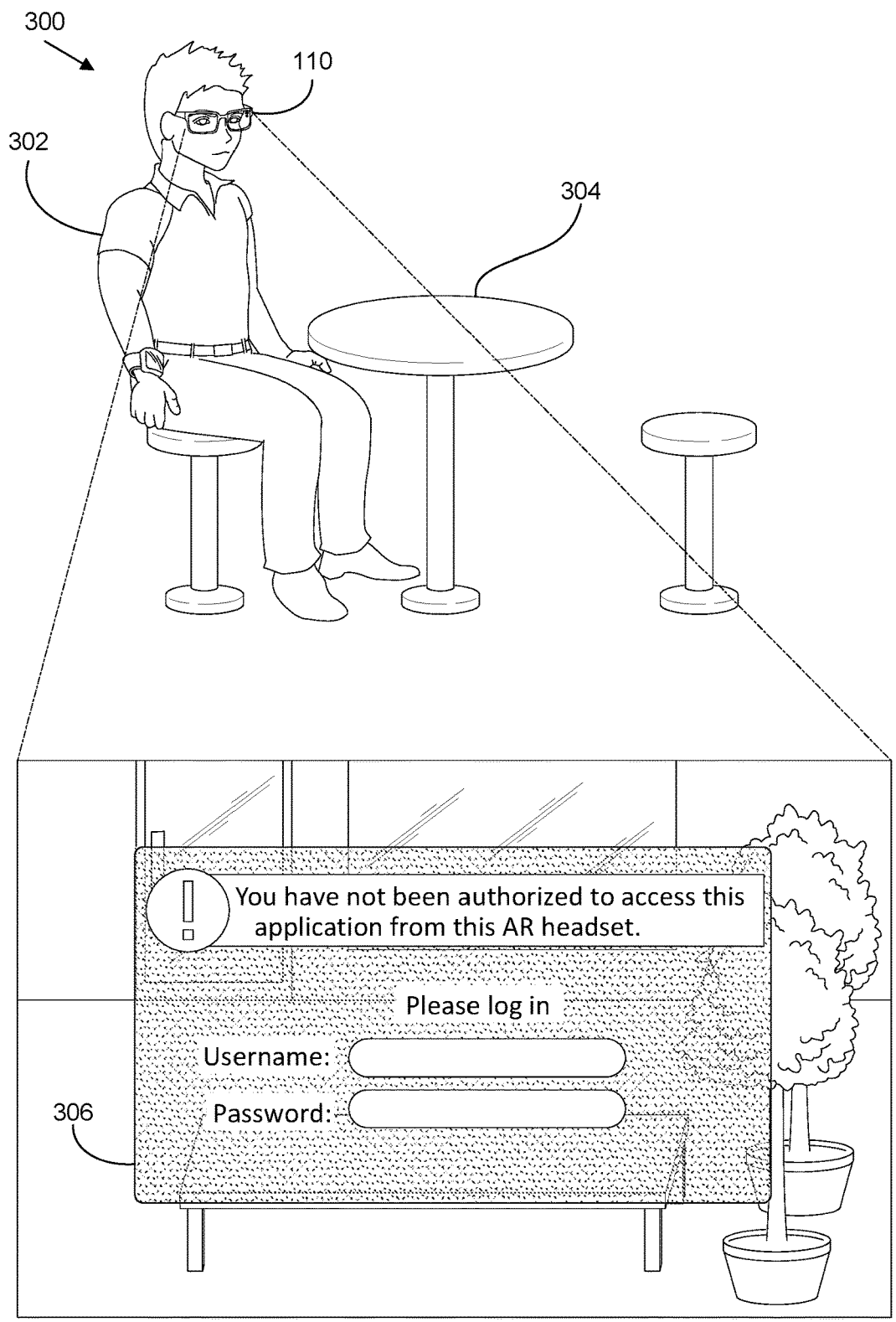

FIGS. 3A and 3B illustrate the user 115 removing the head-wearable device 110 to place the head-wearable device 110 on a table 304. The user 115 is sitting next to a person 302 who is not authenticated to use the artificial-reality application at the head-wearable device 110. The head-wearable device 110 includes sensors (e.g., sensors 821), which can include one or more inertial measurement units (IMU) s configured to detect when the head-wearable device 110 has been removed from the user 115's face and/or placed on another surface (e.g., the table 304). In FIGS. 3A and 3B, the user 115 has previously authenticated themselves at the head-wearable device 110 and/or previously opted-in to participate in the artificial-reality application to connect with other users. In some embodiments, when the user 115 removes the head-wearable device 110, the head-wearable device 110 ceases to display information and/or displays a limited amount of information (e.g., a login UI 306; FIG. 3C). Alternatively, in some embodiments, if the head-wearable device 110 continues to display information (e.g., the connection UI 112) after the user 115 removes the head-wearable device 110, the head-wearable device 110 can request for re-authentication before performing additional operations. For example, if, after the user 115 has removed the head-wearable device 110, the head-wearable device 110 continues to display the connection UI 112 with at least one suggested user, the head-wearable device 110 can request the subsequent wearer of the head-wearable device 110 to provide authentication information before linking wearer with the suggested user. If the subsequent wearer of the head-wearable device 110 provides invalid authentication information, the head-wearable device 110 terminates the artificial-reality application (and, in some embodiments, provides a notification to the user 115 of a failed authentication attempt). Alternatively, if the subsequent wearer of the head-wearable device 110 provides valid authentication information, the head-wearable device 110 treats the subsequent wearer as the user 115 and links the user 115 with the suggested user.

FIG. 3C illustrates the person 302 wearing the head-wearable device 110. As described above, in some embodiments, when an unauthorized user wears the head-wearable device 110, the head-wearable device 110 presents limited information, such as the login UI 306. The login UI 306 can include a notification informing the wearer (e.g., the person 302) that they are not authorized to use the head-wearable device 110 and/or cannot access one or more applications of the head-wearable device 110 (such as the artificial-reality application described above in reference to FIGS. 1A-2E). Thus, the system can authenticate that no one else might have stolen the glasses from the user 115 while they are on their way to perform the artificial-reality activity. This further ensures a sustained and trustworthy interaction with new technologies to further user adoption and acceptance of these new technology paradigms.

Alternatively, in some embodiments, the head-wearable device 110 can determine whether the user is authorized to participate in the artificial-reality activity. For example, the head-wearable device 110 can determine whether parental controls or other security controls prevent authorizing the user 115 from participating in the interactive activity. In some embodiments, the determination that the user is authorized to participate in the artificial-reality activity is based on the current location of the user. For example, if the user is at a school or national patent office, where use of the artificial-reality activity has been manually restricted by the administrator during working hours, the user may be temporarily unauthorized to participate in the artificial-reality activity. In some embodiments, use of the artificial-reality activity can be restricted strictly based on the time of day or other criteria, configurable by a user 115 or administrator controlling a network where the user is attempting to initiate the artificial-reality activity.

In some embodiments, as shown in FIG. 3C, the login UI 306 can include credential input UI elements (e.g., a username input field and a password input field) to allow the wearer of the head-wearable device 110 to input credentials for their account. In some embodiments, the login UI 306 is specific to an application of the head-wearable device 110 (such as the artificial-reality application). The person 302 can decline to provide authentication information; however, use of the head-wearable device 110 will be limited (e.g., allowing for the person 302 to notify (e.g., via a ping or alert) the owner of the head-wearable device 110 of the location of the device, allowing for the person 302 to message the owner the of head-wearable device 110 to assist them in locating the device, allow the user to perform emergency service calls (e.g., to the police department), etc.).

The wearer of the head-wearable device 110 can authenticate themselves in a any number of ways. For example, as discussed herein, the head-wearable device 110 can use various sensors and/or imaging devices 111 to scan and/or track eye movement of the wearer that is used to determine whether the wearer is authorized to use the head-wearable device 110. Alternatively, in some embodiments, the head-wearable device 110 can communicate with the wrist-wearable device 170 (or other communicatively coupled device, such as a smartphone) to authenticate the wearer of the head-wearable device 110. For example, a wearer of a wrist-wearable device 170 communicatively coupled with the head-wearable device 110 can provide log in information via the wrist-wearable device 170, or the wrist-wearable device 170 can authenticate the user 115 when it is in proximity to the head-wearable device (e.g., within 1 meter). In some embodiments, the wearer of the head-wearable device 110 is authenticated via voice recognition, fingerprint recognition (e.g., reviewing an input at the frames of the head-wearable device, or at the wrist-wearable device 170), and/or other methods known in the art.

Figure 3D:
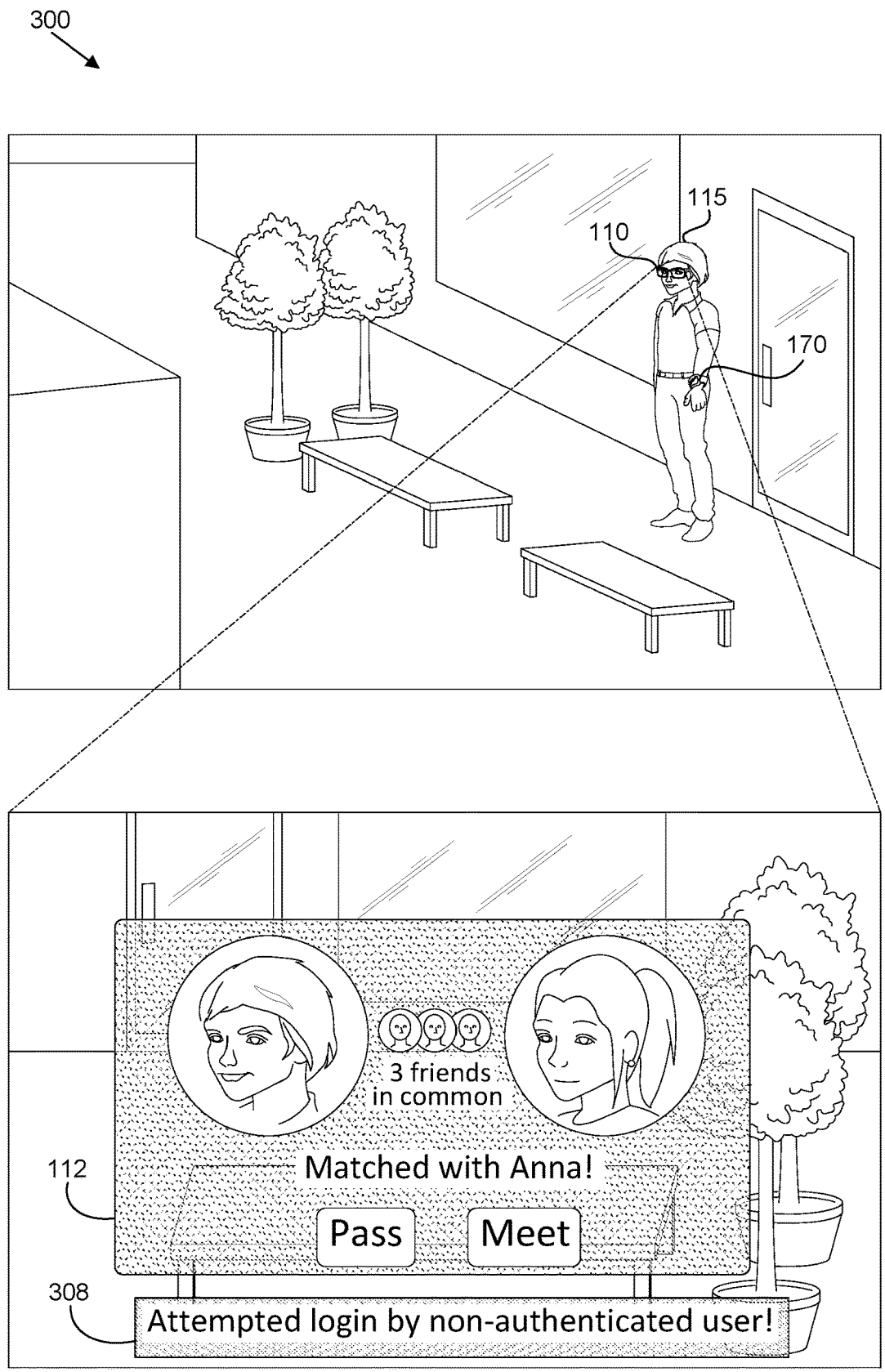

FIG. 3D illustrates a notification presented to the user 115 informing the user of failed log in attempts. In FIG. 3D, the user 115 recovers his head-wearable device 110 from the person 302 described above in reference to FIGS. 3A-3C. The head-wearable device 110 can present to the user 115 the number of failed log in attempts for the head-wearable device 110 and/or one or more applications of the head-wearable device 110. For example, in FIG. 3D, the head-wearable device 110 presents to the user 115 the connection UI 112 along with a warning UI element 308 that informs the user 115 of the number of attempts made to log in to their account for the artificial-reality application. The warning UI element 308 can also include one or more UI elements that allow the user to dismiss the warning and/or change their password for the account.

FIGS. 4A-4E illustrate the artificial-reality application facilitating another interactive artificial-reality activity in an artificial-reality environment, in accordance with some embodiments. The processes, devices, and sequences described with respect to FIGS. 4A-4D can include one or more of the processes, devices, and sequences described above with respect to FIGS. 1A-3D.

Figure 4A:
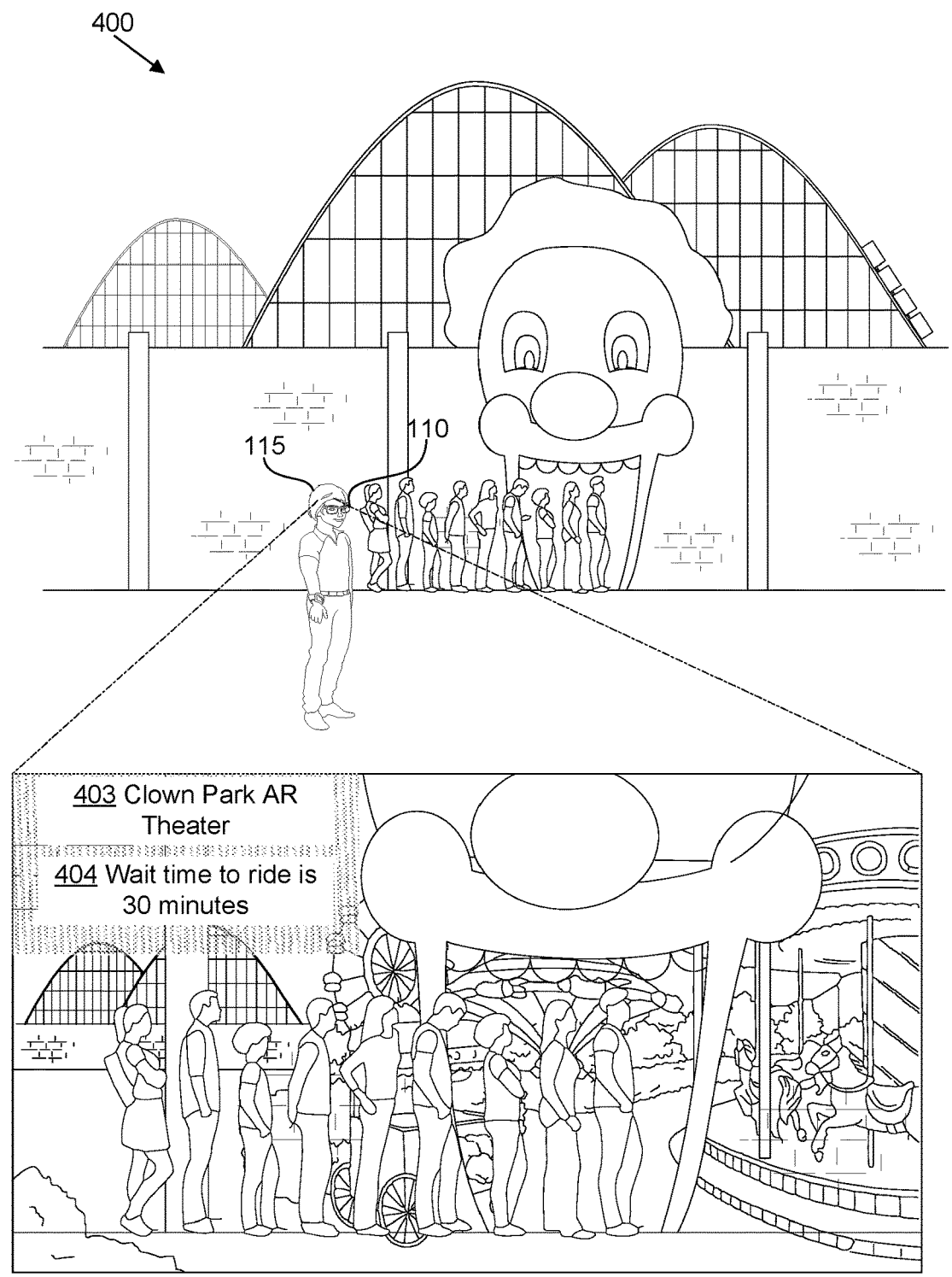
FIGS. 4A-4E illustrate the artificial-reality application facilitating another interactive artificial-reality activity in an artificial-reality environment, in accordance with some embodiments.

FIG. 4A illustrates the user 115 at an amusement park and opted-in to use the artificial-reality application. In some embodiments, the head-wearable device 110 can present to the user 115 information associated with one or more attractions that can be suggested as an artificial-reality activity and/or an interactive-activity location. For example, the head-wearable device 110 can display a ride time UI element 404 to the user 115 that provides the user 115 with information about an artificial-reality event (e.g., promotion and/or group gathering) and/or artificial-reality activity that is to be performed at the associated ride. The ride time UI element 404 can include a wait time for the ride (e.g., "The wait time to ride is thirty minutes."). The ride time UI element 404 can be presented with a ride title UI element 403 indicating the name of the ride and an artificial-reality experience to be provided at the ride (e.g., Clown Part AR Theater). In some embodiments, the head-wearable device 110 receives event information from a common space that can be presented to the user 115 and/or used to determine an artificial-reality activity and/or an interactive-activity location. For example, the head-wearable device 110 can receive from the amusement park ride information, show information, and/or other attraction information that is used to provide the user with information about wait-time for a ride at the amusement park.

Figure 4B:
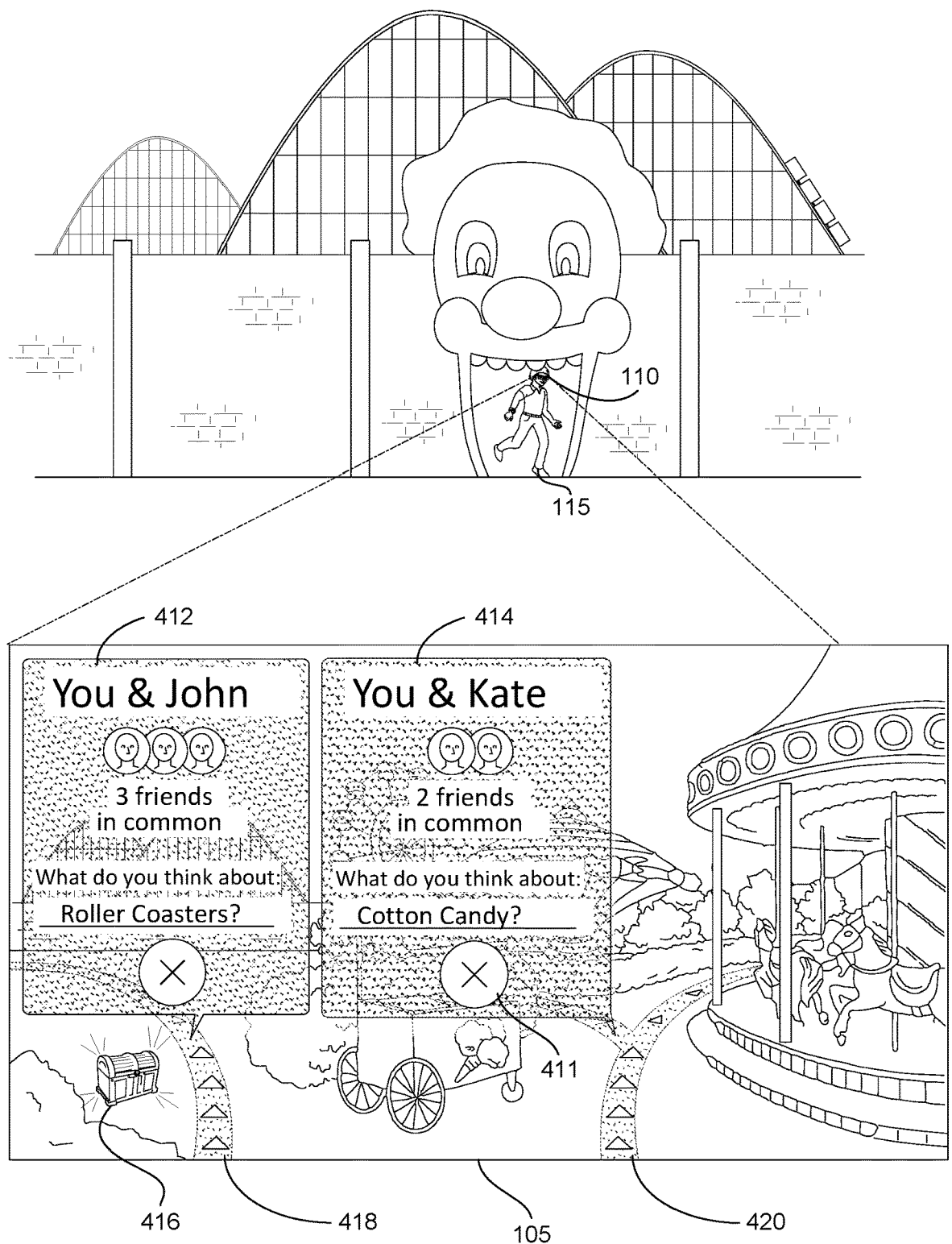

FIG. 4B illustrates the user 115 wearing the head-wearable device 110 walking through a gate at the amusement park. As described above, in some embodiments, the head-wearable device 110 can present to the user 115 information associated with a common space at which the user 115 can participate in the artificial-reality application for facilitating connections between users. In some embodiments, the head-wearable device 110 information associated with the common space can be used to provide additional context on an artificial-reality activity and/or an interactive-activity location provided to the user 115 (e.g., 10 people are waiting to enter the haunted house, John is looking for a ride buddy, free ice cream next to the merry-go-round, etc.). In some embodiments, one or more features of the common space can be augmented by the head-wearable device 110. For example, in some embodiments, the head-wearable device 110 can provide an overlay and/or animate the gate of the amusement park while the user 115 participates in the artificial-reality application.

In some embodiments, the head-wearable device 110 can present to the user 115 at least two artificial-reality activities and/or an interactive-activity locations that the user can participate. In some embodiments, the recommended artificial-reality activities and/or an interactive-activity locations are group activities. For example, as shown in the user 115's field of view 105, the head-wearable device 110 displays two separate connection UIs 412 and 414 which include UI elements for linking the user 115 with suggested users for the performance of respective artificial-reality activities. In some embodiments, the connection UIs can include conversation starters to facilitate an interaction and/or communicate a shared interest between the participants. For example, each of the connection UIs 412 and 414 includes respective question prompts, which provide information about a topic of discussion between the user 115 and the suggested users. In some embodiments, the user 115 can select a skip or dismiss a recommended artificial-reality activity, interactive-activity location, and/or suggested user by providing an input at a respective connection UI selecting the skip connection UI element 411. The connection UI element 411 can cause the head-wearable device 110 to cease displaying the respective connection UI (e.g., the connection UI 414). In some embodiments, when the user selects a skip connection UI element 411, the head-wearable device 110 presents an additional connection UI element in place of the skipped connection UI element. In some embodiments, the user 115 can perform a scroll and/or a swipe gesture at a set of connection UI to reveal additional connection UI.

In some embodiments, the head-wearable device 110 can present a plurality of visual path guidance UI elements 418 and 420 associated with each presented connection UI (e.g., connection UI 412 and 414, respectively). In some embodiments, the user 115 can select to participate in a particular artificial-reality activity presented by a connection UI by navigating along a visual path guidance UI element. For example, the user 115 can navigate along visual path guidance UI element 420 to participate in the artificial-reality activity with Kate. In some embodiments, a visual path guidance UI element is associated with one or more interactive-activity locations. For example, the visual path guidance UI element 420 includes a fork in the path that allows the user to further specify a location (e.g., select a particular interactive-activity location) at which they would like to meet the suggested user and/or to view or visit a portion of the common space that has not yet been seen by the user 115. In some embodiments, the visual path guidance UI element updates when the user 115 selects a path such that the user 115 and/or the suggested user are not walking endlessly. In some embodiments, each of the visual path guidance UI elements 418 and 420 includes thematic elements related to the artificial-reality activity and/or physical activity with which they are associated. For example, there can be a treasure chest virtual object 416 next to the visual path guidance UI element 418 and/or play pirate music, which can indicate that the visual path guidance UI element 418 is associated with an interactive-activity location that has a pirate theme, or an artificial-reality activity that involves a treasure hunt.

Figure 4C:
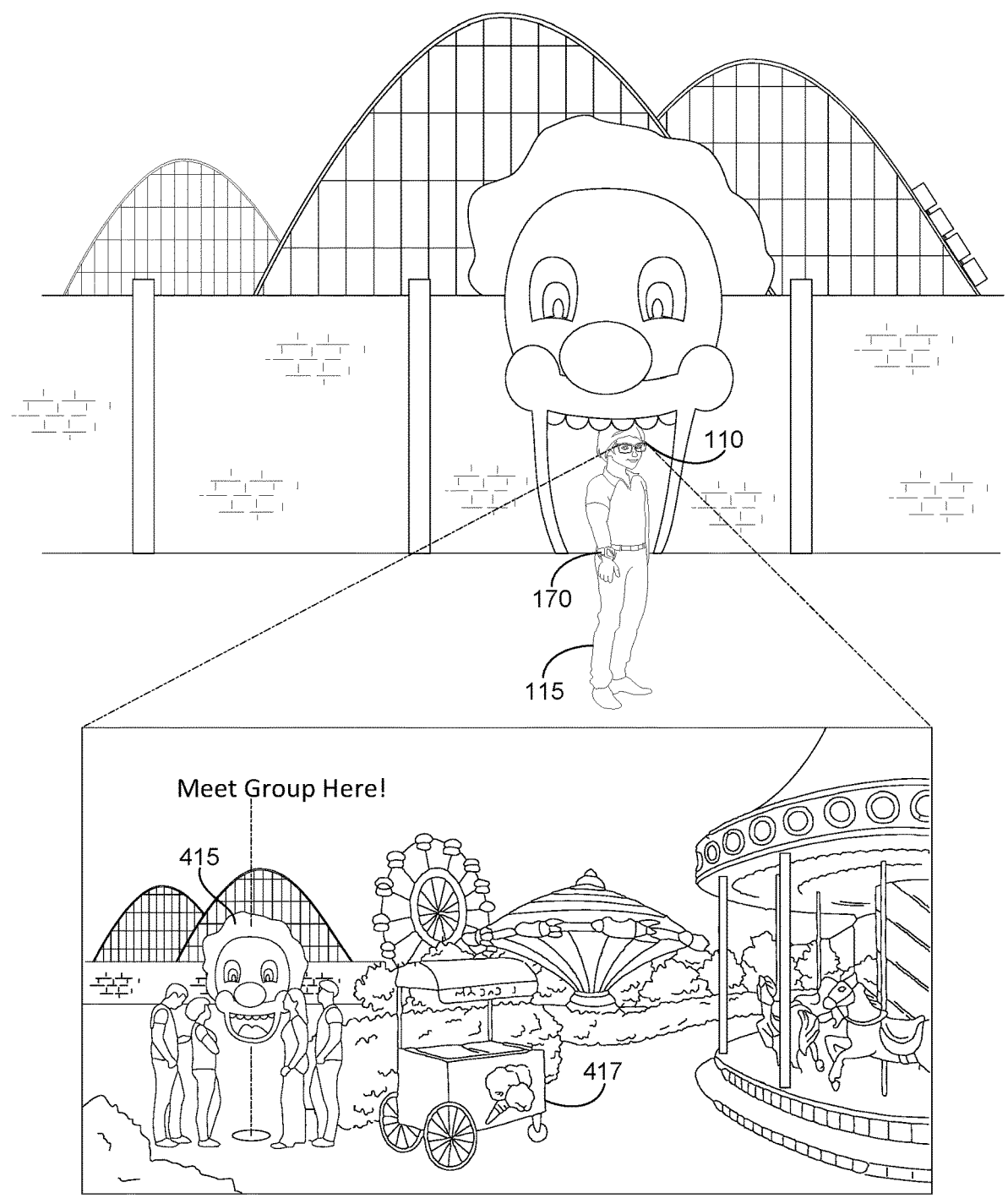

Turning now to FIG. 4C, the user 115 is walking past a group of people that are meeting at an interactive-activity location as part of an artificial-reality activity initialized by the artificial-reality application. The user 115's head-wearable device 110 allows the user 115 to see the clown head virtual object 415 (where the group of people is gathered around) even though the user 115 is not participating in the artificial-reality activity. This allows the user 115 to join in on group activities provided by the artificial-reality application if they are interested. It should be noted that the user 115 can only see virtual objects of other artificial-reality activities if the artificial-reality activities are made public and allow for users to join in. In some embodiments, the one or more of the other users of the group activity are not wearing head-wearable devices, and are instead receiving indications related to the artificial-reality application from another device, including one or more of a wrist-wearable device, a smart phone, a portable computing unit, etc. In some embodiments, the interactive-activity location is determined based on the location of a nearby item of significance, such as the treat stand 417.

Figure 4D:
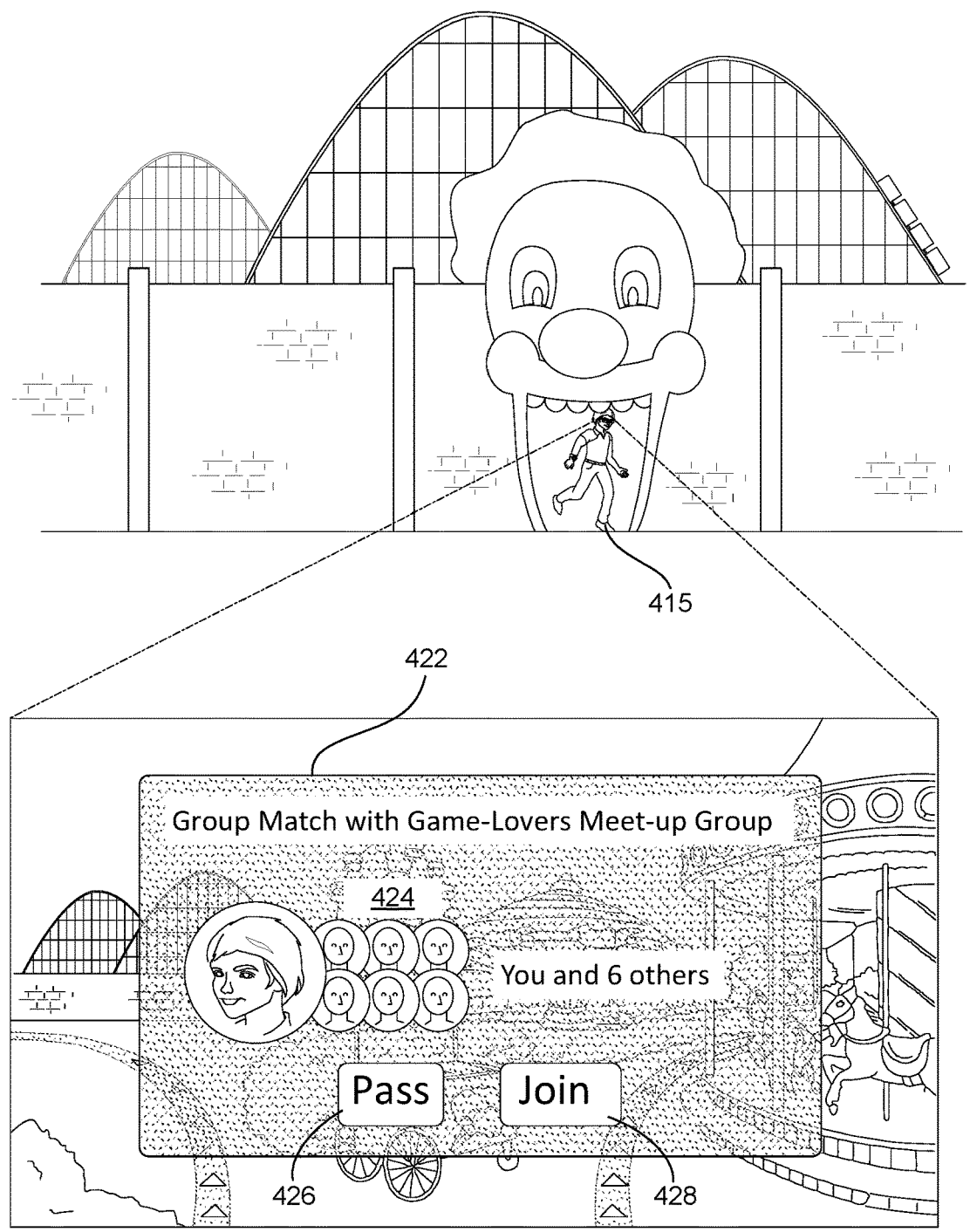

FIG. 4D illustrates the head-wearable device 110 displaying a group match UI 422 for linking the user 115 with a group of suggested users 424 (e.g., the "Game-Lovers Meet-up Group"). In some embodiments, the user-specific suggestion criteria are used to match the user 115 with the group of suggested users 424. In some embodiments, the group match UI 422 includes UI elements declining to join and/or joining the suggested meet up group (e.g., the "Pass" UI element 426, and the "Join" UI element 428). In some embodiments, the user 115 can provide an input at a selectable UI element to learn more about a respective suggestive group.

Figure 4E:
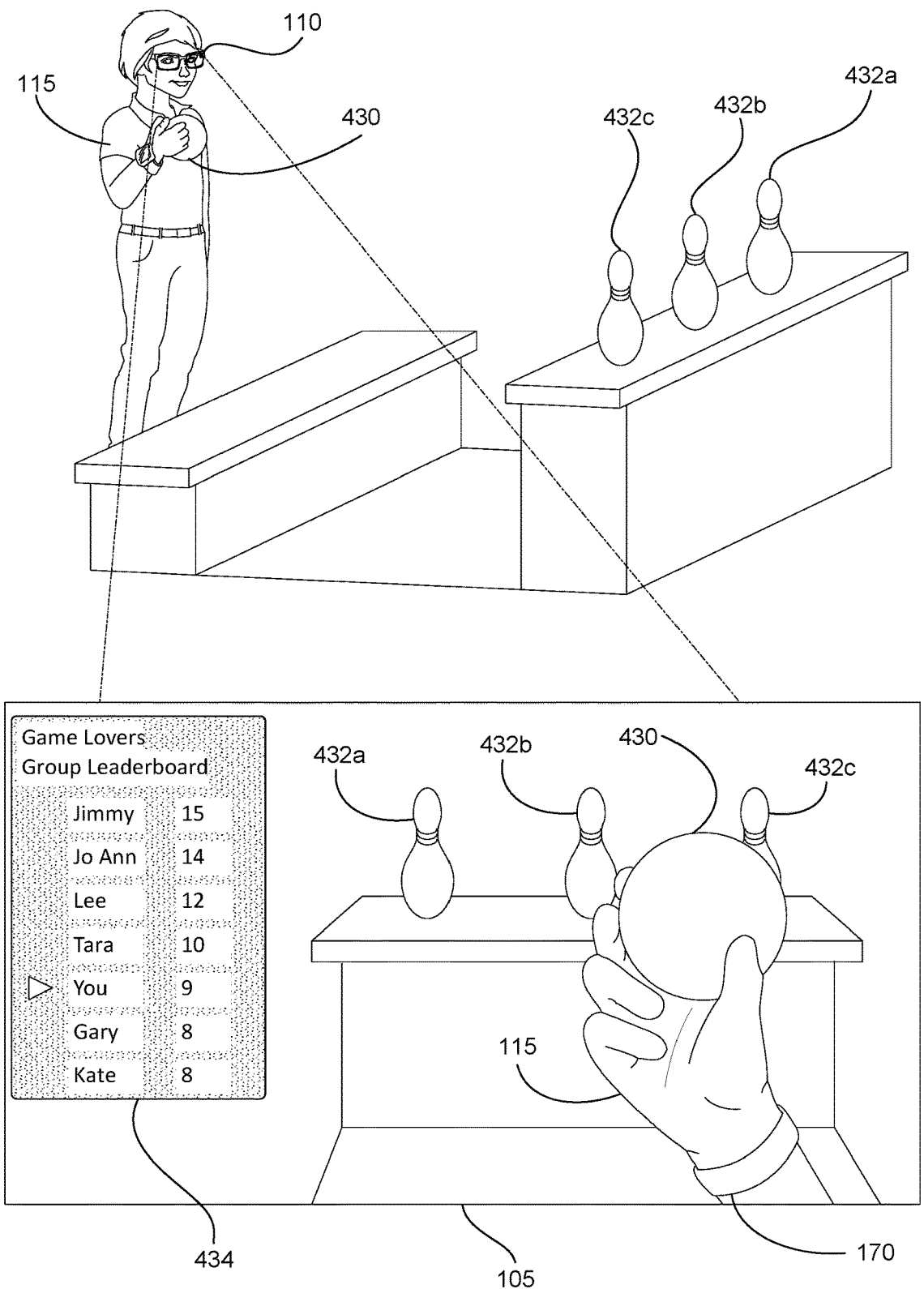

FIG. 4E illustrates the user 115 playing a physical game at the amusement park as part of an artificial-reality activity at an interactive-activity location within the user 115's physical environment. In FIG. 4E, the user 115 is throwing a ball 430 at a set of pins 432*a*, 432*b*, and 432*c* in the user 115's physical environment. As the user 115 throws the ball 430 and knocks down pins 432*a*-432*c* (or misses) a scoreboard UI 434 presented by the head-wearable device 110 is updated. The scoreboard UI 434 can show scores of the user 115 and other suggested users in the group of suggested users 432. Alternatively, in some embodiments, the ball 430 and the pins 432*a*-432*c* are virtual objects. In some embodiments the user 115 can receive a haptic event in response to an event in artificial-reality activity (e.g., when a user changes position on the leaderboard).

Figure 5A:
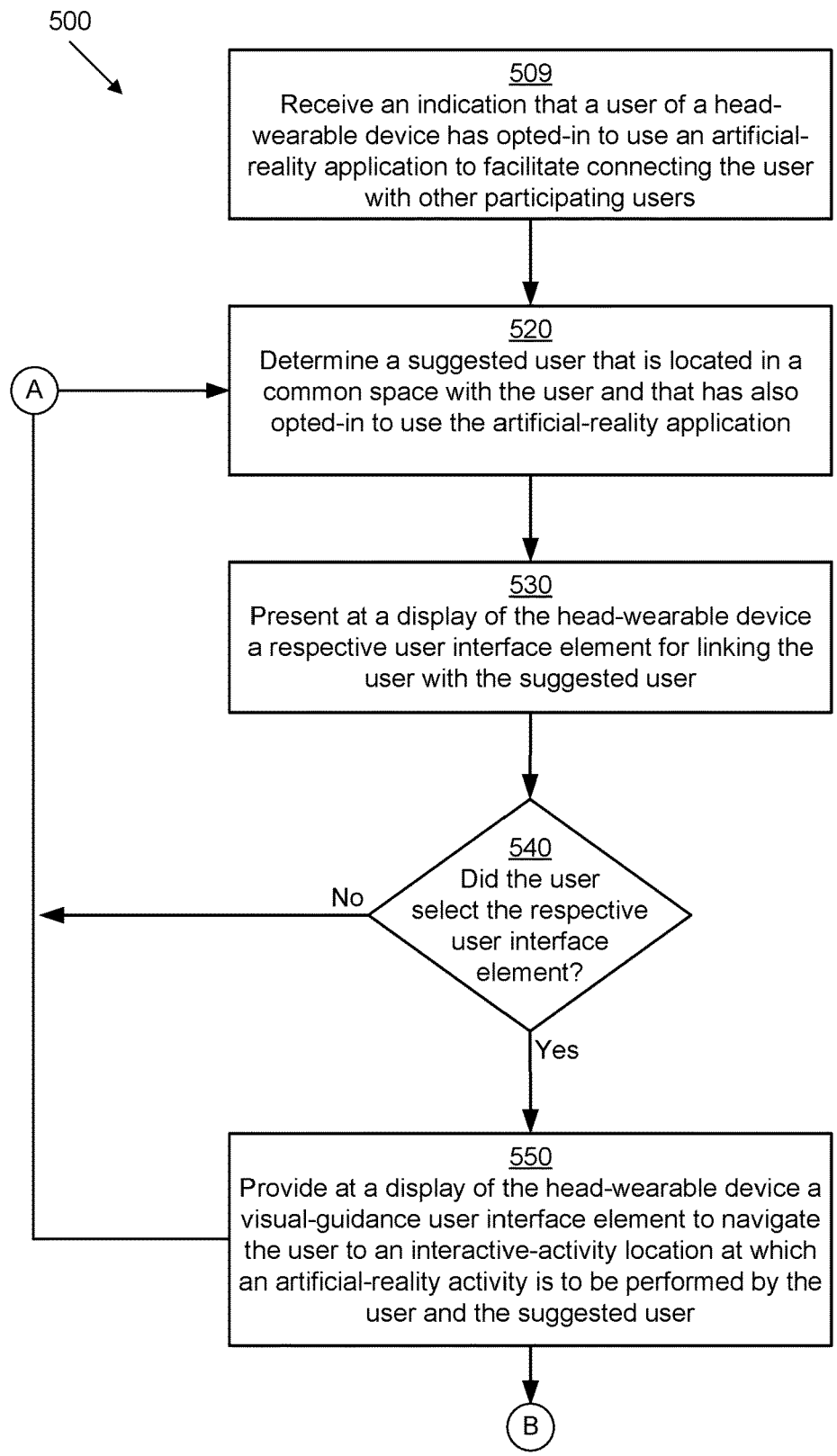
FIGS. 5A and 5B illustrate a flow diagram of a method for facilitating an interactive artificial-reality activity in an artificial-reality environment, according to some embodiments.
Figure 5B:
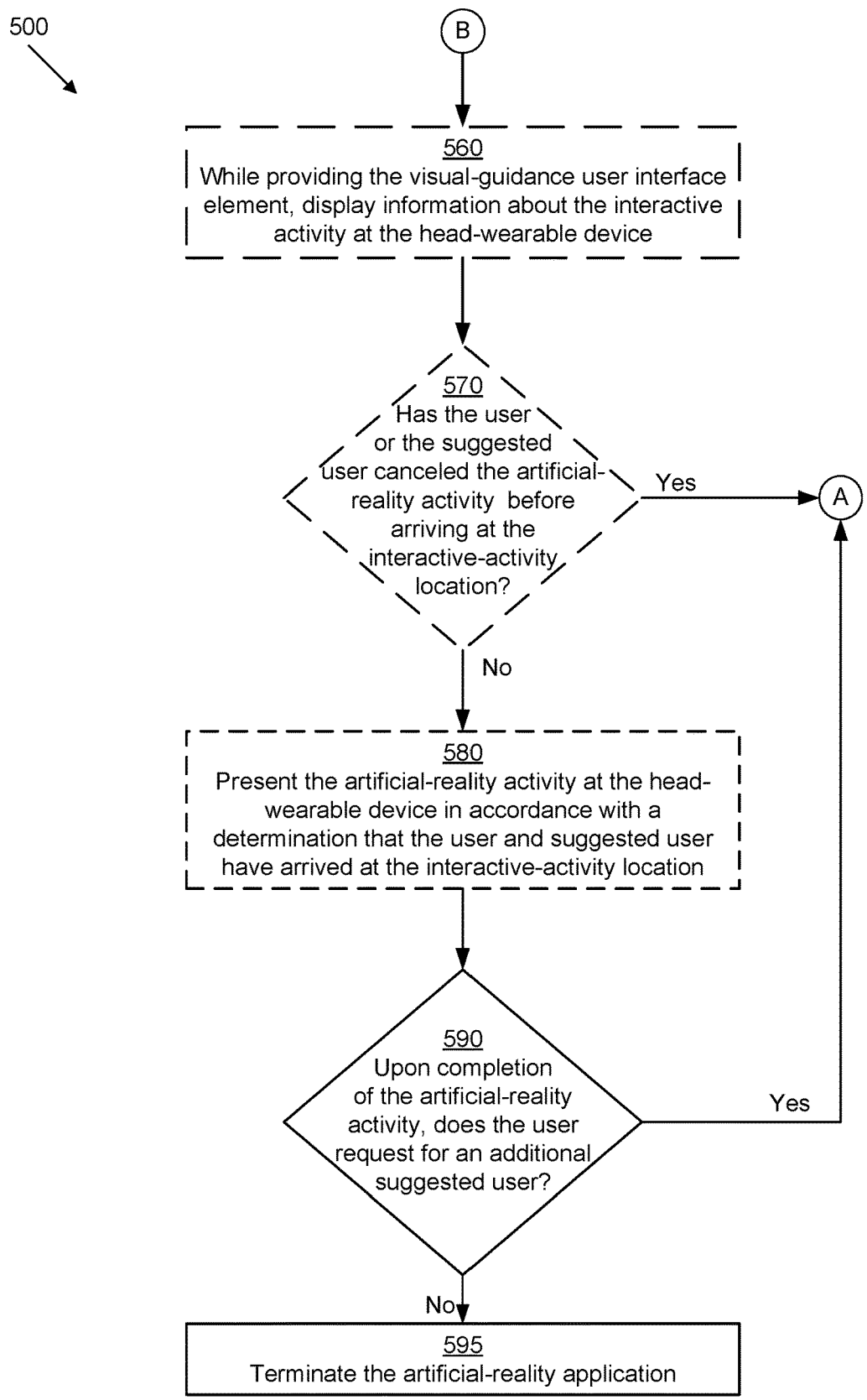

FIGS. 5A and 5B illustrate a flow diagram of a method for facilitating an interactive artificial-reality activity in an artificial-reality environment, according to some embodiments. Operations (e.g., steps) of the method 500 can be performed by one or more processors (e.g., the central processing unit and/or MCU, and/or the processors 850 in FIG. 7) of a head-wearable device 110. In some embodiments, the head-wearable device 110 is coupled with one or more sensors (e.g., various sensors discussed in reference to FIG. 7, such as a heart rate sensor, IMU, an EMG sensor, SpO2 sensor, altimeter, thermal sensor or thermal couple, ambient light sensor, ambient noise sensor), a display, a speaker, an image sensor, and a microphone to perform the one or more operations. At least some of the operations shown in FIGS. 5A-5B correspond to instructions stored in a computer memory or computer-readable storage medium (e.g., disk storage and/or random-access memory in memory 860 of one or more of the devices in FIG. 7). Operations of the method 500 can be performed by the head-wearable device 110 alone or in conjunction with one or more processors and/or hardware components of another device communicatively coupled to the head-wearable device 110 (e.g., the wrist-wearable device 170, a smartphone, a laptop, a tablet, a server, etc.) and/or instructions stored in memory or computer-readable medium of one or more other electronic devices 874 communicatively coupled to the head-wearable device 110 and/or the wrist-wearable device 170 in FIG. 7.

The method 500 includes receiving (509) an indication that a user of a head-wearable device has opted-in to use an artificial-reality application to facilitate connecting the user 115 with other participating users. For example, the method 500 can include receiving an indication that the user 115 has opted-in to use the artificial-reality application in an AR environment discussed in FIGS. 1A-1J or that the user 115 has opted-in to use the artificial-reality application in the VR environment discussed in FIGS. 2A-2E.

The method 500 includes determining (520) a suggested user that is located in a common space with the user and that has also opted-in to use the artificial-reality application; and presenting (530), at a display of the head-wearable device, a respective UI element for linking the user with the suggested user. For example, as shown in FIGS. 1A-2E and 4A-4E, different connection UIs are presented to the user 115 along with suggested users to participate in an artificial-reality activity. The method 500 includes determining (540) whether the user selected the respective UI element for linking the user with the suggested user. For example, the method 500 can include determining whether the user 115 selected the "meet" UI element 118 in FIG. 1B. In accordance with a determination that the user did not select the respective UI element ("No" at operation 540; e.g., the user 115 selects the "pass" UI element 113 in FIG. 1B), the method 500 returns to operation 520 and determines additional suggested users for the user 115. In some embodiments, the method 500 includes removing the previously recommended suggested user (e.g., the suggested users that the user 115 did not select) such that new suggested users are provided to the user 115 each time.

Alternatively, in accordance with a determination the user did select the respective UI element ("Yes" at operation 540; e.g., that the user 115 selected the "meet" UI element 118 in FIG. 1B), the method 500 includes providing (550), at a display of the head-wearable device, a visual-guidance UI element to navigate the user to an interactive-activity location at which an artificial-reality activity is to be performed by the user and the suggested user. For example, after the user selects the "meet" UI element 118 in FIG. 1B, the head-wearable device 110 displays the visual path guidance UI element 124 in FIG. 1D.

Turning now to FIG. 5B, in some embodiments, the method 500 includes, while providing (560) the visual guidance UI element, displaying information about the artificial-reality activity at the head-wearable device (e.g., the interactive activity informational UI element 127 in FIG. 1D).

In some embodiments, the method 500 includes determining (570) whether the user and/or the suggested user have canceled the artificial-reality activity before arriving at the interactive-activity location. In some embodiments, the operation 570 is performed continuously or iteratively until the user 115 and/or suggested user reaches interactive-activity location. For example, the cancellation UI element 129 in FIG. 1D can remain displayed while the user 115 navigates the interactive-activity location. In some embodiments, in accordance with a determination that the user and/or the suggested user canceled the artificial-reality activity before arriving at the interactive-activity location ("Yes" at operation 570), the method 500 returns to operation (520) and determines additional suggested users for the user 115. For example, in accordance with the selection of the cancellation UI element 129 in FIG. 1D, the head-wearable device 110 can display an updated connection UI 112 with new suggested users.

Alternatively, in some embodiments, in accordance with a determination that the user and/or the suggested user have not canceled the artificial-reality activity before arriving at the interactive-activity location ("No" at operation 570), the method 500 includes presenting (580) the artificial-reality activity at the head-wearable device in accordance with a determination that the user and the suggested user have arrived at the interactive-activity location. For example, the artificial-reality system 100 causes the head-wearable device 110 to display various UIs, including UI elements and virtual objects in accordance with the user 115 and the suggested user 144 arriving at the interactive-activity location in FIG. 1G.

In some embodiments, the method 500 includes determining (590) upon completion of the artificial-reality activity if the user requests for an additional suggested user. In accordance with a determination that the user does request for an additional suggested user ("Yes" at operation 590), the method 500 returns to operation (520) and determines additional suggested users for the user 115. Alternatively, in accordance with a determination that the user does not request for an additional suggested user ("No" at operation 590), the method includes terminating (595) the artificial-reality application. In some embodiments, when the user terminates the artificial-reality application, the user can receive a summary of the artificial-reality activities that the user performed while using the artificial-reality application.

FIG. 6 illustrates a detailed flow diagram of a method for facilitating an interactive artificial-reality activity in an artificial-reality environment, according to some embodiments. Similar to method 500 of FIGS. 5A and 5B, operations of the method 600 can be performed by one or more processors of a head-wearable device 110. At least some of the operations shown in FIG. 6 correspond to instructions stored in computer memory or computer-readable storage medium. Operations of the method 600 can be performed by the head-wearable device 110 alone or in conjunction with one or more processors and/or hardware components of another device (e.g., a wrist-wearable device 170 and/or any intermediary device described herein) communicatively coupled to the head-wearable device 110 and/or instructions stored in memory or computer-readable medium of the other device communicatively coupled to the wrist-wearable device 170.

The method 600 includes, after a user of head-wearable device has opted-in (602) to using an artificial-reality application for connecting with other participating users, determining, based on one or more user-specific suggestion criteria for the user, that a suggested user (i) is located in a common space with the user, the common space approved for use in the artificial-reality application, and (ii) has opted-in to use the artificial-reality application. For example, in FIG. 1B, instructions cause the head-wearable device 110 to display the connection UI 112 which includes a suggested user icon UI element 114a of the suggested user 144, after making the determination described above.

The method 600 further includes causing (604) presentation, via the head-wearable device, of a respective UI element for linking the user with the suggested user. For example, in FIG. 1B, the connection UI 112 includes a "meet" UI element 118 that the user 115 can select to link the user with the suggested user for performance of the artificial-reality activity.

In some embodiments, the respective UI element for linking the user with the suggested user is based on determining that the suggested user satisfies one or more safety criteria, as described above. In some embodiments, the one or more safety criteria include: (i) checking whether a name of the suggested user is associated with a blocked user account, and (ii) verifying that the suggested user has authenticated account information (e.g., Facebook, Instagram, etc.). In some embodiments, the method 600 further includes indicating (606) whether the suggested user has a verified account of a particular social-media application, and a shared interest and/or related interest of the user. For example, in FIG. 1B, the head-wearable device 110 displays the verification icon UI element 114b over the suggested user icon UI element 114a, indicating that the suggested user 144 has a verified account on a social-media application. In some embodiments, the connection UI 112 for linking the user 115 and the suggested user 144 in FIG. 1B would not be presented to the user 115 if the suggested user 144 did not have a verified account on a social-media application (e.g., Facebook, Instagram).

In some embodiments, before linking the user with the suggested user, the method 600 includes authenticating the user as a designated wearer of the head-wearable device and based on a determination that the user is not authenticated as the designated wearer of the head-wearable device, terminating the artificial-reality activity, and providing a notification to the suggested user. For example, when the other person 302 attempts to wear the head-wearable device 110 in FIG. 3C, the head-wearable device temporarily terminates the artificial-reality application and displays the login UI 306. In some embodiments, authenticating the user as the designated wearer of the head-wearable device is based on user-authentication information collected by one or more sensors, including one or more of eye tracking data collected by optical sensors, EMG sensor data, imaging sensor data, and audio data.

In some embodiments, the method 600 further includes, in response to receiving (608) a selection of the UI element for linking the user with the suggested user: (i) automatically, without further instruction from the user, causing (610) the head-wearable device to provide one or more visual-guidance UI elements to navigate the user to an interactive-activity location at which an artificial-reality activity is to be performed by the user and the suggested user (e.g., the visual path guidance UI element 124 in FIGS. 1D-1E); and (ii) while providing one or more visual-guidance UI elements, causing (612) display of information, at the head-wearable device, about the artificial-reality activity to be performed by the user and the suggested user (e.g., the interactive activity informational UI element 127 in FIG. 1D).

In some embodiments, the interactive-activity location is a physical location with a predetermined distance of the head-wearable device, and the artificial-reality activity is an interaction that takes place at the physical location. For example, FIGS. 1A-1J show the user 115 performing operations related to the artificial-reality application in an AR environment presented in conjunction with the actual physical location of the user 115. Alternatively, in some embodiments, the interactive-activity location is a virtual location in a virtual-reality environment, and the artificial-reality activity is an interaction that takes place at the virtual location. For example, FIGS. 2A-2E show the user 115 performing operations related to the artificial-reality application in a VR environment, that is substantially immersive, and not necessarily related to the actual physical location of the user 115.

In some embodiments, the one or more visual-guidance UI elements to navigate the user indicate a path for the user to the interactive-activity location. For example, in FIG. 1D, the one or more visual path guidance UI elements 124 include navigational arrow UI elements 126 which indicate the path for the user 115 to the interactive-activity location.

In some embodiments, the method 600 includes determining that the interactive-activity location is a safe location, based on one or more safe-location criteria. The safe-location criteria can include one or more of: (i) an average number of people in proximity to the interactive-activity location during a predefined period of time, (ii) a lighting threshold for the interactive-activity location, and/or (iii) previous activities that took place in proximity to the interactive-activity location.

In some embodiments, the artificial-reality activity is identified based on one or more of an interaction start time and an allotted interaction duration. For example, in FIG. 1A, the opt-in UI 104 that displays configuration information for the artificial-reality application includes a general settings UI element 103f, which can be adjusted based on an allotted interaction duration, which can be set by the user 115.

In some embodiments, each of the user and the suggested user are located within a predetermined threshold distance of a location of significance, and at least one of the artificial-reality activity and the interactive-activity location is determined in part based on the location of significance. For example, in FIGS. 4A-4E, the user 115 is at a location of significance-a clown-themed amusement park, and based on the user 115 and the various suggested users in FIGS. 4A-4E being within a predetermined threshold distance of the clown-themed amusement park, various artificial-reality activities, and interactive-activity locations are presented via the head-wearable device 110. The artificial-reality activities and interactive-activity locations presented to the user can include thematic elements (e.g., audio soundtracks, virtual objects, UI borders, UI colors, etc.) related to an artificial-reality activity and/or other aspect associated with the location of significance.

In some embodiments, the method 600 further includes causing (614) the head-wearable device to present an indication of the suggested user's progress towards reaching the interactive-activity location. In some embodiments, while the one or more visual-guidance UI elements are being provided, the method 600 includes causing the head-wearable device to present an indication of the suggested user's progress towards reaching the interactive-activity location. For example, the progress indicator UI element 160 in FIGS. 1E-1F is a progress bar that indicates how close the user 115 and the suggested user 144 are to the interactive-activity location. In some embodiments, additional UI elements, such as arrows (e.g., progress arrow UI elements 134a and 134b; FIG. 1E), can be presented to the user 115 to indicate how fast each user is moving in approaching the interactive-activity location.

In some embodiments, the method 600 includes causing the head-wearable device 110 to provide an indication to the user, based on determining that (i) the user has arrived at the interactive-activity location and (ii) the suggested user is currently navigating towards the interactive-activity location. For example, in FIG. 1F, when the user 115 arrives at the interactive-activity location, the head-wearable device displays a suggested user progress alert UI element 138 indicating to the user 115 that the suggested user 144 is on their way to the interactive-activity location.

In some embodiments, the method 600 further includes capturing (616) image data while the user navigates from a respective starting location to the interactive-activity location. In some embodiments, the method 600 includes causing the head-wearable device and/or one or more other devices communicatively coupled with the head-wearable device 110 to capture image data while the user navigates from a respective starting location to the interactive-activity location, and provide the image data to another device for use in suggesting another interactive-activity location to another user participating in the artificial-reality application, based on the image data captured while the user navigates to the interactive-activity location.

In some embodiments, the interactive-activity location is determined (618) based on image data received from another user who is or has previously participated in the artificial-reality activity. As shown in FIG. 1D, the head-wearable device 110 is displaying the imaging device activation UI element 123 which indicates that the head-wearable device 110 is capturing image data while the user 115 is navigating to the interactive-activity location.

In some embodiments, in conjunction with performance of the artificial-reality activity, the method 600 includes causing the head-wearable device to, in conjunction with performance of the artificial-reality activity, generate a virtual object related to respective shared interests of the user and the suggested user, and causing the head-wearable device to present the virtual object as appearing within the common space. For example, in FIG. 1F, the head-wearable device displays the shared interest virtual object 140 at the interactive-activity location based on determining that the A-MAN is related to a shared interest of the user 115 and the suggested user 144.

In some embodiments, the method 600 includes causing an imaging device of the head-wearable device to capture a portion of the artificial-reality activity between the user and the suggested user and causing the head-wearable device to encrypt and temporarily store the portion of the artificial-reality activity between the user and the suggested user. In some embodiments, there is a configurable setting that is used to determine whether the artificial-reality activity is to be recorded. As shown in FIG. 1A, the opt-in UI 104 contains an "allow recording" UI element 103e that allows the user to specify whether a recording of the artificial-reality activity is allowed.

In some embodiments, the method 600 further includes, after performance of the artificial-reality activity by the user and the suggested user, prompting (620) the user to send an electronic message to the suggested user. For example, in FIG. 1I-1J, the head-wearable device 110 first presents the message prompt UI 156, requesting whether the user 115 would like to chat with the suggested user 144. In accordance with the user 115 selecting the confirmation UI element 158 within the message prompt UI 156, the head-wearable device 110 or another electronic device then opens a message-thread UI and displays a message-thread UI 199 containing a pre-written message composition draft for the user 115 to send to the suggested user 144.

FIG. 7 illustrates a system 700 of one or more devices for facilitating an interactive artificial-reality activity in an artificial-reality environment, in accordance with some embodiments. For example, the head-wearable device 110 can present to the user 115 an artificial-reality activity and/or interactive-activity location to connect with a suggested user. The system 800 can include one or more of servers 870, electronic devices 874 (e.g., a computer, 874*a*, a smartphone 874*b*, a controller 874*c*, and/or other devices), head-wearable devices 110 (or head-wearable device 510, which is analogous to head-wearable devices 110), and/or wrist-wearable devices 170. In some embodiments, the one or more of servers 870, electronic devices 874, head-wearable devices 110, and/or wrist-wearable devices 170 are communicatively coupled via a network 872. In some embodiments, the head-wearable device 110 is configured to cause one or more operations to be performed by a communicatively coupled wrist-wearable device 170, and/or the two devices can also both be connected to an intermediary device, such as a smartphone 874*b*, a controller 874*c*, or other device that provides instructions and data to and between the two devices. In some embodiments, the head-wearable device 110 is configured to cause one or more operations to be performed by multiple devices in conjunction with the wrist-wearable device 170. In some embodiments, instructions to cause the performance of one or more operations are controlled via an artificial-reality processing module 845. The Artificial-reality processing module 845 can be implemented in one or more devices, such as the one or more of servers 870, electronic devices 874, head-wearable devices 110, and/or wrist-wearable devices 170. In some embodiments, the one or more devices perform operations of the artificial-reality processing module 845, using one or more respective processors, individually or in conjunction with at least one other device as described herein.

In some embodiments, the head-wearable device 110 includes one or more components such as a communication interface 815, one or more sensors 821, one or more haptic generators 825, an artificial-reality processing module 845, one or more imaging devices 111 (e.g., a camera), one or more processors 850, and memory 860. In addition, in some embodiments, the head-wearable device 110 includes a display 130 and one or more applications 835. In some embodiments, the memory 860 is configured to store sensor data 864 captured by the one or more sensors 821 and AR processing data 863 (e.g., data used by and/or generated by the artificial-reality processing module 845). Although not show, in some embodiments, the memory 860 can include application data, device data (e.g., device hardware, device model, etc.), image data, and/or user data (e.g., data collected through use of a device, data collected through use of an application, user preferences, or other information stored by the user). In some embodiments, one or more components of the head-wearable device 110 are housed within a body of the head-wearable device 110 (e.g., frames of smart glasses, a body of a AR headset, etc.). In addition, in some embodiments, one or more components of the head-wearable device 110 are stored within or coupled with lenses of the head-wearable device 110.

In some embodiments, the communications interface 815 is configured to communicatively couple the head-wearable device 110 to one or more other devices such as the wrist-wearable device 170, electronic device 874 (e.g., a computer 874*a*, a smartphone 874*b*, a controller 874*c*, a tablet, etc.), and/or one or more servers 870. The communication interface 815 is used establish wired or wireless connections between the head-wearable device 110 and the other devices. In some embodiments, the communication interface 815 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

The one or more sensors 821 can include heart rate sensors, electromyography (EMG) sensors, SpO2 sensors, altimeters, thermal sensors or thermal couples, ambient light sensors, ambient noise sensors, and/or inertial measurement units (IMU) s. Additional non-limiting examples of the one or more sensors 821 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 821 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 821 can include location sensing devices (e.g., GPS) configured to provide location information. In some embodiment, the data measured or sensed by the one or more sensors 821 is stored in memory 860. In some embodiments, the sensor data is used by the head-wearable device 110 for determining one or more suggested users, artificial-reality activities, and/or interactive-activity locations as described above in reference to FIGS. 1A-6.

The one or more haptic generators 825 can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 825 are hydraulic, pneumatic, electric, and/or mechanical actuators. In some embodiments, the one or more haptic generators 825 are part of a surface of the head-wearable device 110 that can be used to generate a haptic response (e.g., vibrations, pulses, tightening (e.g., small contractions of an arm of the head-wearable device 110, etc.)). For example, the one or more haptic generators 825 can apply vibration stimulations, pressure stimulations, squeeze simulations, shear stimulations, temperature changes, or some combination thereof to the user. In addition, in some embodiments, the one or more haptic generators 825 include audio generating devices (e.g., speakers and other sound transducers) and illuminating devices (e.g., light-emitting diodes (LED)s, screen displays, etc.). The one or more haptic generators 825 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 835 include social-media applications, banking applications, health applications, messaging applications, web browsers, gaming application, streaming applications, media applications, imaging applications, productivity applications, social applications, etc. In some embodiments, the one or more applications 835 include artificial-reality applications, such as the artificial-reality application for facilitating connections and/or interactions between the user 115 and other participating users, as described above in FIGS. 1A-6. The one or more applications 835 provide data to the head-wearable device 110 such that the head-wearable device 110 can present different UIs and UI elements including virtual objects to the user 115, as well as information about suggested users, artificial-reality activities, and/or interactive-activity locations. In some embodiments, the one or more applications 835 can be displayed via the wrist-wearable device 170 or other communicatively coupled device.

In some embodiments, an artificial-reality processing module 845 is configured to determine one or more suggested users, artificial-reality activities, and/or interactive-activity locations as described above in reference to FIGS. 1A-6. In some embodiments, the artificial-reality processing module 845 is configured to determine one or more suggested users, artificial-reality activities, and/or interactive-activity locations based on user-specific suggestion criteria and/or safety criteria. For example, the artificial-reality processing module 845 can determine one or more suggested users, artificial-reality activities, and/or interactive-activity locations for the user 115 based on the user 115's interest in games, movies, shows, etc. The artificial-reality processing module 845 is configured to determine an initiation of artificial-reality activity and/or detect one or more inputs during each respective user's participation in an artificial-reality activity. The artificial-reality processing module 845 is further configured and provide data to the head-wearable device 115 for presenting relevant information.

In some embodiments, the one or more imaging devices 111 can include an ultra-wide camera, a wide camera, a telephoto camera, a depth-sensing cameras, or other types of cameras. In some embodiments, the one or more imaging devices 111 are used to capture image data and/or video data via the head-wearable device 110. The captured image data can be processed and stored in memory and then presented to a user for viewing. The one or more imaging devices 111 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 111 is stored in memory 860 (which can include volatile and non-volatile memory such that the image data and/or video data can be temporarily or permanently stored, as needed depending on the circumstances).

The one or more processors 850 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 860. The memory 860 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the head-wearable device 110 and the processor 850. The memory 860 also provides a storage area for data and instructions associated with applications and data handled by the processor 850.

In some embodiments, the memory 860 stores at least user data 862 including sensor data 864 and AR processing data 863. The sensor data 864 includes sensor data monitored by one or more sensors 821 of the wrist-wearable device 170 and/or sensor data received from one or more devices communicative coupled with the head-wearable device 110, such as a wrist-wearable device 170, smartphone 874b, etc. The sensor data 864 can include sensor data collected over a predetermined period of time that can be used by the artificial-reality processing module 845. The AR processing data 863 can include user settings, user preferences, user-specific suggestion criteria, safety criteria, image data, common space data, event data, location of significance information, and/or any other data that can be used in determining the one or more suggested users, artificial-reality activities, and/or interactive-activity locations.

The wrist-wearable device 170 can include a communication interface 815, a display 130, one or more sensors 821, one or more haptic generators 825, one or more imaging devices 111 (e.g., a camera), one or more applications 835, one or more processors 850, and memory 860. The wrist-wearable device 170 is configured to communicatively couple with head-wearable devices 110 and/or 510 (or other devices (e.g., electronic device 874)) using communication interface 815. In some embodiments, the wrist-wearable device 170 is configured to communicatively couple with the head-wearable device 110 (or other devices (e.g., electronic device 874)) via an application programming interface (API). In some embodiments, the wrist-wearable device 170 operates in conjunction with the head-wearable device 110 to perform one or more operations, such as determining the one or more suggested users, artificial-reality activities, and/or interactive-activity locations. Similar to the head-wearable device 110, the wrist-wearable device 170 can use the artificial-reality processing module 845 to determine and present the one or more suggested users, artificial-reality activities, and/or interactive-activity locations. In some embodiments, the one or more components of the wrist-wearable device 170 are housed within a capsule (or watch body) and/or a band of the wrist-wearable device 170.

Electronic devices 874 can also include a communication interface 815, a display 130, one or more sensors 821, one or more applications 835, an Artificial-reality processing module 845, one or more processors 850, and memory 860. The electronic devices 874 are configured to communicatively couple with the wrist-wearable device 170 and/or head-wearable device 110 (or other devices) using communication interface 815. In some embodiments, the electronic devices 874 are configured to communicatively couple with the wrist-wearable device 170 and/or head-wearable device 110 (or other devices) via an application programming interface (API). In some embodiments, the electronic devices 874 operate in conjunction with the wrist-wearable device 170 and/or the head-wearable device 110 to determine a hand gesture and cause the performance of an operation or action at a communicatively coupled device. The electronic devices 874, like the head-wearable device 110.

Server 870 includes a communication interface 815, one or more applications 835, an Artificial-reality processing module 845, one or more processors 850, and memory 860. In some embodiments, the server 870 is configured to receive sensor data from one or more devices, such as the head-wearable device 110, the wrist-wearable device 170, and/or electronic device 874, and use the received sensor data to determine a hand gesture. The server 870 can generate instructions that cause the performance of operations and actions associated with a determined hand gesture at communicatively coupled devices, such as the head-wearable device 110.

Example Head-Wearable Devices

Figure 8A:
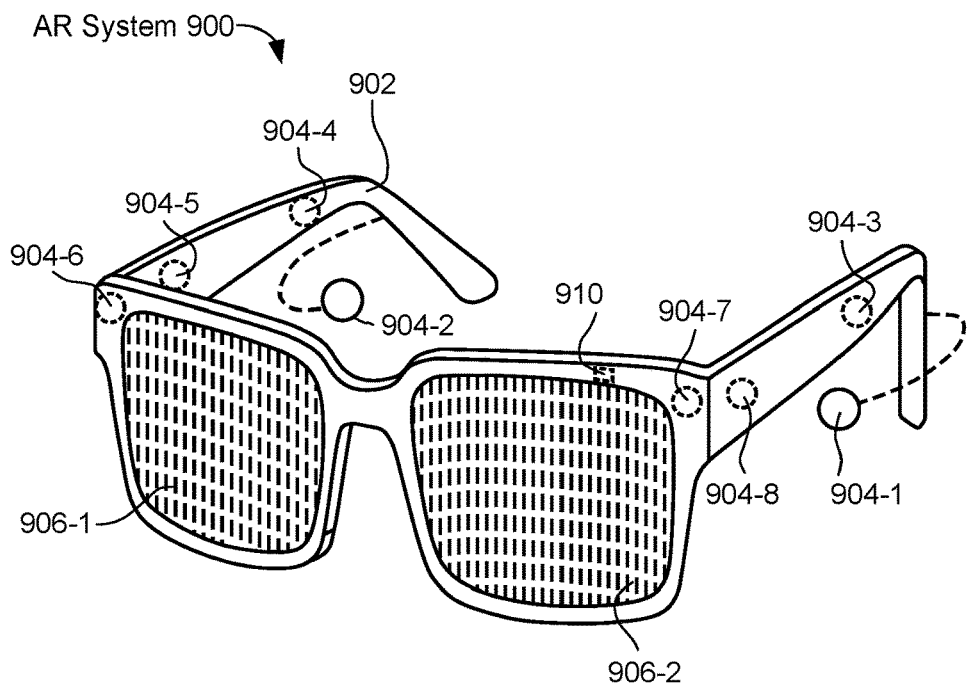
FIGS. 8A-8B illustrate an example AR system in accordance with some embodiments.

FIG. 8A shows an example AR system 900 in accordance with some embodiments. In FIG. 8A, the AR system 900 (similar to head-wearable device 100; FIG. 7) includes an eyewear device with a frame 902 configured to hold a left display device 906-1 and a right display device 906-2 in front of a user's eyes. The display devices 906-1 and 906-2 may act together or independently to present an image or series of images to a user. While the AR system 900 includes two displays, embodiments of this disclosure may be implemented in AR systems with a single near-eye display (NED) or more than two NEDs.

In some embodiments, the AR system 900 includes one or more sensors, such as the acoustic sensors 904. For example, the acoustic sensors 904 can generate measurement signals in response to motion of the AR system 900 and may be located on substantially any portion of the frame 902. Any one of the sensors may be a position sensor, an IMU, a depth camera assembly, or any combination thereof. In some embodiments, the AR system 900 includes more or fewer sensors than are shown in FIG. 8A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 900 includes a microphone array with a plurality of acoustic sensors 904-1 through 904-8, referred to collectively as the acoustic sensors 904. The acoustic sensors 904 may be transducers that detect air pressure variations induced by sound waves. In some embodiments, each acoustic sensor 904 is configured to detect sound and convert the detected sound into an electronic format (e.g., an analog or digital format). In some embodiments, the microphone array includes ten acoustic sensors: 904-1 and 904-2 designed to be placed inside a corresponding ear of the user, acoustic sensors 904-3, 904-4, 904-5, 904-6, 904-7, and 904-8 positioned at various locations on the frame 902, and acoustic sensors positioned on a corresponding neckband, where the neckband is an optional component of the system that is not present in certain embodiments of the artificial-reality systems discussed herein.

The configuration of the acoustic sensors 904 of the microphone array may vary. While the AR system 900 is shown in FIG. 8A having ten acoustic sensors 904, the number of acoustic sensors 904 may be more or fewer than ten. In some situations, using more acoustic sensors 904 increases the amount of audio information collected and/or the sensitivity and accuracy of the audio information. In contrast, in some situations, using a lower number of acoustic sensors 904 decreases the computing power required by a controller to process the collected audio information. In addition, the position of each acoustic sensor 904 of the microphone array may vary. For example, the position of an acoustic sensor 904 may include a defined position on the user, a defined coordinate on the frame 902, an orientation associated with each acoustic sensor, or some combination thereof.

The acoustic sensors 904-1 and 904-2 may be positioned on different parts of the user's ear. In some embodiments, there are additional acoustic sensors on or surrounding the ear in addition to acoustic sensors 904 inside the ear canal. In some situations, having an acoustic sensor positioned next to an ear canal of a user enables the microphone array to collect information on how sounds arrive at the ear canal. By positioning at least two of the acoustic sensors 904 on either side of a user's head (e.g., as binaural microphones), the AR device 900 is able to simulate binaural hearing and capture a 3D stereo sound field around a user's head. In some embodiments, the acoustic sensors 904-1 and 904-2 are connected to the AR system 900 via a wired connection, and in other embodiments, the acoustic sensors 904-1 and 904-2 are connected to the AR system 900 via a wireless connection (e.g., a Bluetooth connection). In some embodiments, the AR system 900 does not include the acoustic sensors 904-1 and 904-2.

The acoustic sensors 904 on the frame 902 may be positioned along the length of the temples, across the bridge of the nose, above or below the display devices 906, or in some combination thereof. The acoustic sensors 904 may be oriented such that the microphone array is able to detect sounds in a wide range of directions surrounding the user that is wearing the AR system 900. In some embodiments, a calibration process is performed during manufacturing of the AR system 900 to determine relative positioning of each acoustic sensor 904 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 900 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 900. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 900. For example, the controller may process information from the acoustic sensors 904. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 900 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 950 in FIG. 8B, which mostly or completely covers a user's field of view.

Figure 8B:
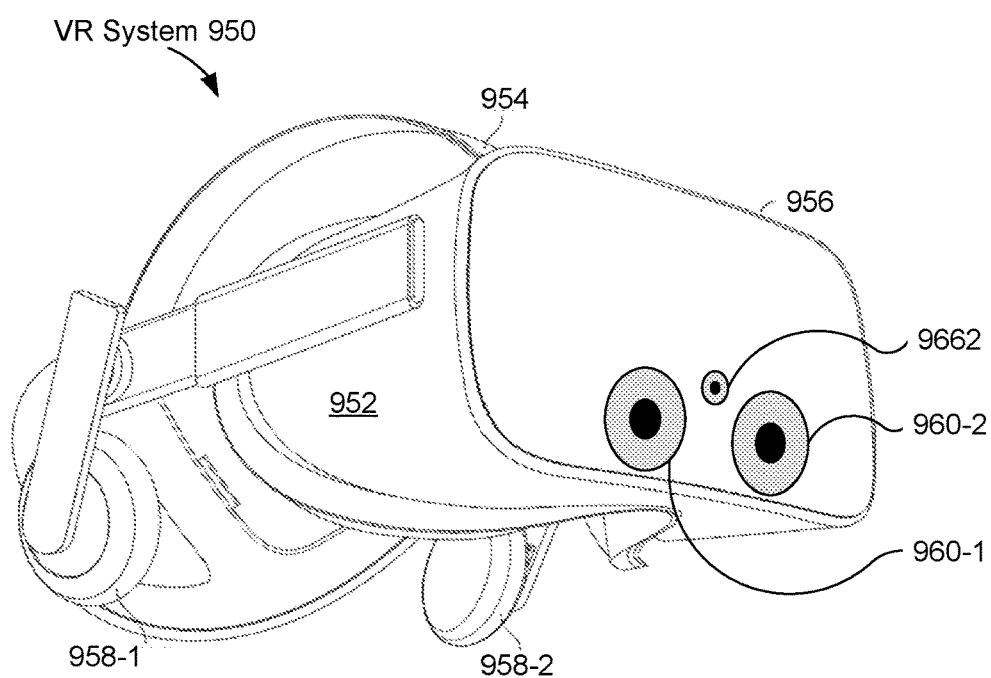

FIG. 8B shows a VR system 950 (e.g., also referred to herein as VR headsets or VR headset) in accordance with some embodiments. The VR system 950 (similar to head-wearable device 510; FIG. 7) includes a head-mounted display (HMD) 952. The HMD 952 includes a front body 956 and a frame 954 (e.g., a strap or band) shaped to fit around a user's head. In some embodiments, the HMD 952 includes output audio transducers 958-1 and 958-2, as shown in FIG. 8B (e.g., transducers). In some embodiments, the front body 956 and/or the frame 954 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 900 and/or the VR system 950 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 900 and/or the VR system 950 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 900 and/or the VR system 950 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 8B shows VR system 950 having cameras 960-1 and 960-2 that can be used to provide depth information for creating a voxel field and a two-dimensional mesh to provide object information to the user to avoid collisions. FIG. 8B also shows that the VR system includes one or more additional cameras 962 that are configured to augment the cameras 960-1 and 960-2 by providing more information. For example, the additional cameras 962 can be used to supply color information that is not discerned by cameras 960-1 and 960-2. In some embodiments, cameras 960-1 and 960-2 and additional cameras 962 can include an optional IR cut filter configured to remove IR light from being received at the respective camera sensors.

In some embodiments, the AR system 900 and/or the VR system 950 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 8A-8B, but could also be used with other types of wearable devices for sensing neuromuscular signals (such as body-wearable or head-wearable devices that might have neuromuscular sensors closer to the brain or spinal column). Having thus described example wrist-wearable device and head-wearable devices, attention will now be turned to example feedback systems that can be integrated into the devices described above or be a separate device.

Further embodiments also include various subsets of the above embodiments including embodiments described with reference to FIGS. 1A-8B combined or otherwise re-arranged.

Example Embodiments

A few example embodiments of the methods and systems described herein will now be briefly described.

(A1) In accordance with some embodiments, a method of facilitating an interactive artificial-reality activity is disclosed. The method includes, after a user of a head-wearable device has opted-in to using an artificial-reality application to facilitate connecting the user with other participating users, determining, based on one or more user-specific suggestion criteria for the user, that a suggested user (i) is located in a common space with the user, the common space approved for use in the artificial-reality application and (ii) has opted-in to use the artificial-reality application. The method further includes causing presentation, via the head-wearable device, of a respective UI element for linking the suggested user with the user. The method further includes, in response to receiving a selection of the respective UI element of the one or more UI elements for linking the suggested user with the user: (i) automatically, without further instructions from the user, causing the head-wearable device to provide one or more visual-guidance UI elements to navigate the user to an interactive-activity location at which an artificial-reality activity is to be performed by the user and the suggested user, and (ii) while providing the one or more visual-guidance UI elements, causing display of information, at the head-wearable device, about the artificial-reality activity to be performed by the user and the suggested user.

(A2) In some embodiments of A1, the method further includes, while the one or more visual-guidance UI elements are being provided, causing the head-wearable device to present an indication of the suggested user's progress towards reaching the interactive-activity location.

(A3) In some embodiments of A1-A2, the method further includes causing presentation of the respective UI element for linking the suggested user with the user includes causing presentation of an indication whether the suggested user has a verified account of a particular social media application, and an interest that is shared by the user and the suggested user.

(A4) In some embodiments of A1-A3, the method further includes capturing image data while the user navigates from a respective starting location of the user to the interactive-activity location, and providing the image data to another device for use in suggesting another interactive-activity location to another user participating in the artificial-reality application, based on the image data captured while the user navigates to the interactive-activity location.

(A5) In some embodiments of A1-A4, the interactive-activity location is determined based on image data received from one or more other users participating in the artificial-reality activity.

(A6) In some embodiments of A1-A5, the one or more visual-guidance UI elements to navigate the user indicate a path for the user to the interactive-activity location.

(A7) In some embodiments of A1-A6, the method further includes, after performance of the artificial-reality activity by the user and the suggested user, prompting the user to send an electronic message to the suggested user.

(A8) In some embodiments of A1-A7, the method further includes, based on determining that (i) the user has arrived at the interactive-activity location, and (ii) the suggested user is currently navigating towards the interactive-activity location, providing an indication to the user that the suggested user is currently navigating towards the interactive-activity location.

(A9) In some embodiments of A1-A8, the method further includes, in conjunction with performance of the artificial-reality activity, generating a virtual object related to respective shared interests of the user and the suggested user, and causing the head-wearable device to present the virtual object as appearing within the common space.

(A10) In some embodiments of A1-A9, determining the interactive-activity location further includes determining that the interactive-activity location is a safe location, based on one or more safe-location criteria, wherein the safe-location criteria include an average number of people in proximity to the interactive-activity location during a predefined period of time, a lighting threshold for the interactive-activity location, and previous activities that took place in proximity to the interactive-activity location.

(A11) In some embodiments of A1-A10, the artificial-reality activity is identified based on one or more of an interaction start time and an allotted interaction duration.

(A12) In some embodiments of A1-A11, each of the user and the suggested user are located within a predetermined threshold distance of a location of significance, and at least one of the artificial-reality activity, and the interactive-activity location is determined in part based on the location of significance.

(A13) In some embodiments of A1-A12, the method further includes (i) causing an imaging device of the head-wearable device to capture a portion of the artificial-reality activity between the user and the suggested user, and (ii) causing the head-wearable device to encrypt and temporarily store the portion of the artificial-reality activity between the user and the suggested user.

(A14) In some embodiments of A1-A13, the method further includes, before linking the suggested user with the user, authenticating the user as a designated wearer of the head-wearable device. And the method further includes, based on determining that the user is not authenticated as the designated wearer of the head-wearable device, terminating the artificial-reality activity, and providing a notification to the suggested user.

(A15) In some embodiments of A14, the authenticating the user as the designated wearer of the head-wearable device is based on user-authentication information collected by one or more sensors, including one or more of eye tracking data collected by optical sensors, EMG sensor data, imaging sensor data, and audio data.

(A16) In some embodiments of A1-A15, the method further includes determining that the suggested user satisfies one or more safety criteria, and the respective UI element for linking the suggested user with the user is based on determining that the suggested user does satisfy the one or more safety criteria.

(A17) In some embodiments of A16, satisfying the one or more safety criteria includes one or more of: (i) checking whether a name of the suggested user is associated with a blocked user account; (ii) determining whether an age of the suggested user is within an age threshold of the user; and/or (iii) verifying that the suggested user has authenticated account information.

(A18) In some embodiments of A1-A17, the interactive-activity location is a virtual location in a virtual-reality environment and the artificial-reality activity is an interaction that takes place at the virtual location.

(A19) In some embodiments of A1-A18, the interactive-activity location is a physical location with a predetermined distance of the head-wearable device, and the artificial-reality activity is an interaction that takes place at the physical location.

(A20) In some embodiments of A1-A19, the user-specific suggestion criteria include one or more of an interaction threshold distance, a shared-interests threshold, and a minimum shared-contacts threshold.

(B1) In accordance with some embodiments, a head-wearable device is provided that includes a display, one or more sensors, one or more processors, and memory comprising instructions that, when executed by the head-wearable device, cause performance of the method of any of A1-A20.

(C1) In accordance with some embodiments, a head-wearable device is provided that includes a means for performing the method of any of A1-A20.

(D1) In accordance with some embodiments, a non-transitory computer-readable storage medium is provided. The non-transitory computer-readable storage medium includes instructions, which, when executed at a computing device comprising memory and one or more processors, cause performance of the method of any of A1-A20.

(E1) In some embodiments, a system that includes a head-wearable device and a wrist-wearable device to be used as a controller for input provided to the head-wearable device is provided, and the system is configured to perform or cause performance of the method of any of A1-A20.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of facilitating an interactive artificial-reality activity, comprising:
   after a user of a head-wearable device has opted-in to using an artificial-reality application to facilitate connecting with other participating users, determining, based on one or more user-specific suggestion criteria for the user, that a suggested user (i) is located in a common space with the user, the common space approved for use in the artificial-reality application and (ii) has opted-in to use the artificial-reality application;
   causing presentation, via the head-wearable device, of a respective user interface element for linking the user with the suggested user; and
   in response to receiving a selection of the respective user interface element for linking the suggested user with the user:
      automatically, without further instructions from the user, causing the head-wearable device to provide one or more visual-guidance user interface elements to navigate the user to an interactive-activity location at which an artificial-reality activity is to be performed by the user and the suggested user;
      while providing the one or more visual-guidance user interface elements, causing display of information, at the head-wearable device, about the artificial-reality activity to be performed by the user and the suggested user;
      capturing image data while the user navigates from a respective starting location of the user to the interactive-activity location; and
      providing the image data to another device for use in suggesting another interactive-activity location to another user participating in the artificial-reality application, based on the image data captured while the user navigates to the interactive-activity location.

2. The method of claim 1, further comprising:
   while the one or more visual-guidance user interface elements are being provided:

causing the head-wearable device to present an indication of progress of the suggested user towards reaching the interactive-activity location.

3. The method of claim 1, wherein the interactive-activity location is determined based on image data received from one or more other users participating in the artificial-reality activity.

4. The method of claim 1, further comprising:
based on determining that (i) the user has arrived at the interactive-activity location, and (ii) the suggested user is currently navigating towards the interactive-activity location:
providing an indication to the user that the suggested user is currently navigating towards the interactive-activity location.

5. The method of claim 1, further comprising:
in conjunction with performance of the artificial-reality activity:
generating a virtual object related to respective shared interests of the user and the suggested user; and
causing the head-wearable device to present the virtual object as appearing within the common space.

6. The method of claim 1, wherein determining the interactive-activity location further comprises:
determining that the interactive-activity location is a safe location, based on one or more safe-location criteria, wherein the safe-location criteria include an average number of people in proximity to the interactive-activity location during a predefined period of time, a lighting threshold for the interactive-activity location, and previous activities that took place in proximity to the interactive-activity location.

7. The method of claim 1, wherein:
each of the user and the suggested user are located within a predetermined threshold distance of a location of significance; and
at least one of the artificial-reality activity and the interactive-activity location is determined in part based on the location of significance.

8. The method of claim 1, further comprising:
causing an imaging device of the head-wearable device to capture a portion of the artificial-reality activity between the user and the suggested user; and
causing the head-wearable device to encrypt and temporarily store the portion of the artificial-reality activity between the user and the suggested user.

9. The method of claim 1, further comprising:
before linking the user with the suggested user, authenticating the user as a designated wearer of the head-wearable device; and
based on determining that the user is not authenticated as the designated wearer of the head-wearable device, terminating the artificial-reality activity and providing a notification to the suggested user.

10. The method of claim 9, wherein the authenticating the user as the designated wearer of the head-wearable device is based on user-authentication information collected by one or more sensors, including one or more of eye tracking data collected by optical sensors, EMG sensor data, imaging sensor data, and audio data.

11. A head-wearable device, comprising:
a display;
one or more sensors;
one or more processors; and
memory comprising instructions that, when executed by the head-wearable device, cause performance of:
after a user of a head-wearable device has opted-in to using an artificial-reality application to facilitate connecting with other participating users, determining, based on one or more user-specific suggestion criteria for the user, that a suggested user (i) is located in a common space with the user, the common space approved for use in the artificial-reality application and (ii) has opted-in to use the artificial-reality application;
causing presentation, via the head-wearable device, of a respective user interface element for linking the user with the suggested user; and
in response to receiving a selection of the respective user interface element for linking the suggested user with the user:
automatically, without further instructions from the user, causing the head-wearable device to provide one or more visual-guidance user interface elements to navigate the user to an interactive-activity location at which an artificial-reality activity is to be performed by the user and the suggested user;
while providing the one or more visual-guidance user interface elements, causing display of information, at the head-wearable device, about the artificial-reality activity to be performed by the user and the suggested user;
capturing image data while the user navigates from a respective starting location of the user to the interactive-activity location; and
providing the image data to another device for use in suggesting another interactive-activity location to another user participating in the artificial-reality application, based on the image data captured while the user navigates to the interactive-activity location.

12. A non-transitory computer-readable storage medium, comprising instructions, which, when executed at a computing device comprising memory and one or more processors, cause performance of:
after a user of a head-wearable device has opted-in to using an artificial-reality application to facilitate connecting with other participating users, determining, based on one or more user-specific suggestion criteria for the user, that a suggested user (i) is located in a common space with the user, the common space approved for use in the artificial-reality application and (ii) has opted-in to use the artificial-reality application;
causing presentation, via the head-wearable device, of a respective user interface element for linking the user with the suggested user; and
in response to receiving a selection of the respective user interface element for linking the suggested user with the user:
automatically, without further instructions from the user, causing the head-wearable device to provide one or more visual-guidance user interface elements to navigate the user to an interactive-activity location at which an artificial-reality activity is to be performed by the user and the suggested user;
while providing the one or more visual-guidance user interface elements, causing display of information, at the head-wearable device, about the artificial-reality activity to be performed by the user and the suggested user;
capturing image data while the user navigates from a respective starting location of the user to the interactive-activity location; and providing the image data to another device for use in suggesting another interactive-activity location to another user participating in the artificial-reality application, based on the image data captured while the user navigates to the interactive-activity location.

13. The head-wearable device of claim 11, wherein the instructions, when executed by the head-wearable device, further cause performance of:
while the one or more visual-guidance user interface elements are being provided:
causing the head-wearable device to present an indication of progress of the suggested user towards reaching the interactive-activity location.

14. The head-wearable device of claim 11, wherein the instructions, when executed by the head-wearable device, further cause performance of:
based on determining that (i) the user has arrived at the interactive-activity location, and (ii) the suggested user is currently navigating towards the interactive-activity location:
providing an indication to the user that the suggested user is currently navigating towards the interactive-activity location.

15. The head-wearable device of claim 11, wherein the instructions, when executed by the head-wearable device, further cause performance of:
causing an imaging device of the head-wearable device to capture a portion of the artificial-reality activity between the user and the suggested user; and
causing the head-wearable device to encrypt and temporarily store the portion of the artificial-reality activity between the user and the suggested user.

16. The head-wearable device of claim 11, wherein the instructions, when executed by the head-wearable device, further cause performance of:
before linking the user with the suggested user, authenticating the user as a designated wearer of the head-wearable device; and
based on determining that the user is not authenticated as the designated wearer of the head-wearable device, terminating the artificial-reality activity and providing a notification to the suggested user.

17. The head-wearable device of claim 16, wherein the authenticating the user as the designated wearer of the head-wearable device is based on user-authentication information collected by one or more sensors, including one or more of eye tracking data collected by optical sensors, EMG sensor data, imaging sensor data, and audio data.

18. The non-transitory computer-readable storage medium of claim 12, wherein the instructions, when executed at the computing device comprising memory and one or more processors, further cause performance of:
causing an imaging device of the head-wearable device to capture a portion of the artificial-reality activity between the user and the suggested user; and
causing the head-wearable device to encrypt and temporarily store the portion of the artificial-reality activity between the user and the suggested user.

19. The non-transitory computer-readable storage medium of claim 12, wherein the instructions, when executed at the computing device comprising memory and one or more processors, further cause performance of:
before linking the user with the suggested user, authenticating the user as a designated wearer of the head-wearable device; and
based on determining that the user is not authenticated as the designated wearer of the head-wearable device, terminating the artificial-reality activity and providing a notification to the suggested user.

20. The non-transitory computer-readable storage medium of claim 19, wherein the authenticating the user as the designated wearer of the head-wearable device is based on user-authentication information collected by one or more sensors, including one or more of eye tracking data collected by optical sensors, EMG sensor data, imaging sensor data, and audio data.

* * * * *